(12) United States Patent
Shafer et al.

(10) Patent No.: US 8,452,868 B2
(45) Date of Patent: May 28, 2013

(54) RETAIL PRODUCT TRACKING SYSTEM, METHOD, AND APPARATUS

(75) Inventors: Gary Mark Shafer, Charlotte, NC (US); Michael Mercier, Charlotte, NC (US); Lee H. Eckert, Waxhaw, NC (US); James Gordon Wyatt, Jr., Waxhaw, NC (US)

(73) Assignee: Checkpoint Systems, Inc.

( * ) Notice: Subject to any disclaimer, the term of this patent is extended or adjusted under 35 U.S.C. 154(b) by 0 days.

(21) Appl. No.: 12/887,228

(22) Filed: Sep. 21, 2010

(65) Prior Publication Data

US 2011/0072132 A1 Mar. 24, 2011

Related U.S. Application Data

(63) Continuation-in-part of application No. 12/636,564, filed on Dec. 11, 2009, and a continuation-in-part of application No. 12/628,863, filed on Dec. 1, 2009.

(60) Provisional application No. 61/244,320, filed on Sep. 21, 2009, provisional application No. 61/246,393, filed on Sep. 28, 2009, provisional application No. 61/246,388, filed on Sep. 28, 2009, provisional application No. 61/248,223, filed on Oct. 2, 2009, provisional application No. 61/248,228, filed on Oct. 2, 2009, provisional application No. 61/248,242, filed on Oct. 2, 2009, provisional application No. 61/248,233, filed on Oct. 2, 2009, provisional application No. 61/248,239, filed on Oct. 2, 2009, provisional application No. 61/248,269, filed on Oct. 2, 2009, provisional application No. 61/248,196, filed on Oct. 2, 2009, provisional application No. 61/311,620, filed on Mar. 8, 2010, provisional application No. 61/248,228, filed on Oct. 2, 2009.

(51) Int. Cl.
*G06F 15/173* (2006.01)

(52) U.S. Cl.
USPC ........ 709/224; 709/208; 709/222; 340/572.1; 340/572.2; 340/572.9; 340/571; 340/568.1

(58) Field of Classification Search
USPC ............. 340/571, 572.1, 572.2; 709/220–224
See application file for complete search history.

(56) References Cited

U.S. PATENT DOCUMENTS

| | | |
|---|---|---|
| 3,752,960 A | 8/1973 | Walton |
| 3,816,708 A | 6/1974 | Walton |
| 3,961,323 A | 6/1976 | Hartkorn |

(Continued)

FOREIGN PATENT DOCUMENTS

| | | |
|---|---|---|
| DE | 43 21 650 C1 | 10/1994 |
| EP | 0 449 173 A2 | 10/1991 |

(Continued)

OTHER PUBLICATIONS

Juels et al., "The Blocker Tag: Selective Blocking of RFID Tags for Consumer Privacy", CCS '03, Oct. 27-30, 2003.*

(Continued)

*Primary Examiner* — Patrice Winder
*Assistant Examiner* — Julian Chang

(57) ABSTRACT

According to some example embodiments, systems, apparatus, methods and computer program products are provided for monitoring articles, such as in a commercial environment.

20 Claims, 28 Drawing Sheets

U.S. PATENT DOCUMENTS

| | | |
|---|---|---|
| 3,984,807 A | 10/1976 | Haemmig |
| 4,021,807 A | 5/1977 | Culpepper et al. |
| 4,036,308 A | 7/1977 | Dellenberg |
| 4,063,229 A | 12/1977 | Welsh et al. |
| 4,141,006 A | 2/1979 | Braxton |
| 4,141,078 A | 2/1979 | Bridges, Jr. et al. |
| 4,196,418 A | 4/1980 | Kip et al. |
| 4,209,787 A | 6/1980 | Freeny, Jr. |
| 4,223,830 A | 9/1980 | Walton |
| 4,225,953 A | 9/1980 | Simon et al. |
| 4,242,663 A | 12/1980 | Slobodin |
| 4,308,530 A | 12/1981 | Kip et al. |
| 4,327,353 A | 4/1982 | Beard et al. |
| 4,336,531 A | 6/1982 | Kincaid |
| 4,366,481 A | 12/1982 | Main et al. |
| 4,453,636 A | 6/1984 | Meadows et al. |
| 4,462,022 A | 7/1984 | Stolarczyk |
| 4,531,117 A | 7/1985 | Nourse et al. |
| 4,551,712 A | 11/1985 | Fockens |
| 4,572,976 A | 2/1986 | Fockens |
| 4,580,041 A | 4/1986 | Walton |
| 4,630,035 A | 12/1986 | Stahl et al. |
| 4,656,463 A | 4/1987 | Anders et al. |
| 4,667,185 A | 5/1987 | Nourse et al. |
| 4,686,517 A | 8/1987 | Fockens |
| 4,688,026 A | 8/1987 | Scribner et al. |
| 4,700,179 A | 10/1987 | Fancher |
| 4,742,341 A | 5/1988 | Hogen Esch |
| 4,746,830 A | 5/1988 | Holland |
| 4,792,018 A | 12/1988 | Humble et al. |
| 4,814,751 A | 3/1989 | Hawkins et al. |
| 4,827,395 A | 5/1989 | Anders et al. |
| 4,837,568 A | 6/1989 | Snaper |
| 4,857,893 A | 8/1989 | Carroll |
| 4,862,160 A | 8/1989 | Ekchian et al. |
| 4,864,280 A | 9/1989 | van der Meij |
| 4,866,661 A | 9/1989 | de Prins |
| 4,870,391 A | 9/1989 | Cooper |
| 4,881,061 A | 11/1989 | Chambers |
| 4,907,845 A | 3/1990 | Wood |
| 4,918,432 A | 4/1990 | Pauley et al. |
| 4,924,210 A | 5/1990 | Matsui et al. |
| 4,926,161 A | 5/1990 | Cupp |
| 4,951,029 A | 8/1990 | Severson |
| 4,961,533 A | 10/1990 | Teller et al. |
| 5,006,830 A | 4/1991 | Merritt |
| 5,008,660 A | 4/1991 | de Jong |
| 5,014,206 A | 5/1991 | Scribner et al. |
| 5,019,813 A | 5/1991 | Kip et al. |
| 5,019,815 A | 5/1991 | Lemelson et al. |
| 5,021,767 A | 6/1991 | Fockens et al. |
| 5,031,098 A | 7/1991 | Miller et al. |
| 5,036,308 A | 7/1991 | Fockens |
| 5,039,996 A | 8/1991 | Fockens |
| 5,051,727 A | 9/1991 | Fockens |
| 5,057,677 A | 10/1991 | Bertagna et al. |
| 5,059,951 A | 10/1991 | Kaltner |
| 5,068,641 A | 11/1991 | Hogen Esch |
| 5,072,222 A | 12/1991 | Fockens |
| 5,099,226 A | 3/1992 | Andrews |
| 5,099,227 A | 3/1992 | Geiszler et al. |
| 5,103,222 A | 4/1992 | Hogen Esch et al. |
| 5,105,190 A | 4/1992 | Kip et al. |
| 5,119,070 A | 6/1992 | Matsumoto et al. |
| 5,119,104 A | 6/1992 | Heller |
| 5,124,699 A | 6/1992 | Tervoert et al. |
| 5,151,684 A * | 9/1992 | Johnsen ............... 340/568.1 |
| 5,153,562 A | 10/1992 | van Breemen |
| 5,153,842 A | 10/1992 | Dlugos, Sr. et al. |
| 5,181,786 A | 1/1993 | Hujink |
| 5,214,409 A | 5/1993 | Beigel |
| 5,214,410 A | 5/1993 | Verster |
| 5,218,343 A | 6/1993 | Stobbe et al. |
| 5,254,974 A | 10/1993 | Rebers et al. |
| 5,288,980 A | 2/1994 | Patel et al. |
| 5,317,309 A | 5/1994 | Vercellotti et al. |
| 5,361,071 A | 11/1994 | van Zon |
| 5,365,516 A | 11/1994 | Jandrell |
| 5,367,291 A | 11/1994 | Fockens |
| 5,396,224 A | 3/1995 | Dukes et al. |
| 5,426,667 A | 6/1995 | van Zon |
| 5,428,214 A | 6/1995 | Hakkers et al. |
| 5,446,701 A | 8/1995 | Utke et al. |
| 5,543,797 A | 8/1996 | Hochstein et al. |
| 5,596,313 A | 1/1997 | Berglund et al. |
| 5,608,380 A | 3/1997 | Hogen Esch |
| 5,671,362 A | 9/1997 | Cowe et al. |
| 5,709,942 A | 1/1998 | Leydon et al. |
| 5,764,147 A * | 6/1998 | Sasagawa et al. ............ 340/571 |
| 5,874,896 A | 2/1999 | Lowe et al. |
| 5,881,846 A | 3/1999 | French et al. |
| 5,942,978 A | 8/1999 | Shafer |
| 5,955,951 A | 9/1999 | Wischerop et al. |
| 6,061,914 A | 5/2000 | Legrand |
| 6,125,972 A | 10/2000 | French et al. |
| 6,155,087 A | 12/2000 | Necchi |
| 6,181,248 B1 | 1/2001 | Fockens |
| 6,380,894 B1 | 4/2002 | Boyd et al. |
| 6,486,768 B1 | 11/2002 | French et al. |
| 6,486,769 B1 | 11/2002 | McLean |
| 6,497,125 B1 | 12/2002 | Necchi |
| 6,512,478 B1 * | 1/2003 | Chien ..................... 342/357.25 |
| 6,703,934 B1 | 3/2004 | Nijman et al. |
| 6,750,765 B1 * | 6/2004 | van Wijk ..................... 340/505 |
| 6,762,691 B2 | 7/2004 | Piazza |
| 6,837,427 B2 | 1/2005 | Overhultz et al. |
| 6,861,954 B2 | 3/2005 | Levin |
| 6,951,305 B2 | 10/2005 | Overhultz et al. |
| 6,975,205 B1 | 12/2005 | French et al. |
| 7,020,501 B1 | 3/2006 | Elliott et al. |
| 7,021,535 B2 | 4/2006 | Overhultz et al. |
| 7,046,149 B1 | 5/2006 | Badenhop et al. |
| 7,061,367 B2 | 6/2006 | Mosgrove et al. |
| 7,084,766 B2 | 8/2006 | Sayegh et al. |
| 7,084,769 B2 | 8/2006 | Bauer et al. |
| 7,109,867 B2 | 9/2006 | Forster |
| 7,148,804 B2 | 12/2006 | Salesky et al. |
| 7,148,805 B2 | 12/2006 | Hogan |
| 7,161,489 B2 * | 1/2007 | Sullivan et al. ............ 340/572.4 |
| 7,194,880 B2 | 3/2007 | Necchi |
| 7,225,903 B2 | 6/2007 | Nebolon et al. |
| 7,233,241 B2 | 6/2007 | Overhultz et al. |
| 7,287,491 B2 | 10/2007 | Zents et al. |
| 7,304,574 B2 * | 12/2007 | Romer et al. .............. 340/572.1 |
| 7,304,591 B2 | 12/2007 | Raphaeli |
| 7,310,070 B1 | 12/2007 | Hardman et al. |
| 7,336,180 B2 | 2/2008 | Sayegh et al. |
| 7,336,183 B2 | 2/2008 | Reddy et al. |
| 7,342,495 B2 | 3/2008 | Sayegh |
| 7,374,096 B2 | 5/2008 | Overhultz et al. |
| 7,378,967 B2 * | 5/2008 | Sullivan et al. ............ 340/572.2 |
| 7,394,376 B1 | 7/2008 | Sayegh et al. |
| 7,405,661 B2 | 7/2008 | Badenhop et al. |
| 7,420,461 B2 | 9/2008 | Nebolon et al. |
| 7,423,516 B2 | 9/2008 | Overhultz |
| 7,443,298 B2 | 10/2008 | Cole et al. |
| 7,450,024 B2 * | 11/2008 | Wildman et al. ............. 340/669 |
| 7,466,224 B2 | 12/2008 | Ward et al. |
| 7,504,952 B2 | 3/2009 | Kaplan et al. |
| 7,510,123 B2 | 3/2009 | Overhultz et al. |
| 7,511,604 B2 | 3/2009 | Raphaeli et al. |
| 7,535,337 B2 | 5/2009 | Overhultz et al. |
| 7,549,579 B2 | 6/2009 | Overhultz et al. |
| 7,570,161 B2 | 8/2009 | Necchi |
| 7,583,195 B2 | 9/2009 | Chua et al. |
| 7,604,178 B2 | 10/2009 | Steward |
| 7,636,062 B2 | 12/2009 | Ward et al. |
| 7,649,490 B2 | 1/2010 | Park et al. |
| 7,652,576 B1 * | 1/2010 | Crossno et al. ............ 340/572.1 |
| 7,657,740 B2 | 2/2010 | Numao et al. |
| 7,717,326 B2 | 5/2010 | Kumhyr et al. |
| 7,733,836 B2 | 6/2010 | Huseth |
| 7,755,485 B2 | 7/2010 | Howard et al. |
| 7,782,207 B2 | 8/2010 | Gillard et al. |
| 7,791,485 B2 * | 9/2010 | Lahiri ....................... 340/572.3 |
| 7,800,490 B2 | 9/2010 | Allen et al. |
| 7,952,464 B2 | 5/2011 | Nikitin et al. |

| | | |
|---|---|---|
| 7,954,712 B2 * | 6/2011 | Babcock et al. .............. 235/385 |
| 7,994,911 B2 | 8/2011 | Mercier et al. |
| 8,026,814 B1 | 9/2011 | Heinze et al. |
| 2002/0153418 A1 | 10/2002 | Maloney |
| 2003/0128100 A1 | 7/2003 | Burkhardt |
| 2003/0145441 A1 | 8/2003 | Andersson et al. |
| 2003/0160697 A1 | 8/2003 | Sedon et al. |
| 2003/0216969 A1 | 11/2003 | Bauer et al. |
| 2003/0222780 A1 | 12/2003 | Sayegh et al. |
| 2004/0104817 A1 | 6/2004 | Wijk |
| 2004/0160304 A1 | 8/2004 | Mosgrove et al. |
| 2005/0110636 A1 * | 5/2005 | Ghaffari ................... 340/539.27 |
| 2005/0197720 A1 | 9/2005 | Morrison et al. |
| 2005/0236479 A1 * | 10/2005 | Schmidtberg et al. ........ 235/384 |
| 2005/0242921 A1 | 11/2005 | Zimmerman et al. |
| 2005/0242957 A1 | 11/2005 | Lindsay et al. |
| 2005/0270155 A1 | 12/2005 | Sayegh |
| 2006/0022815 A1 | 2/2006 | Fischer et al. |
| 2006/0033662 A1 | 2/2006 | Ward et al. |
| 2006/0049250 A1 * | 3/2006 | Sullivan ....................... 235/385 |
| 2006/0049946 A1 * | 3/2006 | Sullivan et al. ............ 340/572.2 |
| 2006/0059367 A1 | 3/2006 | Yarvis |
| 2006/0081020 A1 | 4/2006 | Hsiao et al. |
| 2006/0092016 A1 | 5/2006 | Modes et al. |
| 2006/0109125 A1 | 5/2006 | Overhultz et al. |
| 2006/0181393 A1 | 8/2006 | Raphaeli |
| 2006/0187042 A1 * | 8/2006 | Romer et al. .............. 340/572.1 |
| 2006/0202033 A1 | 9/2006 | Campero et al. |
| 2006/0208080 A1 | 9/2006 | Overhultz et al. |
| 2006/0214773 A1 | 9/2006 | Wagner et al. |
| 2006/0220862 A1 | 10/2006 | Campero et al. |
| 2006/0220873 A1 | 10/2006 | Campero et al. |
| 2006/0220874 A1 | 10/2006 | Campero et al. |
| 2006/0220875 A1 | 10/2006 | Campero et al. |
| 2006/0220876 A1 | 10/2006 | Campero et al. |
| 2006/0250247 A1 | 11/2006 | Sayegh et al. |
| 2006/0290519 A1 | 12/2006 | Boate et al. |
| 2007/0018787 A1 | 1/2007 | Martinet de Velasco Cortina et al. |
| 2007/0024448 A1 | 2/2007 | Sayegh |
| 2007/0050261 A1 | 3/2007 | Lin |
| 2007/0096873 A1 | 5/2007 | Sadr |
| 2007/0096876 A1 | 5/2007 | Bridgelall et al. |
| 2007/0106518 A1 * | 5/2007 | Wildman et al. ................. 705/1 |
| 2007/0120669 A1 | 5/2007 | Belden, Jr. |
| 2007/0178911 A1 | 8/2007 | Baumeister et al. |
| 2007/0188318 A1 | 8/2007 | Cole et al. |
| 2007/0205896 A1 * | 9/2007 | Beber et al. ................ 340/572.1 |
| 2007/0210920 A1 * | 9/2007 | Panotopoulos ............ 340/572.1 |
| 2007/0222596 A1 | 9/2007 | Kleijn et al. |
| 2007/0257857 A1 | 11/2007 | Marino et al. |
| 2007/0285241 A1 * | 12/2007 | Griebenow et al. ........ 340/572.1 |
| 2007/0290802 A1 | 12/2007 | Batra et al. |
| 2007/0290924 A1 | 12/2007 | McCoy |
| 2008/0012710 A1 | 1/2008 | Sadr |
| 2008/0030422 A1 | 2/2008 | Gevargiz et al. |
| 2008/0039023 A1 | 2/2008 | Ward |
| 2008/0106416 A1 * | 5/2008 | Sullivan et al. ............ 340/572.2 |
| 2008/0122610 A1 | 5/2008 | Muirhead |
| 2008/0143532 A1 * | 6/2008 | Murrah ...................... 340/572.4 |
| 2008/0156047 A1 | 7/2008 | Sayegh |
| 2008/0157979 A1 | 7/2008 | Sayegh |
| 2008/0165014 A1 | 7/2008 | Sayegh |
| 2008/0174404 A1 | 7/2008 | Gopalan et al. |
| 2008/0174437 A1 | 7/2008 | Arguin |
| 2008/0186136 A1 | 8/2008 | Raphaeli et al. |
| 2008/0197982 A1 | 8/2008 | Sadr |
| 2008/0198001 A1 | 8/2008 | Sarma |
| 2008/0224869 A1 | 9/2008 | Kaplan |
| 2008/0246613 A1 | 10/2008 | Linstrom et al. |
| 2008/0273684 A1 | 11/2008 | Profanchik |
| 2008/0274630 A1 | 11/2008 | Shelton et al. |
| 2008/0279307 A1 | 11/2008 | Gaffney et al. |
| 2008/0283599 A1 | 11/2008 | Rasband et al. |
| 2008/0284601 A1 | 11/2008 | Sayegh et al. |
| 2008/0307076 A1 | 12/2008 | Ewing et al. |
| 2009/0022078 A1 | 1/2009 | Patterson et al. |
| 2009/0051536 A1 * | 2/2009 | Lahiri ....................... 340/572.3 |
| 2009/0079573 A1 | 3/2009 | Jiang et al. |
| 2009/0079633 A1 | 3/2009 | Ward |
| 2009/0080423 A1 | 3/2009 | Ewing |
| 2009/0080455 A1 | 3/2009 | Ewing et al. |
| 2009/0091451 A1 | 4/2009 | Jones et al. |
| 2009/0098898 A1 | 4/2009 | Patterson |
| 2009/0103671 A1 | 4/2009 | Raphaeli et al. |
| 2009/0133972 A1 | 5/2009 | Means et al. |
| 2009/0146792 A1 | 6/2009 | Sadr et al. |
| 2009/0167502 A1 | 7/2009 | Erickson et al. |
| 2009/0185505 A1 | 7/2009 | Ripstein et al. |
| 2009/0198529 A1 | 8/2009 | Burkholder et al. |
| 2009/0224918 A1 | 9/2009 | Copeland |
| 2009/0229327 A1 | 9/2009 | Valade, Jr. et al. |
| 2009/0309732 A1 * | 12/2009 | Truscott et al. ............ 340/572.1 |
| 2009/0309736 A1 | 12/2009 | Heurtier |
| 2010/0065362 A1 * | 3/2010 | Shimura et al. ............... 180/219 |
| 2010/0097223 A1 | 4/2010 | Kruest et al. |
| 2010/0102929 A1 | 4/2010 | Haumann |
| 2010/0133126 A1 | 6/2010 | Shute et al. |
| 2010/0141445 A1 * | 6/2010 | Venkatasubramaniyam et al. ............................ 340/571 |
| 2010/0201488 A1 * | 8/2010 | Stern et al. ................... 340/10.1 |
| 2010/0201520 A1 * | 8/2010 | Stern et al. ................. 340/572.1 |

FOREIGN PATENT DOCUMENTS

| | | |
|---|---|---|
| EP | 0 867 108 A1 | 9/1998 |
| EP | 1 316 814 A1 | 6/2003 |
| EP | 1 610 258 A1 | 12/2005 |
| FR | 2 862 999 A1 | 6/2005 |
| GB | 2 205 426 A | 12/1988 |
| JP | 630059812 A | 3/1988 |
| JP | 2000 238817 A | 9/2000 |
| WO | WO 98/16849 A1 | 4/1998 |
| WO | WO 01/06401 A1 | 1/2001 |
| WO | WO 02/103645 A2 | 12/2002 |
| WO | WO 2004/018811 A1 | 3/2004 |
| WO | WO 2006/076348 A2 | 7/2006 |
| WO | WO 2006/081650 A1 | 8/2006 |
| WO | WO 2007/070103 A1 | 6/2007 |
| WO | WO 2007/142595 A1 | 12/2007 |
| WO | WO 2007/146818 A2 | 12/2007 |
| WO | WO 2008/055323 A2 | 5/2008 |
| WO | WO 2008/132269 A1 | 11/2008 |

OTHER PUBLICATIONS

Weinstein, David H., "Alanco Technologies, Inc.", Apr. 23, 2003.*

Bhargava, Hersh, "Building Smart RFID Networks", Jun. 11, 2007.*

Potdar et al., "Tamper Detection for Ubiquitous RFID-enabled Supply Chain", Dec. 31, 2005.*

International Search Report for International Application No. PCT-FR2004-001186, mailed Dec. 17, 2004.

Ward, Andy, et al., "A New Location Technique for the Active Office"; IEEE Personal Communications; Oct. 1997; pp. 42-47.

International Search Report and Written Opinion for International Application No. PCT/US2009/066572, mailed Nov. 8, 2010.

International Search Report and Written Opinion for International Application No. PCT/US2010/049653, mailed Dec. 6, 2010.

International Preliminary Report on Patentability for International Application No. PCT/US2010/049653, mailed Apr. 5, 2012.

Wailgum, Thomas; "RFID Tags Arrive on Store Floor as Retailers Go After ROI"; Network World at http://www.networkworld.com/news/2010/072810-rfid-tags-arrive-on-store.html; Jul. 28, 2010; 2 pages.

International Search Report and Written Opinion for International Application No. PCT/US2010/049520, mailed Mar. 17, 2011; 17 pages.

International Preliminary Report on Patentability from International Application No. PCT/US2010/050561, mailed Apr. 12, 2012.

International Search Report and Written Opinion for International Application No. PCT/US2010/050561, mailed Dec. 6, 2010.

International Search Report and Written Opinion from International Application No. PCT/US2010/051141, mailed Feb. 15, 2011.

International Preliminary Report on Patentability from International Application No. PCT/US2010/051141, mailed Apr. 3, 2012.

International Search Report and Written Opinion from International Application No. PCT/US2010/049656, mailed Dec. 6, 2010.
International Preliminary Report on Patentability from International Application No. PCT/US2010/049656, mailed Apr. 5, 2012.

International Search Report and Written Opinion from International Application No. PCT/US2010/049672, mailed Sep. 12, 2011.

* cited by examiner

| EVENT LOG | | | | | |
|---|---|---|---|---|---|
| DOOR | | DEPARTMENT | | FITTING ROOM | |
| Handbags 11:25 am 9/4/10 | ZONE | Shoes 12:25 pm 9/2/10 | LOST TAG | Handbags 10:55 am 9/1/10 | ZONE |
| Jeans 7:15 pm 9/4/10 | TAMPER | | | | |

RETAIL PRODUCT TRACKING SYSTEM, METHOD, AND APPARATUS

CROSS REFERENCE TO RELATED APPLICATIONS

This patent application claims priority from U.S. Provisional Patent Application No. 61/244,320, filed Sep. 21, 2009, entitled "A Configurable Monitoring Device;" U.S. Provisional Patent Application No. 61/246,393, filed Sep. 28, 2009, entitled "Systems, Methods and Apparatuses for Managing Configurable Monitoring Devices;" U.S. Provisional Patent Application No. 61/246,388, filed Sep. 28, 2009, entitled "A Configurable Monitoring Device;" U.S. Provisional Patent Application No. 61/248,223, filed Oct. 2, 2009, entitled "Employment of a Configurable Monitoring Device as an Inventory Management Tool;" U.S. Provisional Patent Application No. 61/248,228, filed Oct. 2, 2009, entitled "Employment of a Configurable Monitoring Device as a Marketing Tool;" U.S. Provisional Patent Application No. 61/248,242, filed Oct. 2, 2009, entitled "Configurable Monitoring Device Having Bridge Functionality;" U.S. Provisional Patent Application No. 61/248,233, filed Oct. 2, 2009, entitled "Employment of a Configurable Monitoring Device as a Personal Identifier for Facilitating Transactions;" U.S. Provisional Patent Application No. 61/248,239, filed Oct. 2, 2009, entitled "Employment of a Configurable Monitoring Device as a Security Tool;" U.S. Provisional Patent Application No. 61/248,269, filed Oct. 2, 2009, entitled "Key for Commissioning, Decommissioning and Unlocking Configurable Monitoring Devices;" U.S. Provisional Patent Application No. 61/248,196, filed Oct. 2, 2009, entitled "Systems, Methods and Apparatuses for Locating Configurable Monitoring Devices;" this application is a continuation-in-part of U.S. Non-Provisional patent application Ser. No. 12/636,564, filed Dec. 11, 2009, entitled "Systems, Methods, and Apparatuses for Managing Configurable Monitoring Devices;" U.S. Provisional Patent Application No. 61/311,620, filed Mar. 8, 2010, entitled "Employment of a Configurable Monitoring Device as a Security Tool For Library Use;" and this application is a continuation-in-part of U.S. Non-Provisional patent application Ser. No. 12/628,863, filed Dec. 1, 2009, entitled "Configurable Monitoring Device," which are each hereby incorporated herein by reference in its entirety.

TECHNOLOGICAL FIELD

Various embodiments of the present invention relate generally to network and network management technology and, more particularly, relate to the management of networks that include monitoring devices for use in connection with activities associated with one or more articles such as retail products.

BACKGROUND

Conventional retail security systems, such as electronic article surveillance (EAS) systems, operate effectively to prevent shoplifting and the like. However, conventional systems are often limited to the narrow scope of providing security functionality at limited locations in a retail space (e.g., the entrance or exit). For example, an EAS gate located at an exit of a retail business establishment may be configured to alarm when an article with an EAS tag passes through the gate. Other than performing this important alarming functionality, many conventional systems provide nothing more to the users of the systems, such as store owners, store managers, and the like. Additionally, when store owners are considering the purchase and installation of a conventional security system in a retail establishment, the limited functionality offered by the systems can detrimentally affect the cost-benefit analysis of installing and maintaining the system.

BRIEF SUMMARY

Some example embodiments of the present invention are therefore provided that support security system functionality and/or additional functionalities that may be beneficial to store owners, store managers, and customers. For example, some example embodiments support inventory, marketing functionality, and/or advanced security functionality.

According to some example embodiments, various systems, apparatuses, methods and computer program products are provided for leveraging a network for managing articles, such as in a commercial environment. Some embodiments of the present invention utilize servers, routers, monitoring devices, ping nodes, override devices, event detection devices, and other devices for monitoring and managing a commercial environment. While some example embodiments of the present invention involve monitoring devices that include tamper detection functionality (e.g., receive a tamper detection component indication and associated functionality), it is contemplated that some example embodiments need not include such tamper detection functionality and associated hardware and/or software.

BRIEF DESCRIPTION OF THE SEVERAL VIEWS OF THE DRAWING(S)

Having thus described the various example embodiments of the invention in general terms, reference will now be made to the accompanying drawings, which are not necessarily drawn to scale, and wherein:

DETAILED DESCRIPTION

Figure 1:
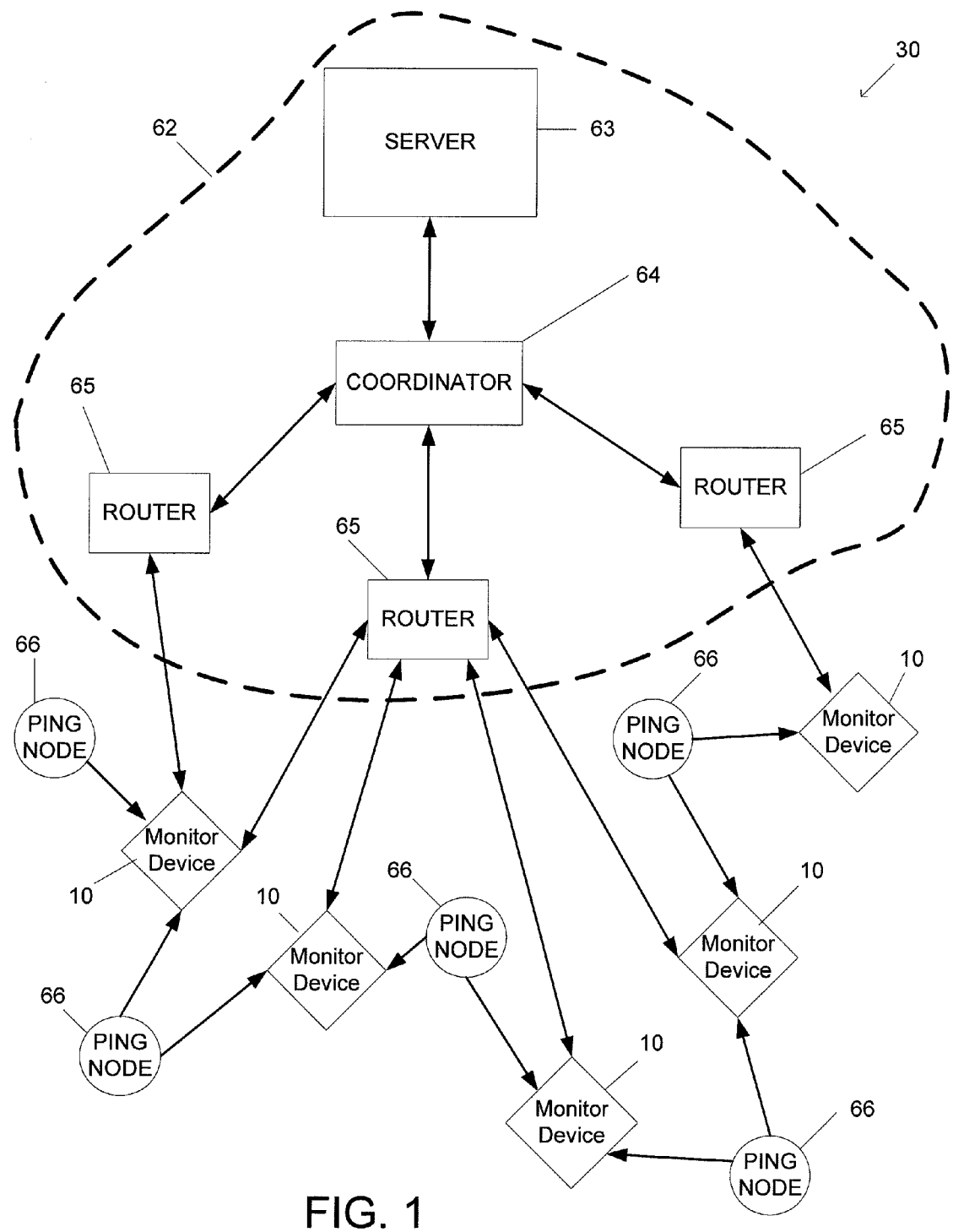
FIG. 1 is a schematic block diagram of a network according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As defined herein a "computer-readable storage medium," which refers to a physical storage medium (e.g., volatile or non-volatile memory device), can be differentiated from a "computer-readable transmission medium," which refers to an electromagnetic signal. Additionally, as used herein, the term "circuitry" refers to not only hardware-only circuit implementations including analog and/or digital circuitry, but at least also to combinations of circuits with corresponding software and/or instructions stored on a computer-readable storage medium.

As indicated above, example embodiments of the present invention may be configured to support various security, inventory, marketing, and/or other functionalities in, for example, a retail sales environment. To do so, a network of monitoring devices, which in some embodiments may be configurable, may be installed within the retail sales environment. A description of some example embodiments of monitoring devices, and the monitoring systems that may support monitoring devices, is provided in U.S. Provisional Patent Application 61/244,320 filed Sep. 21, 2009, entitled "Configurable Monitoring Device," U.S. Provisional Patent Application 61/246,388 filed Sep. 28, 2009, entitled "Configurable Monitoring Device," and U.S. Non-Provisional patent application Ser. No. 12/628,863 filed Dec. 1, 2009, entitled "Configurable Monitoring Device" the contents of which are hereby incorporated by reference in their entirety.

Some embodiments of the present invention provide systems, methods and apparatuses for tracking of retail products. In some embodiments, a network coordinates and tracks retail products connected to and electronically associated with monitoring devices. The network can communicate wirelessly to the monitoring devices to perform varying functions such as inventory tracking, security monitoring, marketing functions, and/or other tasks that may be suited to a commercial or retail environment.

Retail Monitoring Network

I. Network

An exemplary embodiment of the present invention is a network 30, such as the Hummingbird™ monitoring network by Alpha High Tech Solutions, Inc. FIG. 1 shows one embodiment of the network 30, which may comprise a network entity 62, at least one ping node 66, and at least one monitoring device 10.

The network entity 62 may comprise a server 63, coordinator 64, and at least one router 65. The server 63 may be configured to manage and communicate with the coordinator 64. The coordinator 64 may be configured to manage and communicate with the at least one router 65. In the depicted example embodiment, multiple routers 65 communicate with the coordinator 64. The routers 65 may be configured to receive signals from the monitoring devices 10 and communicate that signal, or a modified version of that signal, to the coordinator 64, which then communicates that signal, or a modified version of that signal to the server 63. The routers 65 and coordinator 64 may comprise radio transmitters/receivers for sending and receiving signals. Additionally, in some example embodiments, the coordinator 64 may be connected to the server 63 via a wired connection, which may support higher speeds and bandwidth relative to other wireless communications connections within the network.

The ping nodes 66 may be placed throughout an environment, such as a commercial environment, and the ping nodes 66 may be configured to transmit signals. The monitoring devices 10 can be moved throughout the environment and receive the signals transmitted from both the ping nodes 66 and the routers 65. The monitoring devices 10 may also be configured to transmit signals to the routers 65 to be relayed, via the coordinator 64, to the server 63.

A. Network Entity

Figure 2:
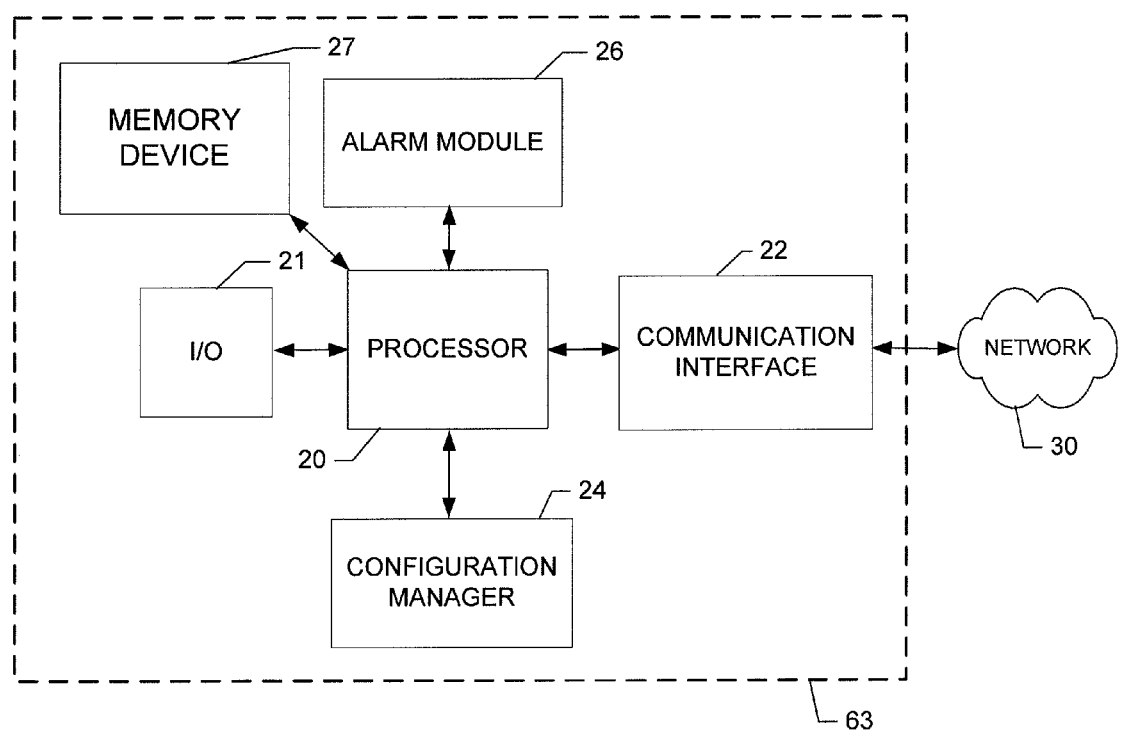
FIG. 2 illustrates an example server with specialized hardware for performing functionality within the role of a server according to an example embodiment.

According to some example embodiments, the network entity 62 comprises a server 63. The server 63, with reference to FIG. 2, may comprise a processor 20, a communication interface 22, a memory device 27, and a configuration manager 24.

In an example embodiment, the processor 20 may be configured (e.g., via execution of stored instructions or operation in accordance with programmed instructions) to control the operation of the server 63. The processor 20 may be embodied in a number of different ways. For example, the processor 20 may be embodied as one or more of various hardware processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 20 may be configured to execute instructions stored in a memory device (e.g., memory device 27 of FIG. 2) or otherwise accessible to the processor 20. The instructions may be permanent or non-volatile (e.g., firmware) or modifiable (e.g., software) instructions. Alternatively or additionally, the processor 20 may be configured to execute hard coded functionality, for example when embodied as an ASIC. As such, whether configured by hardware or software methods, or by a combination thereof, the processor 20 may represent an entity and means (e.g., physically embodied in circuitry) capable of performing operations according to embodiments of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software or firmware instructions, the instructions may specifically configure the processor 20 to perform the algorithms and/or operations described herein when the instructions are executed. The processor 20 may include, among other things, a clock, an arithmetic logic unit (ALU) and logic gates configured to support operation of the processor 20.

The memory device 27 may include, for example, one or more volatile and/or non-volatile memories. In other words, for example, the memory device 27 may be a non-transitory electronic storage device (e.g., a computer-readable storage medium) comprising gates (e.g., logic gates) configured to store data (e.g., bits) that may be retrievable by a machine (e.g., a computing device including a processor such as processor 20). The memory device 27 may be configured to store information, data, applications, instructions or the like for enabling the server 63 to carry out various functions in accordance with exemplary embodiments of the present invention. For example, the memory device 27 may be configured to buffer input data for processing by the processor 20. Additionally or alternatively, the memory device 27 may be configured to store instructions for execution by the processor 20.

The communication interface 22 may be any means such as a device or circuitry embodied in either hardware, software, or a combination of hardware and software that is configured to receive and/or transmit data from/to a network and/or any other device or module in communication with the server 63. The communication interface 22 may also include, for example, an antenna (or multiple antennas) and supporting hardware and/or software for enabling communications with a communication network 30 or other devices (e.g., a monitoring device 10). In some environments, the communication interface 22 may alternatively or additionally support wired communication. As such, for example, the communication interface 22 may include a communication modem and/or other hardware/software for supporting communication via cable, digital subscriber line (DSL), universal serial bus (USB) or other mechanisms. In an exemplary embodiment, the communication interface 22 may support communication via one or more different communication protocols or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques. In other embodiments, communication protocols based on the draft IEEE 802.15.4a standard may be established.

The configuration manager 24 may be configured to manage and direct the processor 20 to perform functions consistent with the various functionalities of the system and network 30. As indicated above, the processor 20 of an example embodiment may be embodied as, include or otherwise control, the configuration manager 24. The configuration manager 24 may be implemented by any means, such as a device or circuitry operating in accordance with firmware/software or otherwise embodied in hardware or a combination of hardware and firmware/software (e.g., processor 20 operating under software control, the processor 20 embodied as an ASIC or FPGA specifically configured to perform the operations described herein, or a combination thereof), thereby configuring the device or circuitry to perform the corresponding functions of the configuration manager 24, as described herein. Thus, in examples in which software is employed, a device or circuitry (e.g., the processor 20 in one example) executing the software forms a structure associated with such means.

According to some example embodiments, the configuration manager 24, with the communications interface, may support wireless bootloading. As such, for example, the configuration manager 24 may be configured to determine and/or control the configuration and thereby also the operation of the server 63 based on the current situation as determined by the server 63 or based on the instructions received by the configuration manager 24.

Roles or configurations of the server 63 may be simple or complex based on, for example, the processing capabilities of the processor 20 and the memory storage of the memory device 27. In this regard, a server 63 may be configured to perform incrementally more processing of data, thus including relatively higher processing power and larger memory storage to support decreased data processing at the monitoring devices, rather than at, for example, a monitoring terminal.

Some embodiments of the server 63 may include a user interface 21, such as an input/output device, for receiving instructions directly from a user. The user interface 21 may be in communication with the processor 20 to receive user input via the user interface 21 and/or to present output to a user as, for example, audible, visual, mechanical or other output indications. The user interface 21 may include, for example, a keyboard, a mouse, a joystick, a display (e.g., a touch screen display), a microphone, a speaker, or other input/output mechanisms. Further, the processor 20 may comprise, or be in communication with, user interface circuitry configured to control at least some functions of one or more elements of the user interface. The processor 20 and/or user interface circuitry may be configured to control one or more functions of one or more elements of the user interface through computer program instructions (e.g., software and/or firmware) stored on a memory device accessible to the processor 20 (e.g., volatile memory, non-volatile memory, and/or the like). In some example embodiments, the user interface circuitry is configured to facilitate user control of at least some functions of the server 63 through the use of a display configured to respond to user inputs. The processor 20 may also comprise, or be in communication with, display circuitry configured to display at least a portion of a user interface, the display and the display circuitry configured to facilitate user control of at least some functions of the server 63.

Other example embodiments of the server 63 may comprise an alarm module 26 used to alarm the server 63 in response to receiving an indication of an event, such as a security breach. The alarm module 26 may also be controlled by the configuration manager 24 through the processor 20.

B. Ping Nodes

As shown in FIG. 1, the ping nodes 66 may be placed throughout a commercial environment and can be used as location beacons. The ping nodes 66 may be configured to transmit signals, namely a ping signal, which may comprise ping node location data. The ping node location data 118 can simply include an identifier, such as a number or other unique indicator that corresponds to that specific ping node 66. In other embodiments, the ping node location data could include local coordinates or other similar data that may be used by the network to identify the location of a transmitting ping node. Ping nodes 66 may comprise antennas and radio transmitters for sending signals. In some embodiments, ping nodes 66 may have a tailored or specifically configured transmission signal strength so as to define the area which their signal can be received by the monitoring devices 10. Accordingly, the ping nodes 66 may be useful in locating monitoring devices 10 and other similar area-based features of the network 30.

Descriptions of example embodiments of ping nodes, and associated network systems, are provided in U.S. Provisional Patent Application No. 61/246,393, filed Sep. 28, 2009, entitled "Systems, Methods and Apparatuses for Managing Configurable Monitoring Devices;" U.S. Provisional Patent Application No. 61/248,196, filed Oct. 2, 2009, entitled "Systems, Methods and Apparatuses for Locating Configurable Monitoring Devices;" and U.S. Non-Provisional patent application Ser. No. 12/636,564, filed Dec. 11, 2009, entitled "Systems, Methods, and Apparatuses for Managing Configurable Monitoring Devices;" the contents of which are hereby incorporated by reference in their entirety.

Ping nodes 66 may be involved in the frequent transmission of communications and therefore power utilization of a ping node 66 may be relatively high. While ping nodes 66 may be battery powered, in some example embodiments, ping nodes 66 may be powered through a building's wired power system. In some embodiments, ping nodes may utilize a battery for back-up power.

In other example embodiments, ping nodes 66 may be configured to interface with not only monitoring devices 10, but also other conventional tags. Thus, for example, ping nodes 66 may include an RFID module and may also interface with conventional RFID tags for reading, tracking, and other purposes. Additionally, since some ping nodes may act in an EAS gate capacity, ping nodes of some embodiments of the present invention may also be configured to interface with conventional EAS tags. In some example embodiments, ping nodes may act as routers of data and/or configuration information between monitoring devices 10 and the network entity 62. As such, in some instances, ping nodes may contain hardware such that they can act as distributors of information, such as configuration information, either as a pass through device through which configuration information is routed, or by passing locally stored configuration information on to a monitoring device 10.

C. Monitoring Device

The monitoring device 10 may be attached to, for example, retail articles and thus may travel throughout the retail environment as customers or service personnel carry articles throughout the retail environment. The monitoring device 10 may be configured to receive the ping signal and corresponding ping node location data from a nearby ping node 66. The monitoring device 10 may also be configured to transmit the ping node location data or a modified version of the ping node location data to, for example, the server 63. Thus, the router 65 can receive the ping node location data and communicate such ping node location data to the server 63, which can then transmit instructions through the router 65 to be received by the monitoring device 10, which the monitoring device 10 may then act upon.

Figure 3:
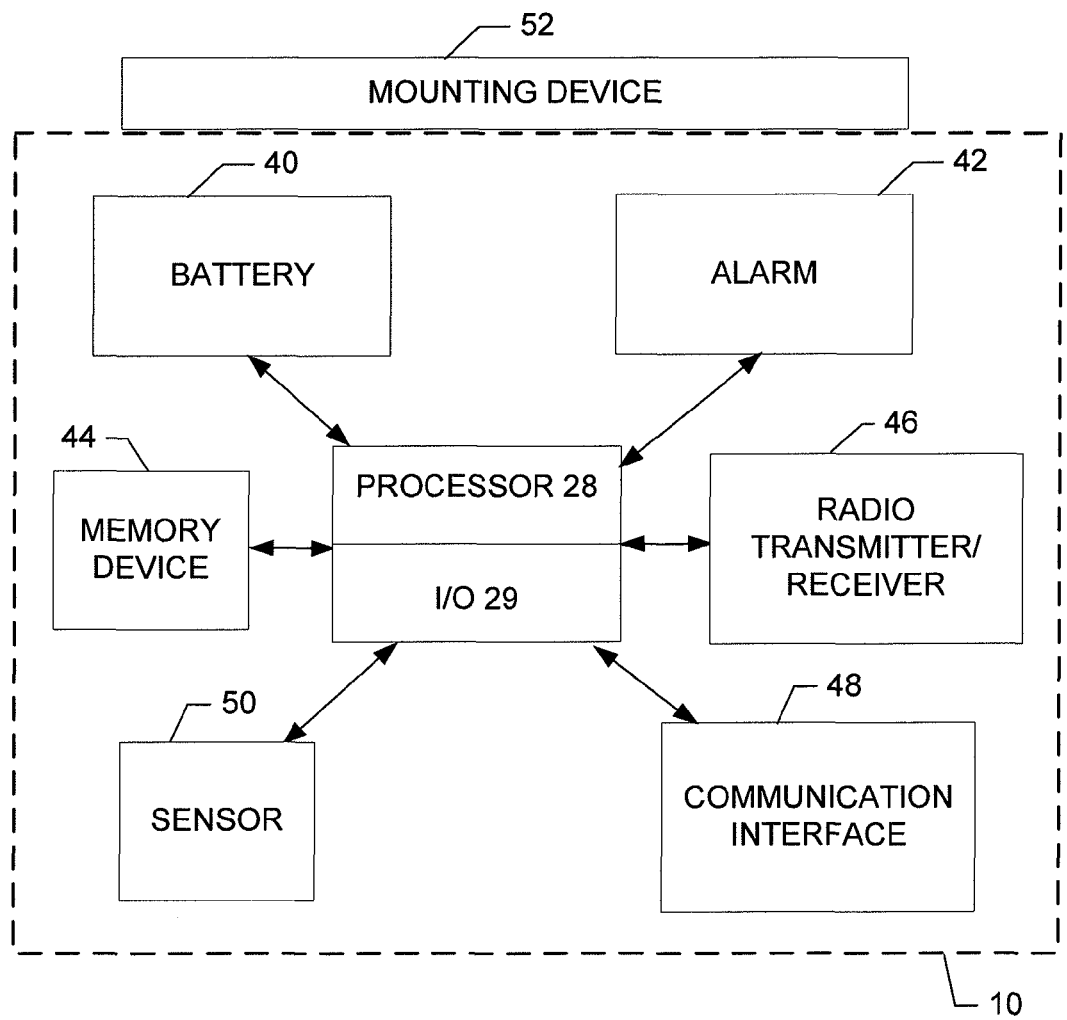
FIG. 3 illustrates an example monitoring device with specialized hardware for performing functionality within the role of a monitoring device according to an example embodiment.

Referring now to FIG. 3, the monitoring device 10, which may also be referred to as a tag, may comprise a processor 28, a radio transmitter/receiver 46, an alarm 42, a battery 40, and a sensor 50. In some embodiments, the monitoring device 10 may include a memory device 44 and/or a input/output device 29. Further, in some embodiments, the monitoring device 10 may comprise a mounting device 52 for attaching to an article, such as a retail article.

The processor 28 may act in accordance with a protocol and receive indications from components of the monitoring device 10. The processor 28 may be the same or similar to processor 20 as described with respect to the server 63 and FIG. 2. In some embodiments, the monitoring device 10 may comprise—a battery 40, and, for example, a low power processor 28 may be more desirable to conserve battery life.

The processor 28 may also include an input/output (I/O) 29, which may include ports (or pins). According to some example embodiments, the I/O 29 may be configured to interface with any number of external devices such as, electronic security devices, tamper detection components, merchandising displays, equipment tags, employee identification cards, audio signal emitting devices (including alarms, speakers, piezo buzzers, etc,), microphones, lights (e.g., light emitting diodes (LEDs) including dual-color LEDs), buttons, keypads, monitors, displays that presents human-readable information (e.g., for changeable pricing labels), sensors (e.g., accelerometers, movement sensors (e.g., jiggle switch, light sensors, temperature sensors, cameras, camera controls (e.g., configured to forward still pictures, security gates, store audio systems, customer counters, lighting switches, employee communicators (e.g., headsets, handheld radios, door strike mats, jewelry case mats, Lojack® devices, global positioning system (GPS) devices, barcode scanners, RFID readers, loyalty card scanners, communications hardware (e.g., USB hardware, Ethernet hardware, RS232 hardware), node devices, network entities (examples of which are discussed herein), and the like. As such, the I/O 29 may be configured to support various functionality that the monitoring device may be configured to perform. For example, an I/O pin or port that is configured to interface with a light sensor may be used to determine whether a protected article has been placed under a coat or otherwise concealed. As another example, an I\O pin or port may interface with an LED to cause the LED to flash at a regular interval to provide a visual indication of the status of the monitoring device and operate as a deterrent to would-be thieves. For yet another example, an I\O pin or port may be configured to interface with a piezo buzzer or other audio device to emit various audible tones by the processor 28. According to various example embodiments, actuation of the jiggle switch and detection of the actuation by the I/O may be a trigger event, which may have a corresponding event indication signal, for the monitoring device to transition from a sleep state to an awake state.

Via the I/O 29, which may be included with the processor 28, various functionalities may be triggered (including the transitioning of roles). Triggering may be initiated either at the monitoring device level or at the network entity or monitoring terminal level. For example, the I/O pins or ports of a monitoring device's processor may interface with a display (e.g., an LCD display) that operates effectively as a price tag. The price depicted on the display may be set to reduce at a given time. In some example embodiments, the time may be monitored by the processor of the tag and when the given time is reached, the processor may direct the I/O and the connected display to present a reduced price. Alternatively, an example that includes triggering at the network entity level may include the time being monitored by the network entity 62, and the network entity 62 may communicate a message including a reduced price, or an indication to reduce the price, to the tag at the given time to trigger the tag to reduce the price accordingly.

The memory device 44 may include, for example, one or more volatile and/or non-volatile memories and may be the same or similar to the memory device 27 of the server 63. As indicated above with respect to the processor 28, the monitoring device 10 may be battery operated and thus a low power consuming memory device 44 may be more desirable. The memory device 44 may be an electronic storage device (e.g., a computer-readable storage medium) comprising gates configured to store data (e.g., bits) that may be retrievable by a machine (e.g., a computing device including a processor such as processor 28). The memory device 44 may be configured to store information, data, applications, instructions or the like, which can be organized in any manner (including as various types of functionality profiles), that enable the monitoring device 10 to carry out various functions in accordance with exemplary embodiments of the present invention. For example, the memory device 44 may be configured to buffer input data for processing by the processor 28. Additionally or alternatively, the memory device 44 may be configured to store instructions for execution by the processor 28.

The communications interface 48 may be any means such as a device or circuitry embodied in either hardware, software, or a combination of hardware and software that is configured to receive and/or transmit data from/to a network and/or any other device or module in communication with monitoring device 10. In this regard, communications interface 48 may include, for example, an antenna (or multiple antennas) and supporting hardware and/or software for enabling communications with a wireless communication network 30 or other devices (e.g., other monitoring devices). Additionally, to support network communications within the monitoring system, the communications interface 48 may support the implementation of a system-wide synchronized clock. Synchronization of the clock may be maintained via a clock signal. Monitoring devices may include real time clock circuitry to support the synchronized clock and to regulate the use of precise communications windows. Additionally or alternatively, the communications interface 48 may include an unsynchronized clock.

In some example embodiments, the communications interface 48 may alternatively or also support wired communication. For example, in some example embodiments, the communications interface may support wired communication via, for example, an RJ45 port. As such, the communications interface 48 may include a communication modem and/or other hardware/software for supporting communication via cable, digital subscriber line (DSL), universal serial bus (USB) or other mechanisms.

In an exemplary embodiment, the communications interface 48 may support communication via one or more different communication protocols or methods. In some embodiments, the communications interface 48 may be configured to support relatively low power, which may yield a relatively small communication proximity area. As such, for example, a low power and short range communication radio (e.g., radio transmitter/receiver 46) may be included in the communication interface 48. In some examples, the radio transmitter/receiver 46 may include a transmitter and corresponding receiver configured to support radio frequency (RF) communication in accordance with an IEEE (Institute of Electrical and Electronics Engineers) communication standards such as IEEE 802.15 or draft standard IEEE 802.15.4a, which may yield a relatively larger communication proximity area. For example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 or 4a based communication techniques, ZigBee, or other low power, short range communication protocols such as a proprietary technique based on IEEE 802.15.4 may be employed. According to some example embodiments, the communications interface 48 may be configured to support an Internet Protocol version 6 (IPV6) stack.

The communications interface 48 may also support a Route Under MAC (Media Access Control) (RUM) protocol or a modified RUM protocol. Regardless of the protocol, the communications interface 48 may be configured to utilize a network identifier, for example stored in the memory device 44, such as a personal area network (PAN) identifier. In some example embodiments, a monitoring device might not be permitted to communicate within the monitoring system without using a matching network identifier.

According to some example embodiments, a monitoring device 10, or the network entity 62, may select a communications channel for use with monitoring system and network communications to implement a fixed channel scheme. A monitoring device may, based on the noise or channel traffic, select a quiet channel. A procedure may be implemented by the network and the monitoring devices that provides for changing channels, for example, when a channel begins to operate poorly. According to some example embodiments, the server 63 may communicate to the ping nodes to change channels, and/or the monitoring devices may perform a channel scan to determine the new channel.

The battery 40 may supply power to the monitoring device 10, either as a constant source of power. The sensor 50 may be any type of sensor, but in some example embodiments, the sensor is a jiggle switch configured to detect movement or handling (e.g., physical handling by a consumer or store employee, etc.) of the monitoring device 10 or an item affixed to monitoring device 10. In some example embodiments, an output of the sensor 50 may cause the monitoring device 10 to "wake-up" and, for example, transmit a message such as a current status message. The alarm 42 may be configured to produce an output, typically in the form of sound energy, although light, vibration or other outputs are also possible. As such, the alarm 42 may include an output device such as one or more of a speaker, vibration pack, light (e.g., a light emitting diode (LED)) or other device. The processor 28 may be configured to control operation of the alarm 42 based on instructions received from the network entity 62. In this regard, based on the current configuration of the monitoring device 10, an alarm condition may be identified and signaled to the alarm 42. In some embodiments, the alarm condition may be associated with a predetermined alarm signal, which the processor 28 may be configured to provide to the alarm 42 to direct an output. The alarm 42 may be configured to provide any number of different outputs in response to the alarm signal including but not limited to a tone or series of tones, a ringing noise, a recorded or synthetic voice output, a solid or flashing light with any of various predetermined flash sequences, a vibration that is either continuous or pulsed with various different pulse sequences, or various other outputs or combinations of the above and/or other outputs.

As indicated above, one or more monitoring devices may be affixed to respective products or other articles (e.g., retail products) to facilitate monitoring of the article to which each monitoring device is affixed. In situations where the monitoring device 10 is affixed to a product or retail article, the mounting device 52 may take a form factor that is tailored for particular product packaging. As such, for example, in some situations, an adhesive, snap fastener, clip, clasp, tether, hook-and-loop fastener, magnetic fastener, pin connector, or other fastening device enabling direct connection of the monitoring device 10 to the corresponding article may be provided as the mounting device 52. One such mounting device may be configured to attach to the shaft of a golf club or similar article such as the device disclosed in U.S. Pat. No. 7,266,979 herein incorporated by reference in its entirety. Other such mounting devices may be configured to attach to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents is commonly owned by the assignee of the present application.

Additionally, the monitoring devices may be configured as a tag or device that may leverage connectively to multiple networks. According to various example embodiments, monitoring system 30 may be configured to interface with any number of other types of independent networks and/or systems. For example, monitoring system 30 and the monitoring device 10 may be configured to interface with independent EAS systems, RFID systems, closed circuit television systems, inventory systems, security systems, sales systems, shipping systems, point of sale terminals, advertising systems, marketing compliance systems, ordering systems, restocking systems, virtual deactivation systems, Lojack® systems, and the like.

For example, in some embodiments, an implementation an embodiment of the system described herein may support monitoring devices that support dual or multiple types of system connectivity. For example, a single monitoring terminal may support monitoring system communications via an IEEE 802.xx protocol, while also being configured to support communications and locating via a Lojack® system. In this regard, the monitoring device may rely upon the IEEE 802.xx protocol for security functionality inside of a retail environment (e.g., inside a store), but may leverage Lojack® system functionality for security or other purposes when the monitoring device is positioned or moved (e.g., due to theft) outside a retail environment, or is otherwise unable to communicate with the monitoring network 30. In some example embodiments, less than all, or a small percentage of all, of the monitoring devices in a system may be configured with dual or multiple tag type functionality to, for example, limit the cost associated with a multiple tag type implementation while still provide some level of security with respect to multiple tag functionality, possibly unbeknownst to would-be thieves.

II. Example Implementation of Network

Figure 4:
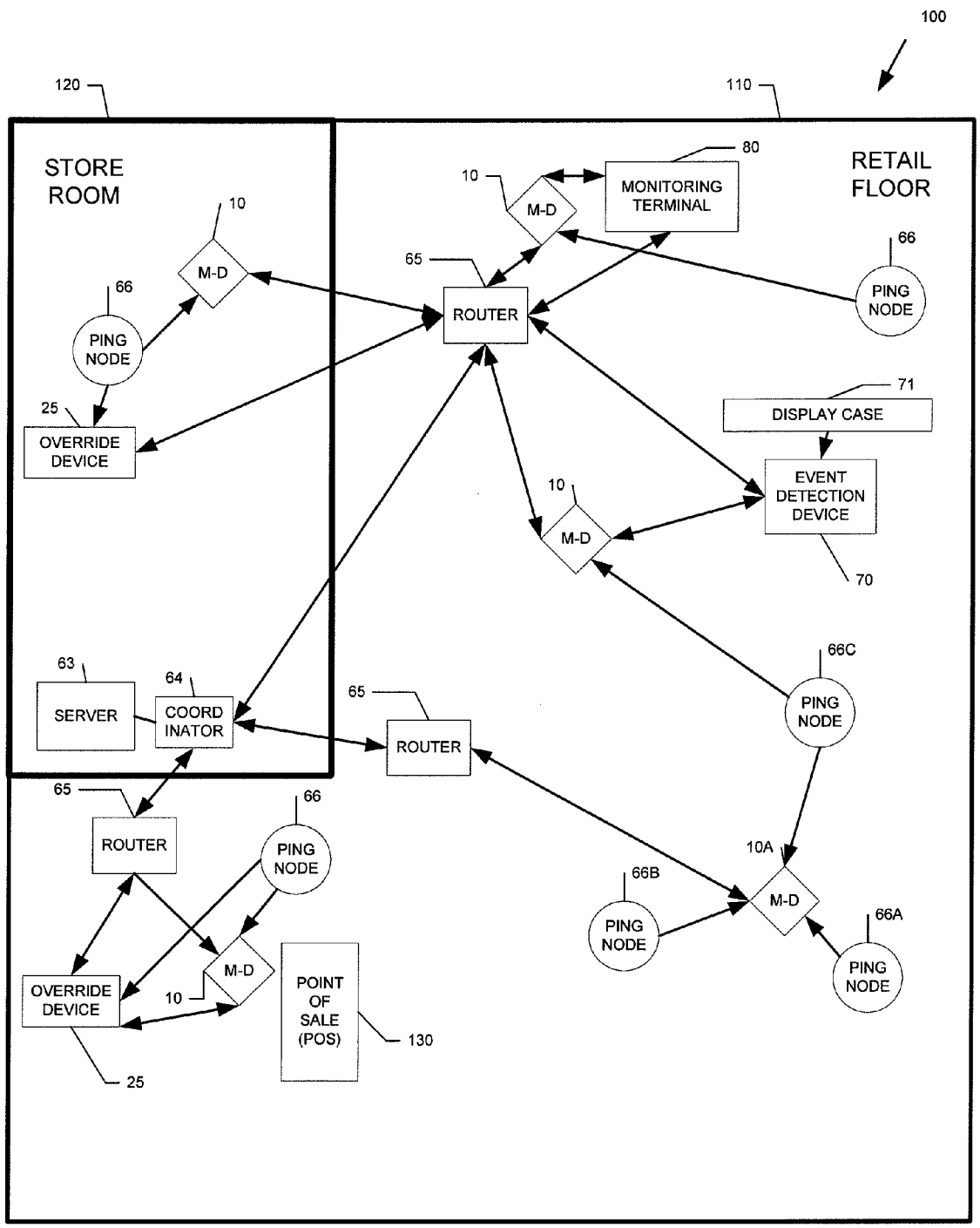
FIG. 4 illustrates a diagram of a network implemented in an example retail environment in accordance with an example embodiment of the present invention.

FIG. 4 shows an example embodiment of the network 30 in a typical commercial environment 100. The commercial environment 100 is divided into a retail floor 110, store room 120, and a point of sale desk 130. The retail floor 110 is a sales floor where articles are displayed on sale for customers to buy. The store room 120 is an inventory storage room where extra articles may be stored or prepared before placement on the retail floor 110. The point of sale desk 130 is a check-out counter or other feature of a commercial environment where customers purchase the retail articles.

As illustrated in FIG. 4, the monitoring devices 10 may be scattered throughout the retail floor 110 and may generally correspond to retail articles to which they are likely attached. Ping nodes 66 are also located throughout the retail floor 110. Routers 65 are placed throughout the commercial environment so as to receive signals from the monitoring devices 10 placed throughout the store. The routers 65 are connected to a coordinator 64, which is directly connected to a server 63, which may be located in the back store room 120 or other area.

A. Override Device

The network 30 may further comprise an override device 25, which may also be referred to as a manager's key. The override device 25 may be placed or carried throughout the commercial environment and can be used to decommission monitoring devices 10 as further described below. In this regard, the override device may be utilized as an override device capable of silencing an alarm (e.g., an alarming monitoring device 10) and/or decommissioning a commissioned monitoring device 10. According to some example embodiments, a stationary override device 25 may be located near a point of sale desk 130 for decommissioning purchased articles. In some example embodiments, the override device 25 may be mobile and may be transported throughout the commercial environment 100. Override devices structured in accordance with various embodiments may also include a display (e.g., an LCD display) for alerts as described in greater detail below.

Figure 5:
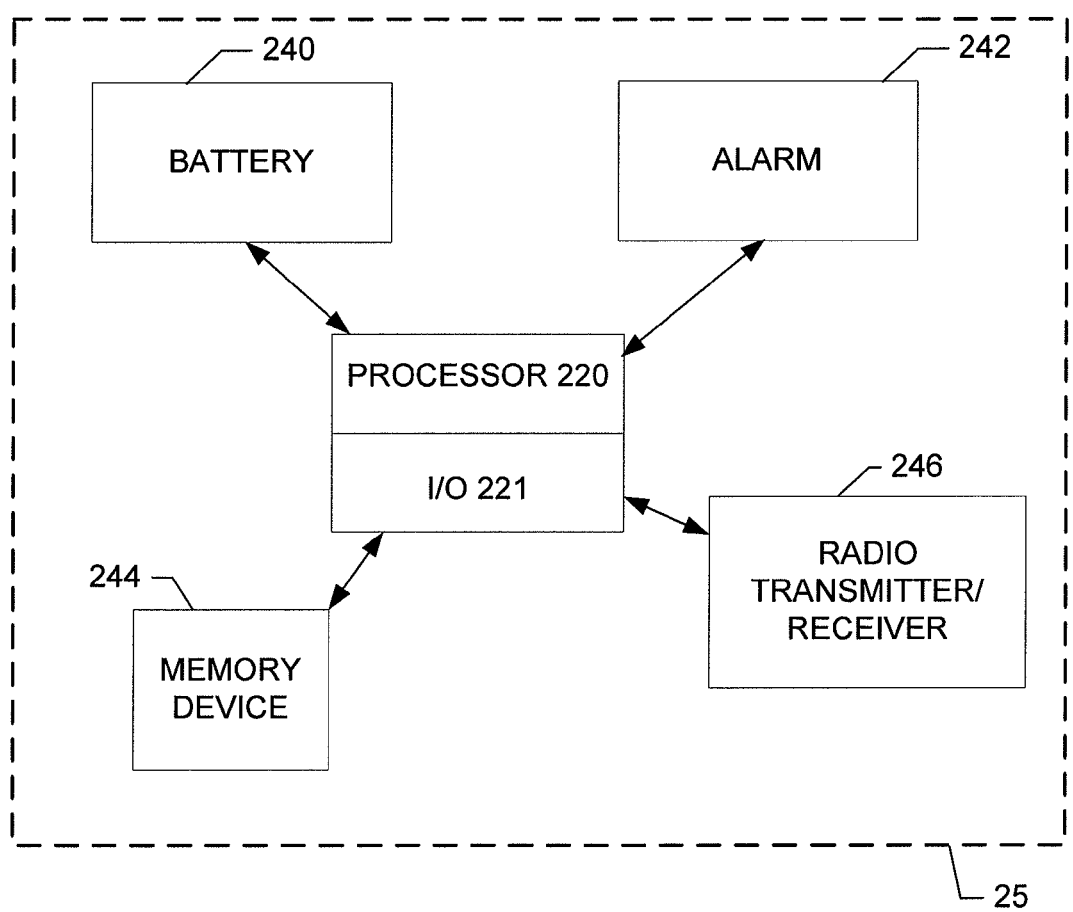
FIG. 5 illustrates an example override device with specialized hardware for performing some of the functionality within the role of a override device according to an example embodiment.

The override device 25, with reference to FIG. 5, may comprise a radio transmitter/receiver 246, a processor 220, a memory device 244, a battery 240, and input/output interface 221. In some embodiments, the override device 25 may comprise an alarm 242. The processor 220 allows for implementation of protocol that may be stored in the memory device 244 and may be the same or similar to processor 20 or 28 described above. The memory device 244 also may be the same or similar to the memory device 27 or 44 described above. The override device 25, like the monitoring device 10, may run on power from a battery 240. According to some example embodiments, to conserve battery power, low power consuming processors and memory devices may be desirable for implementation with the override device 25. The input/output interface 221 may support various types of user interfaces for the override device 25. In some examples, the radio transmitter/receiver 246 may include a transmitter and corresponding receiver configured to support radio frequency (RF) communication in accordance with an IEEE (Institute of Electrical and Electronics Engineers) communication standard such as IEEE 802.15. For example, some embodiments may employ Bluetooth, Wibree, ultra-wideband (UWB), WirelessHART, MiWi or other communication standards in a network such as a wireless personal area network (WPAN). In some cases, IEEE 802.15.4 based communication techniques, ZigBee, or other low power, short range communication protocols such as a proprietary technique based on IEEE 802.15.4 or 4a may be employed. According to some example embodiments, the communications interface 22 may be configured to support an Internet Protocol version 6 (IPV6) stack.

In some embodiments, the override device 25 may require an activation code to function properly as an added security measure. Such embodiments and functionality are further described below with respect to additional embodiments of the override device 25.

B. Event Detection Device

In some embodiments, such as those in accordance with FIG. 4, the network may include event detection devices 70. The event detection device 70 may comprise a radio transmitter/receiver for transmitting signals to the network entity 32. An event detection device 70 may be connected to a device in the commercial environment that is adapted to provide information that is useful to the network. For example, an event detection device may be associated with a light switch or a display case 71 to provide information (e.g., whether the lights are on or the display case is open) to the network. The event detection device 70 receives input from the connected device and sends a signal to the network entity 32 indicating that an event has occurred. For example, the event detection device 70 may be connected to a display case 71 and may be configured to receive input when the display case 71 is opened. Thus, when the display case 71 is opened, the event detection device 70 may send an event signal to the network entity 32 indicating that the display case 71 has been opened.

C. Alert Device

In some embodiments, the network may include an alert device 5. The alert device 5 may be configured to, for example, send and receive transmissions, such as a personal digital assistant ("PDA"), personal computer, laptop computer, server, smart phone, override device, and/or other electrical device capable of communicating. The alert device 5 may be configured to communicate with the network either wirelessly and/or with wired medium. As used herein, "wired medium" and "wired" refer to any type of physical medium that may carry a signal, including at least one a fiber optic cable, electrically conductive wire, among other things. Further, the alert device may be configured to communicate with the network, such as through an external network, like the internet. In some embodiments, the alert device 5 may have a display and/or other type of user interface that may enables the alert device 5 to convey alert messages and/or other data to a user based on data received from the network entity 62. Thus, the alert device 5 can allow for additional monitoring of the network and functions performed by the network.

In some embodiments, the alert device 5 may have similar or the same functionality as the override device 25 discussed herein. In various embodiments, the alert device 5 and the override device 25 are separate devices, both implemented into the functionality of the network as described herein.

D. Monitoring Terminal

In another embodiment, the network 30 may further include a monitoring terminal 80. The monitoring terminal 80 may be placed on the retail floor 110 for display and interaction with customers. The monitoring terminal 80 may comprise a user interface, such as a video or audio output. The monitoring terminal 80 may also comprise a radio transmitter/receiver for receiving signals from either the network entity 32 or the monitoring device 10. Other embodiments of the monitoring terminal 80 comprise processors and memory devices for performing further functions desired by the network 30.

E. Zones of Interest

The network entity 62 may be configured to consider the location information of a monitoring device 10, as sent from the ping node 66, with respect to defined rules, alarm conditions, and alarm responses. In this regard, zones of interest within a retail environment may be defined, and when the network entity 62 determines that a monitoring device 10 has entered a zone of interest, corresponding security or monitoring functionality may be implemented. If a security function is to be implemented, for example, an alarm may be triggered or real-time tracking may be initiated. Other functionalities may alternatively or additionally be triggered.

According to some example embodiments, conditions may be actively or passively monitored (e.g., by the network entity 62 and/or the monitoring devices 10 themselves recording or analyzing data in real-time) and the conditions may be compared to a set of rules to determine whether to initiate a functionality prescribed for a particular rule. The rules that may be specified for employment in accordance with example embodiments of the present invention may be categorized into a zone-based functionality profile, for example, as location or zone-based rules, time-based rules, or identity-based rules. Other rules may additionally or alternatively be provided. Zone-based rules may prescribe a particular action based on the location in which the tag (i.e., monitoring terminal) is currently located. Time-based rules may operate differently based on, for example, the time of day. Thus, for example, certain functionality may be active at certain times of the day, but disabled at other times of the day. Alternatively, functionality may be active, but different, dependent upon the time of day.

Identity-based rules may include rules defining functionality associated with the identity of the person or product associated with a specific event. In this regard, for example, some embodiments may provide monitoring devices to be worn by or carried by specific personnel (e.g., via a tag being located in an employee communication headset) or customers. Monitoring devices associated with individuals in the manner may be referred to as personal monitoring devices or tags. Each personal monitoring device may be directly associated with a corresponding employee or customer and rules for access, presentation content or other functionality may be prescribed accordingly. Alternatively, since each personal monitoring device may be associated uniquely with a corresponding product, specific rules for certain products may be defined. Furthermore, combinations of identity-based rules, time-based rules and location or zone-based rules may also be applied. Thus, for example, rules may define that certain individuals or certain products may only be allowed in certain zones at certain times. Any exceptions to the rules may result in an alarm condition, where, for example, the server 63 sends an alarm message to particular monitoring devices or other security devices.

The above described interaction between the network entity 62, monitoring devices 10, ping nodes 66, override devices 25, event detection devices 70, and monitoring terminals 80 creates a network 30 that can perform multiple functions with regard to a commercial environment.

III. Security Network

The network 30 can perform security and anti-theft functions, such as creating a sophisticated alarm system. The monitoring device 10 may follow protocol to respond to a security event and may communicate with the network entity 62 to, for example, report that a security event has occurred. Thus, the components of the network 30 can work together based on a pre-determined protocol to indicate and respond to a security event.

A. Monitoring Device Functionality

For example, in some embodiments and as described above, the monitoring device 10 may be attached to retail articles and placed throughout the commercial environment. The monitoring devices 10 may further comprise a security feature, such as a tamper detection component or an article detachment component. According to some example embodiments, where, for example, a low cost monitoring terminal is utilized, a monitoring device may not include a tamper detection component and/or associated tamper detection software. The example monitoring device without tamper detection functionality may still, however, provide a visual deterrent to would-be thieves since the monitoring device may be affixed to article is a visible manner. Thus, the network entity 62, in some embodiments, may be configured to recognize the monitoring device 10 and associate a corresponding monitoring device identifier with the signal of the monitoring device 10. Furthermore, in other embodiments, the network entity may be configured to set a state of the monitoring device 10. Such states may be a commissioned state or a decommissioned state.

1. Monitoring Device Identifier

In other embodiments, the monitoring device 10 may transmit a monitoring device identifier to the network entity 62. The network entity 62 can receive the monitoring device identifier and store the monitoring device identifier to memory. This monitoring device identifier may be associated with other information such as ping node location data which corresponds to the last set of ping node location data sent with the monitoring device identifier. In this way, the network entity 62 can track and log locations of multiple monitoring devices 10 through the commercial environment and perform associated security functionality based on the location of the monitoring device 10.

2. Commissioning

Figure 6:
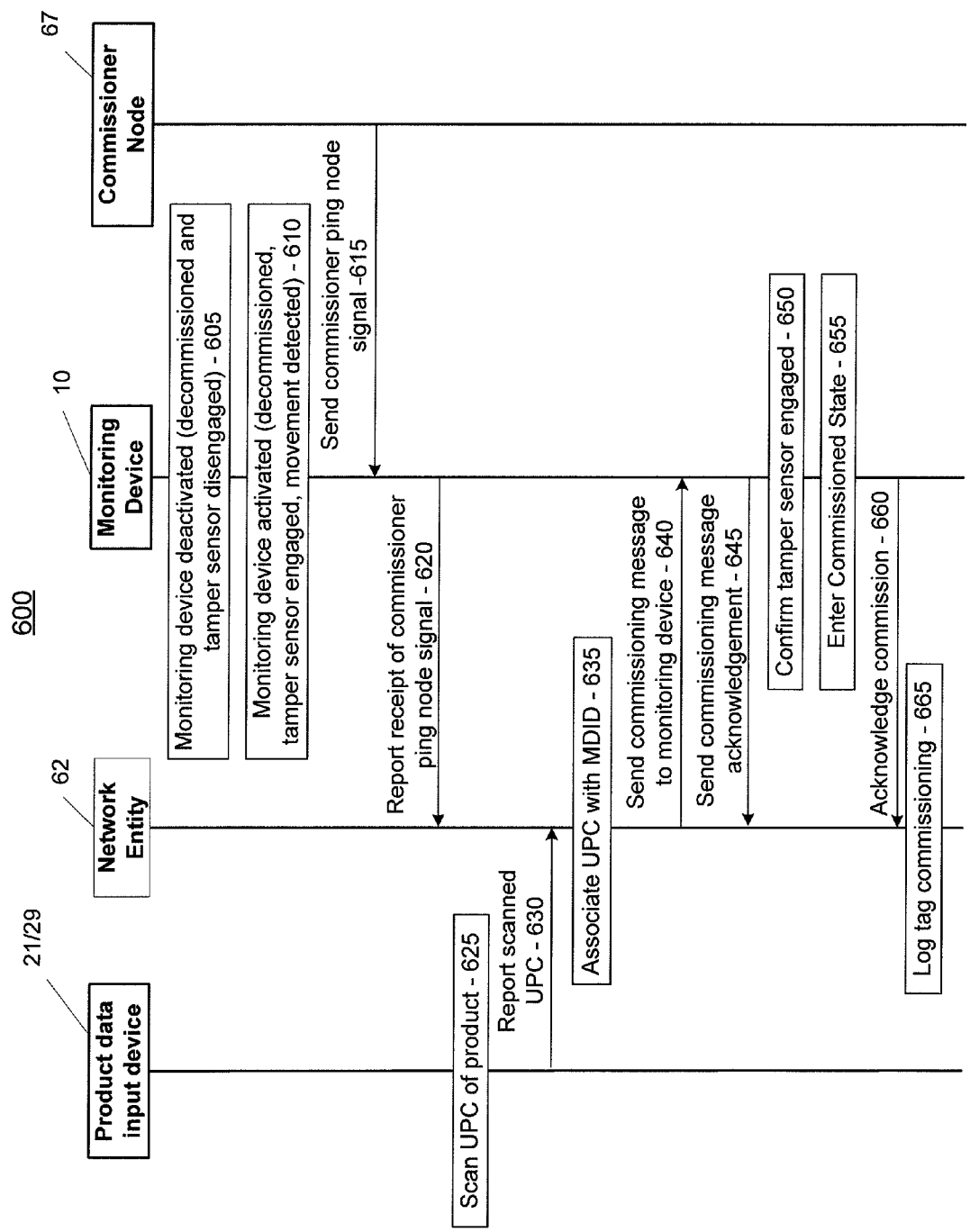
FIG. 6 is a flow chart illustrating a commissioning protocol a network entity, monitoring device, commissioner node, and product input device may be configured to execute according to an example embodiment.

FIG. 6 shows a flow diagram in accordance with some exemplary embodiments discussed herein. It will be understood that each operation, action, step and/or other types of actions shown in the flow diagrams discussed herein, including FIGS. 6-14, and 16-22, and/or combinations of actions in the diagrams, can be implemented by various means. Means for implementing the actions of the diagrams, combinations of the actions in the diagrams, or other functionality of example embodiments of the present invention described herein may include hardware, and/or a computer program product including a computer-readable storage medium (as opposed to or in addition to a computer-readable transmission medium) having one or more computer program code instructions, program instructions, or executable computer-readable program code instructions stored therein. In this regard, program code instructions may be stored on a memory device of an example apparatus and executed by a processor, such as those discussed herein. As will be appreciated, any such program code instructions may be loaded onto a computer or other programmable apparatus (e.g., monitoring device processor 28, server processor 20, override device processor 220, or the like) from a computer-readable storage medium (e.g., monitoring device memory 44, server memory 27, override device memory 244, or the like) to produce a particular machine, such that the particular machine becomes a means for implementing the functions specified in the diagrams' actions, such as those shown in FIGS. 6-14, and 16-22 as discussed herein.

These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the diagrams' actions. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide actions for implementing the functions specified in the diagrams' actions.

In some embodiments, the actions shown in FIG. 6 and the other diagrams discussed herein can be executed sequentially. For example, FIG. 6 shows a commissioning process 600, which is an exemplary process that may be used to commission a monitoring device, such as monitoring device 10 discussed in connection with FIG. 3. Commissioning of a monitoring device may enable, for example, the arming and monitoring functionality of the monitoring device. In some embodiments, commissioning a monitoring device may enable different and/or additional functionality provided by the monitoring device and/or any other device (such as, e.g., an override device 25, ping node 66, and/or any other component of the network 30).

At 605, the monitoring device may be in a deactivated mode. The deactivated mode may comprise the monitoring device being in a power down mode, a sleep mode, and/or any other mode that may involve reduced functionality as compared to an active mode. For example, perhaps to improve battery performance, while in the deactivated mode, the monitoring device may refrain from listening for wireless signals (e.g., actively waiting to receive) or otherwise monitoring wireless signals (e.g., actively waiting to receive and processing signals that are received).

At 610, the monitoring device can be activated. For example, the monitoring device may enter an active mode in response to an electrical, mechanical, electromechanical, optical, magnetic, and/or any other type of switch and/or sensor generating an output signal. A sensor, for example, may be triggered by a locking mechanism being actuated, such as a lanyard post being inserted into a receiving port (e.g., a cable lock lanyard being inserted into its receiving port). In one embodiment, the monitoring device is housed within a cable lock security device as described in commonly owned U.S. Pat. No. 7,474,209 ("the '209 patent") entitled "Cable Alarm Security Device", which was filed Dec. 22, 2005 and is hereby incorporated by reference in its entirety. In such embodiments, the monitoring device may enter the active mode in response to the cable locking plug (referenced as item 27 in the '209 patent) being inserted into the locking channel (referenced as item 38 in the '209 patent) of the security device housing.

Once activated, the monitoring device may remain in a decommissioned mode. While in the decommissioned mode, the monitoring device may not be armed, associated with a product, and/or be operating at less than full capacity. For example, the anti-tamper functionality of the monitoring device (such as detecting the cutting or other breaking of a connection provided by a cable (i.e., item 3 of the '209 patent) lanyard that conducts electricity) and/or location based alarming functionality of the monitoring device (discussed further below) may remain disarmed until the monitoring device enters a commissioned mode. Other functionality of the monitoring device may be activated. For example, when activated, a user interface may illuminate or begin blinking periodically (e.g., a light emitting diode may go from OFF to being illuminated green).

While in the active, decommissioned mode, the monitoring device may monitor wireless signals. Upon receiving a ping node signal with its wireless receiver, such as those discussed above, the monitoring device 10 may report a receipt of the ping node signal to the network entity 62. Similarly, in response to the monitoring device's receiver receiving a ping node signal sent by a commissioner node 67 at operation 615, the monitoring device's processor can be configured to generate a report or other type of message that indicates the monitoring device has received the commissioner ping node signal. The commissioner node 67 may be configured the same or similar to a ping node 66, but may be referenced by the network entity 62, through the ping node location data associated with the commissioner ping node signal, as a commissioner node. Thus, the commissioner ping node signal may include, for example, location information (such as ping node location data or other identifier), which may be included or otherwise referenced in the data included in the message generated by the processor of the monitoring device. The processor of the monitoring device may also include other data, such as a monitoring device identifier (e.g., serial number preprogrammed into the monitoring device). The monitoring device's processor may then provide the message including the location data to the monitoring device's wireless transmitter.

At 620, the monitoring device can be configured to report receipt of the commissioner ping node location data and/or other type of signal to the network entity (e.g., the server). In the depicted embodiment, the server may be configured to determine from the message generated by the monitoring device whether or not the monitoring device is in proximity with a commissioner ping node 67. The server may also be configured to determine whether or not the monitoring device is commissioned and/or should be commissioned.

In response to determining that the monitoring device is not commissioned and/or should be commissioned, the server may receive product information from a product data input device, such as the input/output device 21/29 of either the network entity 62 or the monitoring device 10. For example, the product information may include at least one universal product code and/or any other data generated by, for example, a barcode scanner at 625. In other embodiments, such product information may be obtained from an RFID reader in connection with interrogating a tagged article or simply manually input into a terminal by a retail employee. Other conventional product information entry techniques may be used as will readily be apparent to one of skill in the art in view of this disclosure.

The product information can be sent to the network entity at 630. In some embodiments, the network entity may simply receive data at 620 and 630 simultaneously or near simultaneously or within a given period of time because a user is physically attaching the monitoring device to an item and scanning the barcode associated with the item (e.g., such as a traditional price monitoring device having a barcode). In other embodiments, the server may send a request (not shown) for product information to the product data input device in response to receiving the message from the monitoring device at 620.

At 635, the network entity can associate the product information with the monitoring device identifier and store the respective information with the association in a storage device, such as the memory device 27 of the network entity 62. At 640, the network entity 62 can send a commissioning message to the monitoring device, which may include an instruction for the monitoring device to execute one or more commissioning-related protocols. For example, the commissioning message can be transmitted in response to the network entity determining that the ping node location data received from the monitoring device is associated with a commissioning ping node 67.

The monitoring device may send a commissioning message acknowledgement message at 645 and then execute one or more commissioning actions and/or pre-commissioning confirmation protocols. For example, a pre-commissioning protocol may occur at 650 that involves the monitoring device confirming the tamper sensor is properly engaged (e.g., that a signal is being passed through an electrically conductive lanyard). The pre-commissioning actions may enable the monitoring device to determine, for example, that the monitoring device is not experiencing a fault, alarm and/or other condition that may reduce the monitoring device's effectiveness when commissioned. For example, if the cable lanyard is damaged before the monitoring device is commissioned, the monitoring device may be unable to detect further damage caused by tampering while commissioned.

At 655, the monitoring device may be configured to execute one or more commissioning protocols. For example, a user interface included in the monitoring device (e.g., a light emitting diode) may change (e.g., from green to red). The user interface change may be in response to an instruction sent by the network entity to the monitoring device and/or the monitoring device may be configured to automatically change the user interface in response to being commissioned. In this manner, the user may be given a visual indication as to the current mode of the monitoring device.

The processor of the monitoring device may then generate and transmit at 660, using the wireless transmitter, a commissioned acknowledgement message. The commissioned acknowledged message may include, for example, the monitoring device's identifier as well as an indication that the commissioning of the monitoring device was successful. Should a fault or other type of error occur during the commissioning process of 655, the monitoring device may transmit an error report at 660.

In response to receiving the commissioned acknowledgement message, the server may store an indication that the monitoring device has been commissioned at 665, such as a commissioned state event. The indication may be stored, for example, in the same and/or different storage device(s) as those used to store the product information associated with the monitoring device.

Further to the discussion elsewhere herein, while in the commissioned state, the processor of the monitoring device can be further configured to monitor for an alarm condition.

As another example, the processor can be configured to periodically monitor wireless signals while in the commissioned state and/or in response to receiving an indication from a sensor (such as a jiggle switch or other type of motion detector). The processor can also be configured to alarm in response to input from a tamper detection component or in response to the locking mechanism being disengaged while in the commissioned state.

Additionally or alternatively, in response to the monitoring device becoming commissioned, the network entity may begin monitoring for alarm states or alarm indications associated with the monitoring device, some examples of which are discussed herein. The processor of the network entity can also be configured to receive an alarm indication from the monitoring device, the alarm indication indicating the monitoring device is in an alarm state, and in response to receiving the alarm indication, log or otherwise store data associated with the alarm indication. For example, the alarm indication may indicate that the monitoring device's lock has been disengaged while the monitoring device is commissioned.

3. Decommissioning

Figure 7:
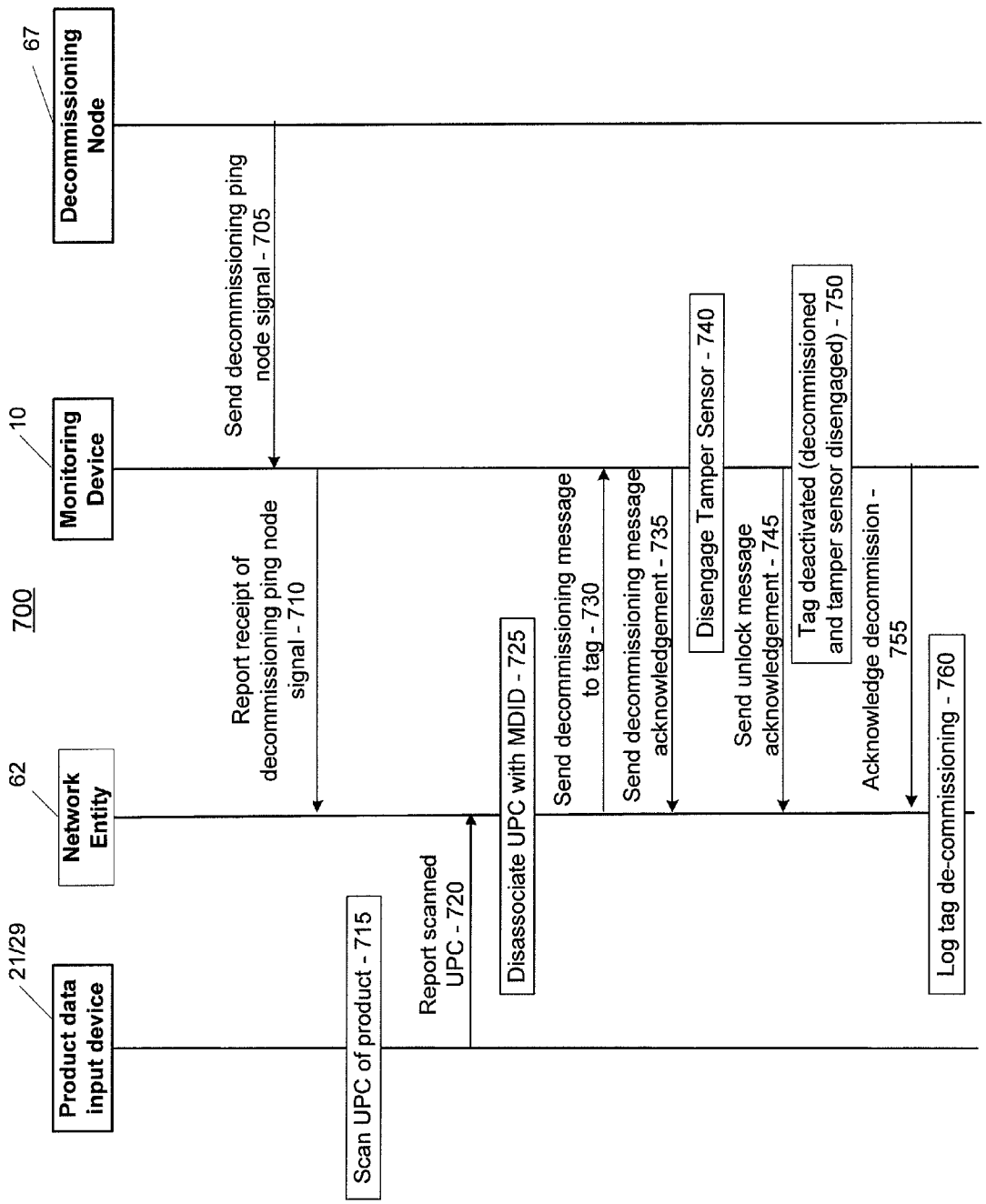
FIG. 7 is a flow chart illustrating a decommissioning protocol a network entity, monitoring device, decommissioning node, and product input device may be configured to execute according to an example embodiment.

FIG. 7, similar to FIG. 6, shows a flow diagram in accordance with some exemplary systems, methods and/or computer program products discussed herein. In some embodiments, the actions shown in FIG. 7 and the other diagrams discussed herein can be executed sequentially. For example, FIG. 7 shows commissioning process 700, which is an exemplary process that may be used to decommission a monitoring device, such as monitoring device 10 discussed in connection with FIG. 3. Decommissioning of a monitoring device may enable, for example, the monitoring device to conserve battery power, while also or instead disabling arming and monitoring functionality of the monitoring device. In some embodiments, decommissioning a monitoring device may enable and/or disable different and/or additional functionality provided by the monitoring device and/or any other device (such as, e.g., an override device 25, ping node 66, and/or any other component of the network 30).

At the start of process 700, the monitoring device may be in a commissioned, active mode, such as that discussed in connection with FIG. 6. While the commissioned mode, the monitoring device may listen for wireless signals (e.g., actively waiting to receive) or otherwise monitor wireless signals (e.g., actively waiting to receive and processing signals that are received). For example, the monitoring device may be configured to process received wireless signals sent by various ping nodes. At 705, the monitoring device may receive a wireless signal that was sent by a decommissioning ping node 69. The decommissioning ping node 69 may, in some embodiments (and similar to some types of commissioning ping nodes 67), function like any other ping node discussed above. The monitoring device and/or server can be configured to distinguish certain ping nodes as commissioning and/or decommissioning ping nodes based on data transmitted (periodically, consistently, randomly, or otherwise) by the ping node.

At 710, the monitoring device can be configured to report to the network entity 62 receipt of the decommissioning ping node signal and/or other type of signal. The network entity may be configured to determine from the message generated by the monitoring device whether or not the monitoring device is in proximity with a decommissioning ping node 69. The network entity may also be configured to determine whether or not the monitoring device is currently commissioned and/or should be decommissioned.

In response to determining that the monitoring device is commissioned and/or should be decommissioned, the server may receive product information from a product data input device, such as the input/output device 21, 29 of the network entity 62 or monitoring device 10. For example, the product information may include at least one universal product code and/or any other data generated at 715 by, for example, a barcode scanner located at a cash register or other payment area. As another example, an override device 25, such as those discussed in connection with FIG. 5, may function as a decommissioning ping node in some embodiments.

The product information can be sent to the network entity at 720. In some embodiments, the network entity may simply receive data at 710 and 720 simultaneously or near simultaneously or within a given period of time because a user is accepting payment for the purchase of the item to which the monitoring device is attached and/or otherwise actuating the decommissioning of the monitoring device. In other embodiments, the network entity may send a request (not shown) for product information to the product data input device in response to receiving the message from the monitoring device at 710.

At 725, the network entity can disassociate the product information with the monitoring device identifier, add an indication that the monitoring device is unassociated with any item, and/or delete information previously stored from one or more storage devices, such as the memory device 27 of the network entity 62. At 730, the network entity can send a decommissioning message to the monitoring device, which may instruct the monitoring device to execute one or more decommissioning-related protocols. For example, the decommissioning message can be transmitted in response to the network entity determining that the ping node location data received from the monitoring device is associated with a decommissioning ping node 69.

The monitoring device may send a decommissioning message acknowledgement message at 735 and then execute one or more decommissioning actions and/or pre-decommissioning confirmation protocols. For example, a pre-decommissioning protocol may occur at 740, which involves the monitoring device disengaging the tamper sensor (e.g., begin ignoring a signal that is being passed through an electrically conductive cable lanyard or disconnecting such signal through operation of a switch). The pre-decommissioning actions may also or instead enable the monitoring device to determine, for example, that the monitoring device is not experiencing a fault, alarm and/or other condition that may reduce the monitoring device's effectiveness when decommissioned. For example, if the battery is too low to be re-activated after being deactivated for a period of time, the monitoring device may generate a message that is sent to the network entity and causes the network entity to determine that the monitoring device should be charged before being re-activated and/or re-commissioned.

At 745, the monitoring device may be configured to send a signal acknowledging, for example, that the tamper sensor and/or other locking mechanism has been disengaged. At 750, the monitoring device's processor may execute one or more decommissioning protocols. For example, a user interface included in the monitoring device (e.g., a light emitting diode) may change (e.g., from red to green). For example, the decommissioning message may include an instruction to change a user interface of the monitoring device and/or the monitoring device may be configured to change the user interface automatically in response to being decommissioned.

At 755, the processor of the monitoring device may then generate and transmit, using the wireless transmitter, a decommissioned acknowledgement message. The decommissioned acknowledged message may include, for example, the monitoring device's identifier as well as an indication that the decommissioning of the monitoring device was successful. Should a fault or other type of error occur during the decommissioning process of 750, the monitoring device may transmit an error report at 755.

In response to receiving the decommissioned acknowledgement message, the network entity may store an indication that the monitoring device has been decommissioned at 760, such as a decommissioned state event. The indication may be stored, for example, in the same and/or different storage device(s) as those used to store the product information associated with the monitoring device.

Further to the discussion elsewhere herein, while in the commissioned state, the processor of the network entity can be further configured to, for example, cease monitoring for alarm states associated with the monitoring device in response to storing the decommissioned confirmation message. Additionally or alternatively, while in the decommissioned state, the processor of the monitoring device can be further configured to ignore an alarm condition. As another example, the monitoring device's processor may be configured to enable the unlocking of the locking mechanism (e.g., cable lanyard locking mechanism) absent an alarm condition (e.g., in addition to receiving the decommissioning signal from the server). In some embodiments, the monitoring device may remain in a decommissioned, active state until, for example, the locking mechanism and/or component used therewith (e.g., inserted therein) is unlocked, disengaged, removed, and/or otherwise physically unlocked after being decommissioned.

4. Monitoring Device Protocol

The monitoring device 10 may be configured to receive an indication of a security event from the security feature (e.g., tamper detection component, I/O sensor, etc.) and respond in a pre-determined manner. For example, when commissioned as described above, the monitoring device 10 may respond by alarming. Since the commissioned monitoring devices 10 may be attached to retail articles that may be placed on the retail floor for days or months at a time, and the monitoring devices may be reconfigured for subsequent use, it is desirable to conserve power for the battery 40. Thus, a protocol is configured into the monitoring device 10 to preserve battery life, while still maintaining an effective security network.

Figure 8:
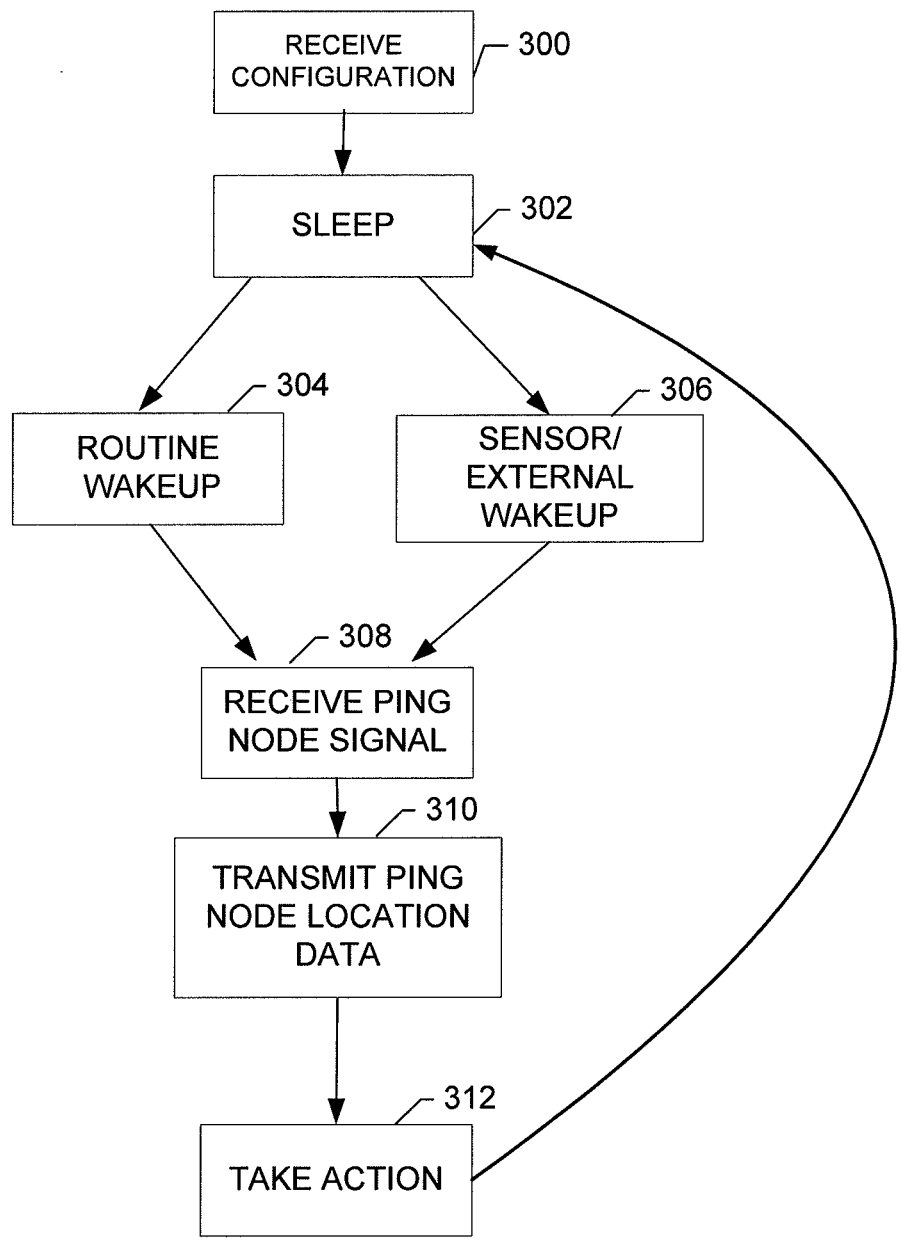
FIG. 8 is a flow chart illustrating a protocol configured for execution by a monitoring device according to an example embodiment.

FIG. 8 illustrates a flow chart detailing the operations that the monitoring device 10, e,g., a commissioned monitoring device, may perform as a security device. At operation 300, the monitoring device 10 is configured for use in the network, such as being commissioned, as further described herein. Then, after a pre-determined amount of time without any signals or sensor indications, the monitoring device 10 may enter a sleep mode, whereby the functions of the monitoring device 10 are powered down except for a low-powered timer and the sensor function, shown in operation 302. The sensor on the monitoring device 10 may be a motion detection device, like a jiggle switch or accelerometer, which indicates to the monitoring device 10 that the monitoring device 10 has been moved. Thus, in some example embodiments, the monitoring device 10 may only be awoken and returned to active operation (e.g., listening for ping signals and reporting to the server) in response to two events. First, during operation 304, the timer may wake up the monitoring device 10 after a defined amount of time has passed. Second, during operation 306, the sensor may detect and indicate that an external event has occurred for which the monitoring device 10 needs to respond. In some embodiments, such an event may include movement of the monitoring device 10 as indicated by, for example, the jiggle switch. Thus, upon waking either by timer or sensor indication, the monitoring device 10 may undergo operation 308, wherein the monitoring device 10 listens for and receives a ping node signal comprising ping node location data from a nearby ping node 66. Then, as shown in operation 310, the monitoring device 10 may transmit the ping node location data to the network entity 62. Once awake, the monitoring device 10 may proceed to the take action, as shown in operation 312, depending on indications received or not received. Thus, the monitoring device 10 may take action by beginning to track, monitor, report, alarm, go back to sleep, or the like.

B. Response Protocol

Figure 9:
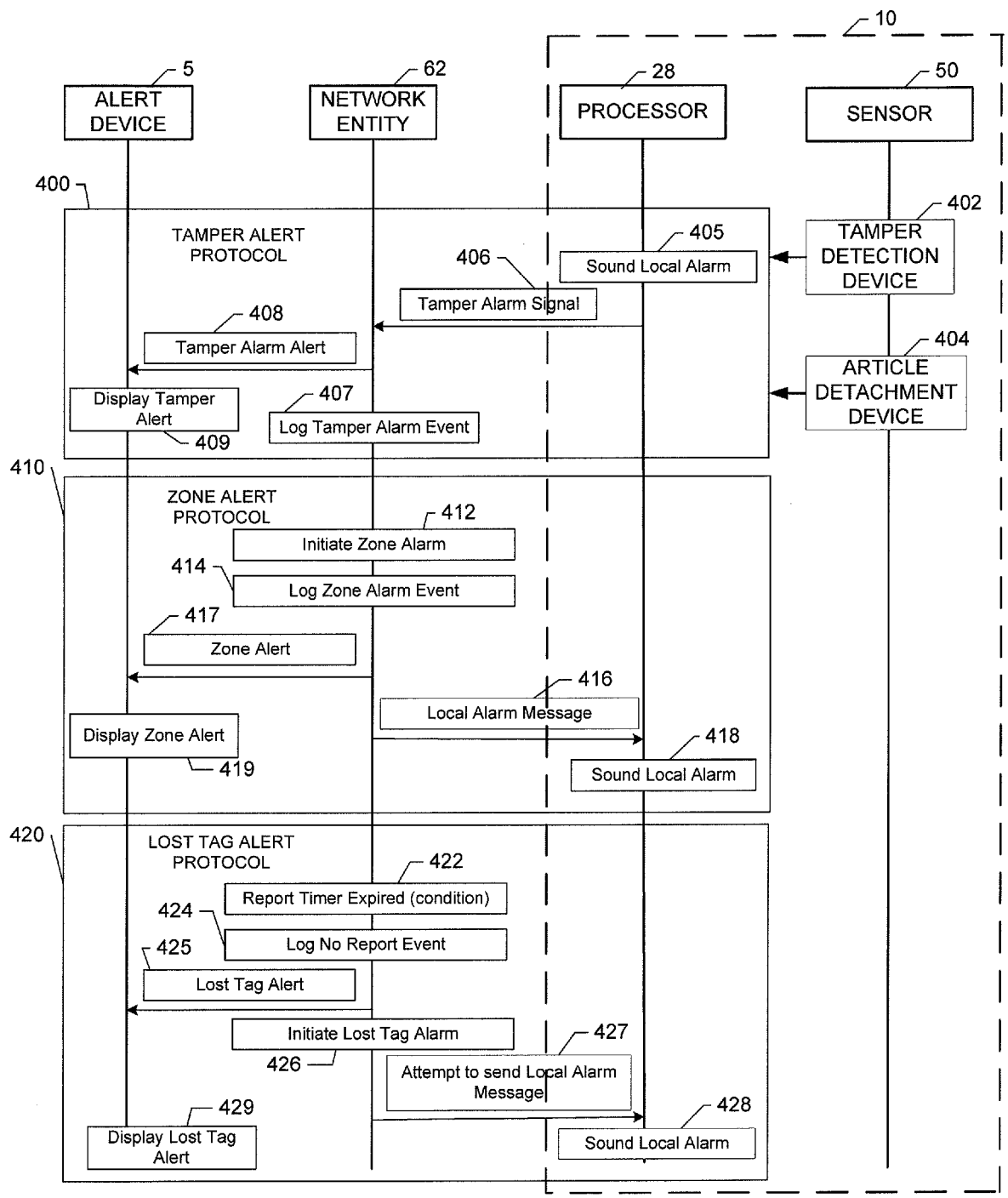
FIG. 9 is a flow chart illustrating a network protocol configured for execution by a network entity, a monitoring device, and an alert device in accordance with some example embodiments.

FIG. 9 shows a flow chart detailing various actions the monitoring device 10, network entity 62, and the alert device 5 may take depending, at least in part, on inputs, signals, or indications provided by sensors (e.g., tamper detection components, article attachment/detachment or mounting devices) of the monitoring device 10.

1. Tamper Alert Protocol

Box 400 details an example tamper alert protocol for detecting a tamper event and responding to receipt of a tamper detection indication from a tamper detection sensor 402 or an article detachment indication from an article attachment/detachment sensor 404 that may be associated with a locking mechanism (e.g., a cable locking mechanism) or mounting device (item 52 of FIG. 3). According to some example embodiments, the tamper detection sensor 402 and the article detachment sensor 404 may be the same sensor. In some example embodiments, the monitoring device 10 may be attached to a retail article through use of a cable wrapped around or through the article, and the tamper detection component may be circuitry configured to monitor the cable for damage (e.g., a cut) or other tampering with the cable. For example, in one embodiment, the tamper detection component could be electronic circuitry configured to: detect current (i.e., breaks or changes in such current) running through the cable or a voltage at an end of the cable, detect changes in the electrical resistance provided by the cable circuit, or other similar indicators of security device tampering that would be apparent to one of ordinary skill in the art in view of this disclosure. Upon receiving an indication from the tamper detection sensor 402 (i.e., tamper detection component) or the article detachment sensor 404, the monitoring device 10 may directly and immediately sound the alarm of the monitoring device at 405 (i.e., without receiving alarm instructions from the network entity). Then, the monitoring device 10 may transmit a tamper alarm signal at 406 to the network entity 62. The network entity 62 will receive the tamper alarm signal and may, in some embodiments, send a tamper alarm alert 408 to an alert device 5. The alert device 5 may be configured to receive the tamper alarm alert and display a tamper alarm alert 409. In other various embodiments, the alert device 5 may have a processor and a memory device, such that the alert device 5 may store the tamper alarm event. The network entity 62 may also log the tamper alarm event at 407 to the server 63 memory.

2. Zone Alert Protocol

Zone alert protocol, detailed in Box 410, comprises the network entity 62 determining that the monitoring device 10 has entered a zone of interest. Certain ping nodes 66 may be located in strategic locations with tailored signal strengths and electromagnetic field broadcast areas to thereby generate a zone of interest to be monitored such as in connection with the storage room 120 shown in FIG. 4. Certain rules or protocols may be stored in the memory of the network entity 62 in association with particular zones of interest (and their associated ping nodes), to generate a zone-based functionality profile. Upon receiving ping node location data from a monitoring device 10 indicating that the monitoring device 10 is located near, for example, the storage room (i.e., the ping node matching the ping node location data is located in the storage room), the network entity 62 may be configured to transmit instructions based on the zone-based functionality profile. An example of such instruction may be an alarm instruction. Thus, the monitoring device 10 may receive the alarm instruction and trigger the alarming functionality of the monitoring device.

In some embodiments, as indicated in FIG. 9, upon receiving ping node location data indicating that the monitoring device 10 has entered a zone of interest (i.e., is associated with a ping node located in a zone of interest), the network entity 62 may initiate a zone alarm 412. Then, the network entity 62 may log the zone alarm event 414 in the memory and may transmit a zone alert message to the alert device 5 at 417. The alert device 5 may then, after receiving the zone alert message, display the zone alert at 419. In other embodiments, the alert device 5 may store the zone alert message to memory. The network entity 62 may also be configured to transmit a local alarm message 416 to the monitoring device 10, which, upon receiving the local alarm message, triggers the alarming functionality of the monitoring device at 418.

In other embodiments, the zone of interest may be a fitting room or a restroom. For such a case, the network entity 62 may receive a ping node signal with ping node location data indicating that the monitoring device 10 has entered the fitting room or restroom (i.e., has become associated with a ping node located in the fitting room or restroom). Then, the network entity 62 may initiate a zone-based functionality profile such as initiating a timer. If the network entity 62 doesn't receive a different ping node signal with different ping node location data (i.e., a ping node located outside the fitting room or restroom and within the retail environment) from the monitoring device 10 before the expiration of the timer, the network entity 62 may enter a pre-determined protocol. For example, the network entity 62 may send an alarm instruction to the monitoring device 10, or the network entity 62 may send an alert message to the alert device 5 indicating the location of the monitoring device 10 and a message, such as "remove article from fitting room." Such an embodiment may be desirable for either security purposes or retail purposes, as the article is more likely to sell on the retail floor then sitting in a fitting room. Other embodiments of the network entity 62 may be programmed to reset the timer upon certain conditions, depending on pre-stored data in the memory, such as whether the room is a restroom or based on the price of the article.

3. Lost Tag Alert Protocol

The network 30 can also be configured to initiate a protocol when an article and attached monitoring device 10 are likely being stolen by being placed into a booster bag. The term booster bag refers to a specially lined (e.g., metallically lined) bag that contains material that prevents or interferes with wireless communications occurring between the monitoring device 10 and network entity 62. A shoplifter may place an article and monitoring device 10 into a booster bag to "hide" the article both from sight and from the network entity 62. Some embodiments of the network 30 comprise a lost tag alert protocol detailed in Box 420.

In some embodiments, the network entity 62 may be further configured to initiate a timer upon receiving ping node location data from a monitoring device 10. If the network entity 62 does not receive another signal from the monitoring device 10 indicating the ping node location data, even if it is the same ping node location data, the network entity may initiate the lost tag alert protocol. In other embodiments, the network entity 62 is configured to distinguish between a signal with ping node location data received from routine waking of the monitoring device 10, and motion detection indication waking of the monitoring device 10. In some example embodiments, the network entity 62 may be further configured to only initiate the timer after receiving ping node location data from a motion detection indication waking of the monitoring device 10.

Upon initiation of the lost tag alert protocol, the network entity 62 may report that the timer has expired at 422. Then the network entity 62 may log a no report event at 424 in memory. The network entity 62 may also be configured to transmit a lost tag alert message to an alert device 5 at 425. The alert device 5 may receive the message and display the lost tag alert at 429. In other embodiments, the alert device 5 may store the lost tag alert message to memory. Additionally or alternatively, the network entity 62 may also be configured to initiate a lost tag alarm at 426 and transmit a local alarm message at 427 to the monitoring device 10. If the monitoring device 10 receives the local alarm message, the monitoring device 10 may start alarming 428 in response to the local alarm message. However, the material lining the booster bag may prevent the signal from reaching the monitoring device 10. But at the very least, the network entity 62 may initiate a lost tag alarm at 426. In one embodiment, the network entity may be configured to transmit local alarm messages to other monitoring devices located proximate the ping node last associated with the monitoring device concealed in the booster bag. In this regard, a shoplifter may find himself surrounded by alarming monitoring devices even if the monitoring devices within the booster bag are not, themselves, alarming.

4. Tracking Protocol

As previously described, some embodiments of the present invention include a network entity 62 that receives and stores location data associated with a monitoring device 10 or group of monitoring devices. Therefore, as a monitoring device 10 moves throughout the commercial environment, the monitoring device 10 may receive new ping node signals with new ping node location data, which the monitoring device 10 may send to the network entity 62. The network entity 62, can thus track the movement of the monitoring device 10 throughout the commercial environment (i.e., associations of the monitoring device with various ping nodes). In some embodiments, the network entity 62 can create a report that effectively tracks the movement of the monitoring device 10, which may, for example, indicate certain shopping patterns or potential consumer interests (e.g., consumers who patronize expensive purse displays often also patronize certain shoe displays) associated with the article attached to the monitoring device 10 being tracked. The network entity 62 may be further configured to generate reports and that may be provided to a user, such as through a user interface or display.

C. Alert Device Functionality

In various embodiments, as indicated above, the alert device 5 may be configured to receive alert messages from the network entity 62 and log or display those messages.

Figures 9A, 9B:
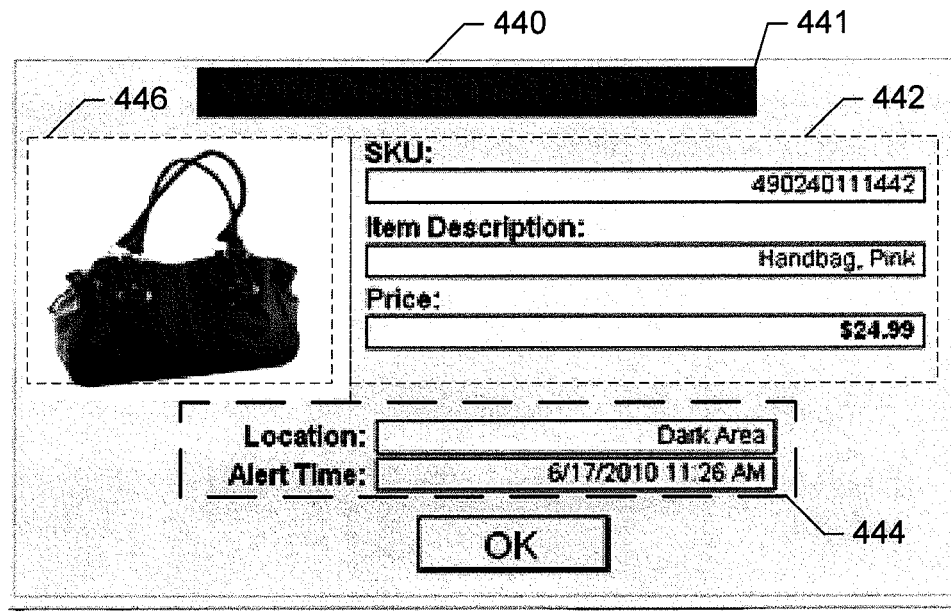
FIG. 9A illustrates an alert message according to an example embodiment.
FIG. 9B illustrates an alert event log according to an example embodiment.

FIG. 9A shows an example of an alert message 440 that may display on an alert device 5. The alert message 440 may have a title 441, indicating the pertinent information concerning the alert. In the depicted embodiment, the title reads "Alert! Tag Enters Dark Area." Such a message may indicate to a user of the alert device that a monitoring device 10 has entered a zone of interest, such as a "dark area" (e.g., an area having no ping node and which is generally not intended to receive retail products). The title may be configured to stand out to a user to draw their eye immediately, such as using boldface type of all caps.

The alert message 440 may further include product information 442 associated with the alert, such as that associated with the monitoring device 10 for which the alert message pertains. In the depicted embodiment, the product information 442 is the stock keeping unit ("SKU") number, item description, and price, although in other embodiments, other product information may be displayed. The alert message may further include event data 444 such as the specific zone of interest associated with the alert, the time of the alert, or some combination thereof. This information may be helpful for the user in logging events or investigating the alert. Further, the alert message 44 may also contain a visual representation of the product 446. In other embodiments, the alert message may be configured to pop-up on the alert device 5 to further draw attention of the user.

FIG. 9B shows an example of an alert event log 450 that may be displayed on an alert device 5, perhaps in response to a query from a user. The alert event log 450 may have set information 452 corresponding to zones of interest, such as a fitting room or a department name. The alert event log may also contain specific alert events and relevant information regarding the event alerts that were indicated to the alert device 5. In the depicted embodiment, the alert event log contains a title of the product for which the alert pertained at 454, the time and date of the alert at 458, and the type of alert that occurred at 456. As such, the alert device 5 can store relevant information about received alerts to memory and form that information to reports or logs. In other embodiments, the network entity 62 may store or log such information and the alert device 5 may be configured to query the network entity 62 for reports or logs of the information.

D. Override Device Functionality

The network 30 can utilize and implement many operations in association with the override device 25. In some embodiments, the override device 25 may include the same location functionality as a monitoring device 10 and can receive a ping node signal comprising ping node location data. The override device 25 can be configured to transmit that ping node location data to the network entity 62. In some embodiments, the override device 25 can be configured to send an override device identifier and the network entity 62 may be configured to store the ping node location data last associated with the override device 25 with the override device identifier to the memory. Furthermore, in other embodiments, the network entity 62 can indicate the location of the override device 25 based on the stored ping node location data, such as alarming the override device 25 or displaying the ping node location data on a user interface.

Figure 10:
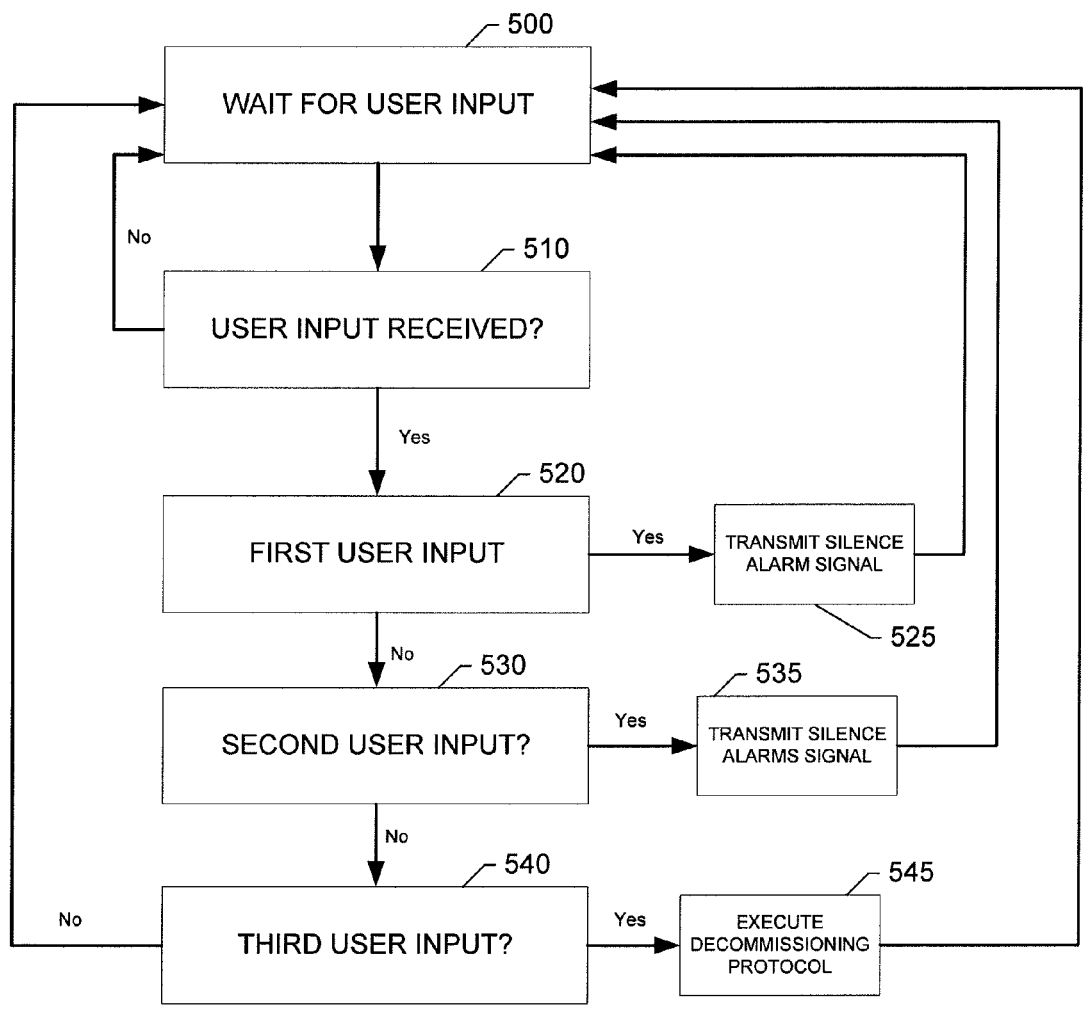
FIG. 10 is a flow chart illustrating a user input protocol configured for execution by an override device according to an example embodiment.

Other functionality of the override device 25 comprises receiving user input to initiate protocols and transmit signals. FIG. 10 shows a flow chart of the protocol of various embodiments of the override device 25 configured to receive user input. During normal protocol, at operation 500, the override device 25 waits for user input. Upon receiving user input, operation 510, the override device 25, in some embodiments, determines if the user input is a first user input 520. If the user input is a first user input, the override device 25 transmits a silence alarm signal 525 to the network entity 62, which may in response, transmit a silence alarm instruction to the monitoring device 10. The monitoring device 10 may be configured to receive the silence alarm instruction and, in response, stop alarming.

In other embodiments, if the user input is a second user input 530, the override device 25 may be configured to transmit a silence alarms signal 535 to the network entity 62. The network entity 62 receives the silence alarms signal and transmits a silence alarms instruction to each monitoring device 10. The monitoring devices 10 are configured to receive the silence alarms instruction and, in response, stop alarming.

The override device 25 may also be configured to respond to a third user input 540, wherein the override device 25 initiates a decommissioning protocol 545. The override device 25 then transmits a decommissioning signal to the network entity 62 and begins the decommissioning protocol for the monitoring device 10, for example, as described above and otherwise herein.

E. Location Protocol

With multiple monitoring devices 10 located throughout the store, and many being attached to valuable retail articles, it may be desirable for commercial, inventory, security, or other reasons, to locate a specific monitoring device 10. Embodiments of the present invention may include a network entity 62 configured to locate a monitoring device 10. As described previously, with reference to FIG. 4, a monitoring device 10A may be configured to receive a ping node signal with ping node location data from a nearby ping node 66A. Also, the monitoring device 10A may transmit the ping node location data and a monitoring device identifier to the network entity 62, most likely, a router 65. The network entity 62 may store the ping node location data and associated monitoring device identifier. Thus, the network entity 62 may be requested, such as through a user input, to locate a specific monitoring device 10A. In some embodiments, the network entity 62 may respond by sending a tag locator signal to the monitoring device 10A, which upon receiving the tag locator signal, may alarm to indicate where it is located. In other embodiments, the network entity 62 may display the stored location on a user interface indicating the relative location of the monitoring device 10A, based on the nearby ping node 66A and ping node location data. In other embodiments, the network entity 62 may store all the monitoring device identifiers for all monitoring devices 10 and thus may be able to transmit instructions to alarm any number of monitoring devices 10 or display the proximate locations of any number of monitoring devices 10.

In other embodiments, such as shown in FIG. 4, the monitoring device 10A may receive ping node signals from multiple ping nodes, such as from ping node 66A, ping node 66B, and ping node 66C. The monitoring device 10A may thus be configured to transmit ping node location data from all the ping nodes for which it is receiving ping node signals. Thus, the network entity 62 can receive the multiple ping node location data associated with the monitoring device 10A and determine the relative location of the monitoring device 10A based on which ping node location data the monitoring device 10 is receiving. Therefore, in some embodiments, it may be desirable for the ping nodes 66 to have a defined or tailored range for which monitoring devices 10 can receive their associated ping node signal, such as having a ping node signal cover one area of the store, like the electronics section. For example, if the monitoring device 10A is receiving ping node location data from three ping nodes 66A, 66B, and 66C, the network entity 62 may determine that the monitoring device 10A is likely located somewhere in-between those three ping nodes. Therefore, a proximate location of the monitoring device 10A may be more easily determined and the network entity 62 may indicate that location to a user, such as through a user interface.

In another embodiment, the network entity 62 may determine the signal strength associated with the specific ping node location data. Thus, the network entity 62 may determine that because monitoring device 10A is sending a higher signal strength from ping node location data matching ping node 66A, the monitoring device 10 most likely is located closer to ping node 66A. This additional embodiment may allow for more precise location of monitoring devices 10, for which the network entity 62 may indicate to a user through a user interface.

The above described embodiments used to locate monitoring devices 10 may also be used for locating an override device 25 or multiple override devices 25. Thus, the override devices 25 may also be configured to receive and transmit ping node signals comprising ping node location data.

Additional Example Embodiments

I. Additional Security Tools

In some embodiments, the present invention may comprise a network as described above with additional security features. Such additional features may be enabled by, for example, gate nodes located near the exit of the commercial environment, optical sensors that interact with one or more monitoring devices, and/or network components may be configured to perform security sweep functions.

A. Gate Node

Additional security may be desired near areas of the commercial environment that have a higher probability of theft, such as the exit and entrance points of a retail store. Thus, ping nodes may be configured to operate as gate nodes near these areas. In some embodiments, the gate node will operate via the locating functionality described above or based on a determination that a monitoring device is within range of a gate node's signal. In some example embodiments, a gate node may detect the proximity of a monitoring device by receiving communications from the monitoring device in response to a gate node signal provided by the gate node. To avoid situations where a gate node detects the proximity of a monitoring device that is properly within the retail environment, and is not located so close to the exit so as to indicate that the attached article is being stolen, guard nodes may be implemented. Ping nodes configured to be guard nodes may be located near an exit and may be configured to prevent monitoring devices within the store from improperly associating themselves to the gate nodes and causing erroneous alarming. As indicated above, other location based or time based limitations on alarm activity may also be implemented.

A gate node may be connected to the main system power, and may include a battery to support operation when main power is lost. The gate node may also be configured to transmit regular gate node signals, which include the gate node's unique identifier or location data, and listen for responses from monitoring devices that are within range. If a monitoring device detects that the strongest signal that the monitoring device is receiving is from a gate node, the monitoring device may transmit a message including the monitoring device identifier to the gate node and the monitoring device may enter a first alarm mode. In this regard, a monitoring device or network entity may maintain a list of identifiers for gate nodes to determine when a signal is being detected from a gate node.

In the first alarm mode, the monitoring device may be configured to emit an audible chirp every second (or other predetermined time period), providing a deterrent indication to an individual holding the article to which the monitoring device is affixed. In another embodiment, such audible chirps may occur progressively more rapidly as the individual approaches a gate area and progressively less rapidly as the individual moves away from the gate area to provide a directional deterrence effect.

While in the first alarm mode, the monitoring device may continue to listen for ping node signals from other nodes, and if a ping node signal from a non-gate ping node becomes the strongest ping node signal (e.g., as determined by signal strength or other conventional means) detected by the monitoring device, the monitoring device may transfer from the first alarm mode to a normal mode (e.g., since the tag has apparently moved away from the gate node and the exit). If the strongest received ping node signal continues to be the gate node signal from the gate node, and the received signal strength passes a predefined gate node signal strength threshold, the monitoring device may transfer into a second alarm mode. In the second alarm mode, the monitoring device may be configured to alarm continuously. Again, the monitoring device may continue to listen for ping node signals from other nodes, and if a ping node signal from a non-gate ping node becomes the strongest ping node signal detected by the monitoring device, the monitoring device may transfer from the second alarm mode to the first alarm mode or a normal mode (e.g., since the monitoring device has apparently moved away from the gate node and the exit).

Numerous other alarm modes and rules for tracking, alarming, monitoring or otherwise reacting to the environment may also be programmed into the monitoring device based on the configuration information loaded to each such device. Furthermore, the alarm functions may be initiated locally or remotely in different embodiments. For example, in some cases, the alarm of the monitoring device may be triggered, while in others an alarm panel or display associated with the network entity 62 may receive an alarm indication and an alert may be sent to an alert device without necessarily providing any local alarm (e.g., audible or visible alarm) at the monitoring device itself. In some alternative embodiments, a store or mall alarm system may be triggered such as, for example, an EAS gate system, a surveillance system, building alarm system, or the like. In some embodiments, a call may be made to a law enforcement facility or a message may be sent to request dispatch of police or other security personnel to the scene. Information about the movement of monitoring devices, video and other data may then be recorded and perhaps transferred to law enforcement personnel to facilitate investigation and/or prosecution of crimes.

B. Optical Sensors

In some embodiments, the monitoring device 10 may include a sensor 50 that may be an optional device added into or plugged into the monitoring device 10 in some situations (e.g., including optional hardware that can be integrated into and/or placed in operable communication with the monitoring device 10). In this regard, the sensor 50 may be used for making determinations of local conditions at the monitoring device 10. The sensor 50 may be embodied as any of various sensing devices configured to detect motion, light, images, sound, tampering, or other environmental stimuli. As such, the sensor 50 may include a light detector, an optical scanner, a motion detector or other sensing devices. In one embodiment, the optical sensor 50 may indicate when light is no longer detected, thus indicating that the article and associated monitoring device may have been placed underneath someone's jacket or within a bag. The monitoring device 10 may then transmit a signal to the network entity 62 indicating that the optical sensor no longer detects light. The network entity 62 may be configured with various protocol to respond to certain situations presented by indication of no detection of light. For example, the network entity 62 may alarm, transmit an alarm instruction to the monitoring device 10, or send an alert message to an override device 25 indicating a possible theft. The network entity 62 may also respond in other ways, determining if the lights have gone out in the retail store and responding by turning them back on. Thus, an optical sensor may be useful in multiple functions for a network such as in some embodiments previously described.

C. Sweep Security Function

As indicated above, the network entity 62 may comprise a user interface. Thus, in some embodiments, the network entity 62 may be enabled to provide a display showing locations of various monitoring devices 10 at any give time. In one example embodiment, the display may show ping nodes 66 with respect to their physical location on a floor plan of the retail floor and show a corresponding number of monitoring devices 10 associated with each ping node. Movement of a monitoring device 10 from one ping node 66 to another ping node may be indicated by the movement of a symbol or icon from one ping node to the other and the decrementing of the number of monitoring devices 10 at the ping node 66 from which the monitoring device 10 departed, and incrementing of the number of monitoring devices 10 at the ping node 66 to which the tag has moved. All movements may be buffered or otherwise recorded for analysis. Each ping node 66 may be accessed via the network entity 62 to retrieve information about the product associated therewith, battery level and other information.

In one embodiment, rules may be applied to the movement of monitoring devices 10. For example, if certain monitoring devices 10 are moved out of a specific location without being decommissioned or otherwise disarmed in an authorized manner prior to such movement to indicate that the product has been paid for, a local or remote alarm (e.g., accompanied with a corresponding message at the network entity 62) may be triggered to alert store personnel or the individual possessing the monitoring device 10, or to initiate tracking of the monitoring device 10 or surveillance of the individual possessing the monitoring device 10 (e.g., with cameras or by store personnel). The network entity 62 may determine where the monitoring device 10 was located based on the ping node location data and then transmit a signal to the retail store camera overlooking that location to begin monitoring that location.

Alternatively or additionally, if a threshold number of monitoring devices 10 from a given area move at the same time, an alarm may be triggered. In this regard, a large migration of monitoring devices 10 at one time may be indicative of a "sweep", where a thief (or thieves) attempts to steal a large amount of product at one time. As indicated herein and particularly with respect to customer monitoring devices and customer traffic profiles, movement profiles may also be analyzed and rules for initiation of alarm conditions, real-time tracking, or other activities may be applied based on a comparison of a current movement profile to pre-stored suspicious movement profiles.

Accordingly, in some embodiments, monitoring devices 10 may be configured to provide multiple levels of security. For example, one level of security may be provided by each monitoring device 10 being visible to the network and being monitored (e.g., via cameras or other mechanisms) in response to movement and/or other type of disturbance. Monitoring devices 10 may also be secured by mechanical key aspects, such as mounting devices 52, associated with each monitoring device 10. In this regard, for example, monitoring devices 10 may have physical locking mechanisms or mounting devices as discussed above that enable the monitoring device to be affixed to at least one product in a manner that may permit removal of the monitoring devices 10 via a mechanical key device. In some embodiments, monitoring devices 10 may also have some sort of wireless key and/or other type of electrical key. For example, a wireless signal with a key code may be provided to enable unlocking of a physical lock associated with a monitoring device 10 or to enable activation/deactivation of the monitoring device (or an alarm). In an exemplary embodiment, the wireless signal may be provided by an override device 25, also called a "manager's key" described herein. Any combination of the above three layers and other security layers may also be provided. As such, multiple security layers may be provided by embodiments of the present invention.

II. Integration of the Commercial Environment

In some embodiments, the present invention may include a network that integrates with other types of retail store technology and networks. Such integration may provide increased security via cameras, lighting, music, or other features such as locking mechanisms on display cases, as described above with respect to event detection devices.

A. Cameras

The network entity 62 may be connected either wirelessly and/or with wired medium to other networks, such as a camera security network, which may have been previously installed in the retail environment. The network entity 62 may be configured to receive information from cameras, photo eyes, clocks and/or other external sensors, as well as being configured to communicate with the cameras, clocks, other external sensors, etc. Further, rules may be applied to the information received from the other security systems. Based on the application of the security rules, action may be taken, such as initiating tracking operation, initiating continued monitoring, initiating a report, initiating an alarm locally or remotely, directing recording of data, directing movement or operation of a camera, directing provision of information, and/or the like. The application of the security rules and the actions taken may therefore be similar to those actions described above in reference to FIG. 9, as protocols can be created for certain indications received from the other security systems. An example of such rules comprises a monitoring device 10 sending a signal to the network entity 62 indicating that the monitoring device 10 has been tampered with or improperly removed, the network entity 62 may be configured to respond by transmitting instructions to a camera positioned to monitor the location of the ping node last associated with the monitoring device 10 (i.e., the ping node originating the last received ping node location data). The network entity 62 may also display the images from the camera on a user interface for store personnel to view. In other embodiments, the network entity 62 may signal the camera or associated recording device (e.g., digital recording device) to flag images or event/alert related video portions for later review by store personnel or law enforcement authorities.

B. Lighting and Music

In some embodiments, the network may incorporate the principals just described to the lighting and music networks of retail stores. For example, since many retail environments may be noisy, the volume of in-store music may be automatically reduced by the network entity when an alarming monitoring device 10 is detected. As such, the network entity 62, in response to notification of an alarming monitoring device 10, may reduce in-store music volume in order to allow in-store personnel to readily perceive such alarms. Additionally or alternatively, some monitoring devices 10 may be configured to alarm when they are within communication range of another alarming monitoring device 10.

In one example embodiment, a monitoring device 10 that is alarming, but is concealed in some manner by the individual attempting to steal the corresponding product, may set off a cascade of alarming monitoring devices 10 in its vicinity so that a thief's ability to silence one monitoring device 10 will be thwarted. Such a cascade of alarming monitoring devices could be used to track the movement of a would-be-thief in the retail environment. Such behaviors of the monitoring devices 10 and/or the network entity 62 may be controlled by the security rules that are applicable to any given situation.

Based on the flexible nature of the monitoring devices and the ability of the network entity 62 to interact with external sensors, displays, speakers and other devices, a powerful deterrent to theft may be provided. For example, audible warnings, alarming monitoring devices 10, visual displays, camera recordings and other features may be made transparent to customers and potential thieves so that all are well aware of the robust nature of the network.

III. Marketing Tools

As described above, some embodiments of the present invention include a network that may be configured to process information and apply rules in order to initiate functionality. In addition to or instead of providing security functionality, some embodiments of the present invention may apply rules and initiate functionality for marketing retail and/or other types of products. Accordingly, FIG. 11 is provided to illustrate some example operations that may be employed in connection with the network being configured to apply marketing features.

Figure 11:
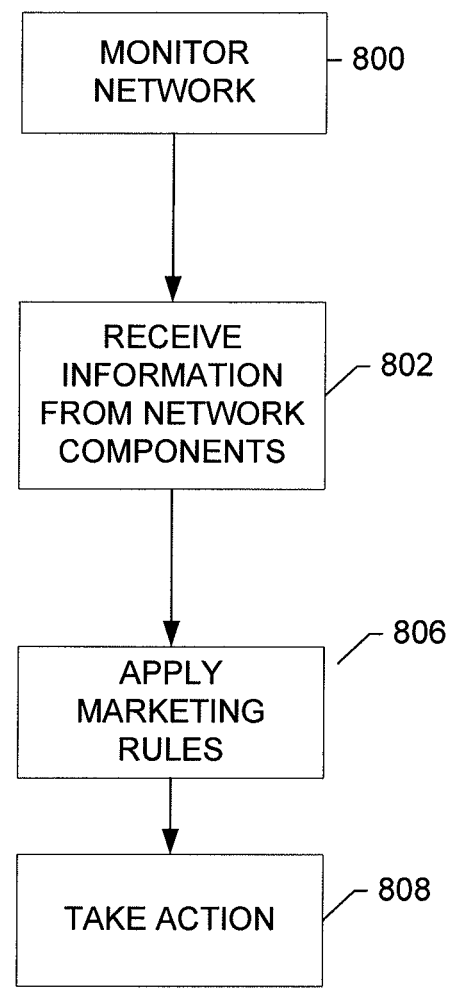
FIG. 11 is a flow chart illustrating a marketing protocol configured for execution by a network entity according to an example embodiment.
Figure 12:
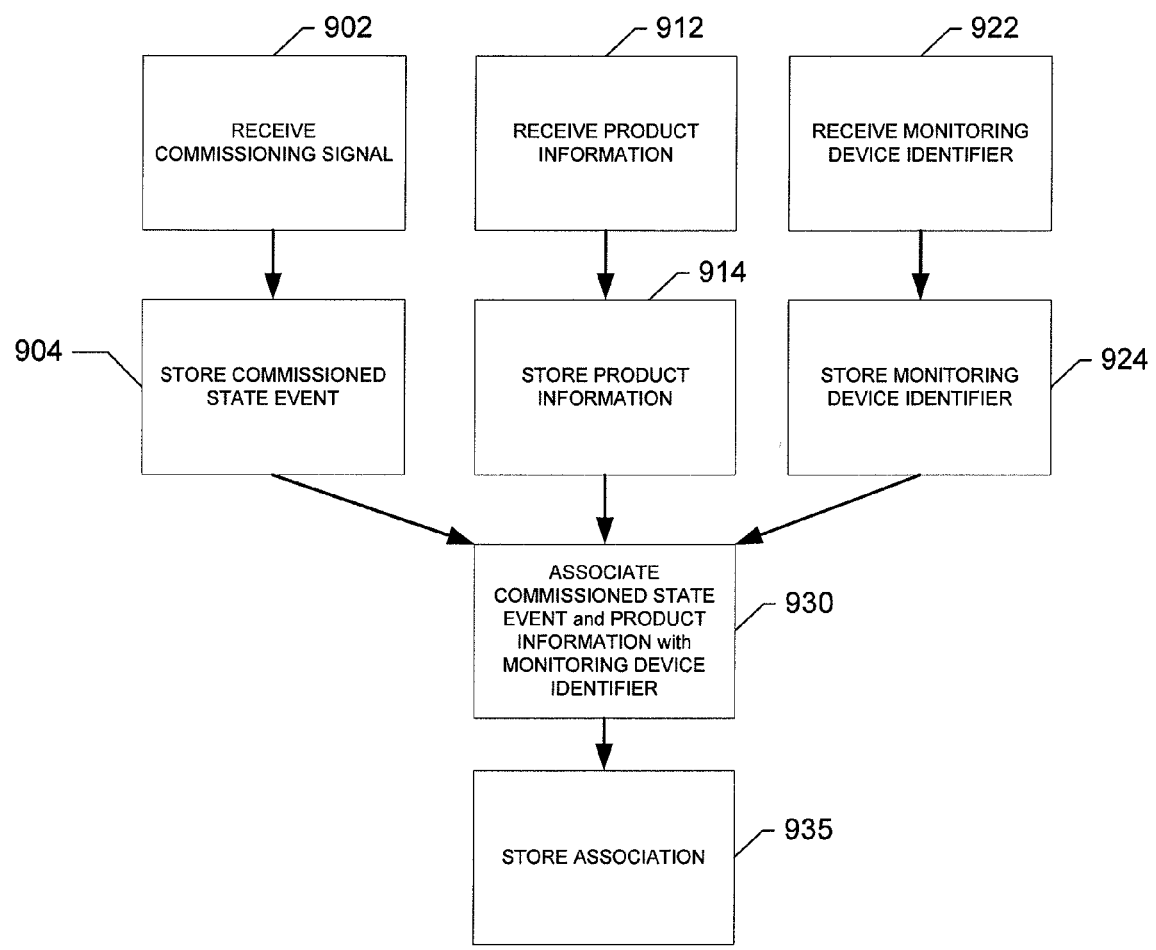
FIG. 12 is a flow chart illustrating a protocol configured for execution by a network entity wherein product information is associated with a monitoring device according to an example embodiment.

As shown in FIG. 11, the network entity 62 may initially be configured to monitor the network at operation 800, wherein the network includes components described in connection with some examples discussed herein, such as monitoring devices 10, override devices 25, ping nodes 66, event detection devices 70, monitoring terminals 80, camera systems, lighting, and other systems that may be in communication with the network entity 62. At operation 802, the network entity 62 may receive information from network components, such as those previously identified. At operation 806, rules may be applied to the information received at operations 802. Based on the application of the marketing rules, as described below, action may be taken at operation 808. The action taken may include initiating a tracking operation, initiating continued monitoring, initiating a report, initiating an alarm locally or remotely, directing recording of data, directing movement or operation of a camera, directing provision of information, accessing a database, providing a coupon or other printed marketing material, and/or the like. Various examples of rules and, in some cases, corresponding conditions that may trigger certain rules are described below.

A. Retail Articles

In some embodiments, the network entity 62 may be configured to store product information relating to the article attached to a monitoring device 10. For example, with reference to FIG. 12, the network entity 62 may receive product information 912 while receiving a monitoring device identifier 922 and a commissioning signal 902, during commissioning. The product information may contain any type of valuable information associated with the product that may be attached or otherwise associated with the monitoring device 10. For example, the product information may be the universal product code ("UPC"), SKU, retail price, potential price change schedule, product specifications, and/or any other type of information associated with the product that may be useful for the network entity 62 to have access to, particularly for embodiments of the protocol as described below.

The product information may be stored in a code on the product which may be read by the network entity 62 or the override device 25 at the time of commissioning. Thus, the override device 25 may scan the code and transmit it to the network entity 62 at the time of commissioning. In other embodiments, the product information may be a code that the network entity 62 may use to determine, using pre-defined data, an identity of the product. Then, then network entity 62 may access pre-stored product information associated with the code. In other embodiments, the network entity 62 may receive the product information, monitoring device identifier, and commissioning signal, or various combinations thereof, within one signal.

Upon receiving the product information, commissioning signal, and monitoring device identifier, the network entity 62 may store the commissioned state event 904, the product information 914, and the monitoring device identifier 924 to memory. Then, based on commissioning protocol or a timer indicating a small interval of time between receiving the signals, the network entity 62 may associate the commissioned state event and product information with the monitoring device identifier 930. Finally, the network entity 62 may store that association to memory 935 for use later, such as in another protocol.

In other embodiments, the network entity 62 may transmit a signal to the override device 25 or monitoring device 10 indicating a successful association. Additionally, in other embodiments, the network entity 62 may transmit the same product information or further product information to the monitoring device 10 for storage. Thus, the monitoring device 10 may have immediate access to the product information and, in other embodiments, may be queried by the network entity 62 or another network component, such as a monitoring terminal 80 and/or point of sale terminal 1160, to obtain the product information.

B. Monitoring Terminal

In some embodiments, the network may be configured to provide an interactive shopping experience based on the functionality described above or otherwise herein. In this regard, for example, the network entity 62 may be configured to interface, via a network connection or the like, with a monitoring terminal 80 to support marketing functionality. In some embodiments, the monitoring terminal 80 may be a customer information terminal. The monitoring terminal 80 may be a computing device including a display and/or audio output capabilities (e.g., speaker, speaker driver, etc.), and in some cases may further include a printer or other peripheral device. A monitoring terminal 80 may be located at strategic security or marketing locations such as exits and entrances. Monitoring terminals 80 may also or alternatively be located in association with certain displays or at various locations distributed throughout the retail floor to enable customers to access information at the monitoring terminal 80.

The network entity 62 may also be configured to interface with the monitoring terminal 80, via a network connection, to provide output to customers and/or would-be shoplifters. For example, a monitoring terminal 80 and a camera may be located at the exit of a retail environment. The camera may be controlled by the network entity 62. When the network entity 62 determines that a monitoring device 10 has moved into a zone of interest defined near the exit, the network entity 62 may instruct the camera to capture the image of the individual carrying the monitoring device 10 (and the associated product). The video captured by the camera may be transmitted to the network entity 62 and then transmitted to the monitoring terminal 80 to be displayed or otherwise indicated to the shoplifter that they are being recorded, thereby providing a deterrent effect. In addition to providing a display for a deterrent effect, monitoring terminals 80 may also be used in marketing applications, such as displaying sales on products or indicating products suggested to the customer to buy.

In some embodiments, the monitoring terminal 80 may also enable customers to browse different product lines interactively to identify products of interest. Each identified product may be recorded by the network entity 62 and a product list may be generated for the customer on the monitoring terminal 80. Thereafter, the customer may be presented with a map to facilitate location of each product of interest identified. In some embodiments, store personnel may also be notified and a sales professional may be alerted to proceed to a specific location associated with a product of interest to assist the customer as the customer approaches the product or searches for the product. Furthermore, due to the network capability, customers may be enabled to browse information and perhaps shop online from a remote terminal (e.g., a home computer or laptop) using a web-based application.

In other embodiments, the customer may interact with the monitoring terminal 80 to browse through products. The monitoring terminal 80 may store product information itself, or may transmit a signal to access product information from the network entity 62. The network entity 62 may then receive that signal and transmit the product information to the monitoring terminal 80 to display for the customer. In other embodiments, the monitoring terminal 80 may contain protocol or access protocol from the network entity 62 in response to customer input, such as making suggestions to the customer for related products, or printing coupons for the customer for certain products.

C. Zone of Interest Messages

In addition to simply outputting the location of the monitoring device to the user interface, the network entity 62 may be configured to consider the location information of a monitoring device 10 with respect to defined rules, alarm conditions, and alarm responses. In this regard, zones of interest within a retail environment may be defined, and when the network entity 62 determines that a monitoring device 10 has entered a zone of interest, marketing functionality may be implemented, which may include a variety of different functionalities such as tracking and other functions.

In general, conditions may be actively or passively monitored (e.g., by the network entity 62 and/or the monitoring devices themselves recording or analyzing data in real time) and the conditions may be compared to a set of rules to determine whether to initiate functionality prescribed for a particular rule. The rules that may be specified for employment in accordance with some exemplary embodiments of the present invention may be categorized as a zone-based functionality profile, for example, as location or zone-based rules, time based rules, or identity based rules. These zone-based rules may act in the same or similar manner to zone-based rules for zones of interests as previously discussed above under the Zones of Interest Heading and otherwise herein.

With respect to additional marketing functionality, since the location of a monitoring device 10, and thus a product, can be determined, the network entity 62 may be configured to transmit zone of interest messages, such as instructions to make suggestions to customers for purchasing other products while the customer is still in the store. For example, movement of a monitoring device 10 associated with a dress shirt may be detected near a dress shirt display. The monitoring device 10 associated with the dress shirt may communicate with the network entity 62 to identify itself and thereby also identify the product associated therewith. The network entity 62 may direct a zone of interest message to the monitoring terminal 80 associated with the dress shirt display. The customer may then be provided with various different types of information via the monitoring terminal 80 that may assist in marketing the dress shirt or other products. As an example, the monitoring terminal 80 may present a picture of a model wearing the dress shirt and perhaps also identify other products that may form an ensemble with the dress shirt. In this regard, slacks, neck ties, shoes, belts and/or other products that are recommended for use with the dress shirt may be provided.

Alternatively or additionally, detailed information about the product associated with the monitoring device 10 may be presented to the shopper at the monitoring terminal 80. For example, manufacturing information, product care instructions, cost, inventory information (e.g., available colors/sizes), and/or other information may be presented to the shopper. The monitoring terminal 80 may present information to the shopper automatically in response to movement of the product or, in some cases, in response to a request for such information from the shopper after prompting by the monitoring terminal 80. The monitoring terminal 80 may provide a touch screen or voice activated interface in some embodiments. Accordingly, in some instances, the user may interact with the monitoring terminal 80 to mine desired information from the network entity 62 about available products.

In some embodiments, the monitoring terminal 80 may have a ping node 66 associated therewith and, in response to bringing any product with a monitoring device 10 into proximity with the ping node 66, the monitoring terminal 80 may issue a greeting to the shopper and identify the product associated with the monitoring device 10 currently presented to offer various mechanisms by which to enable the shopper to access further information. As such, the monitoring terminal 80 may be a shopper resource to perform price checking, gain information about the product, identify related products, identify related product sales, request/print coupons, and/or access other functionality simply by bringing a tag proximate to the ping node 66 associated with the monitoring terminal 80. In some embodiments, the monitoring terminal 80 may provide banner ads for advertising in-store products or even brand names or product lines of other goods and services that wish to use the banner ads to advertise.

As consistent with the foregoing discussion, the network entity 62 may be configured to monitor when it receives ping node location data from a monitoring device 10 located near a monitoring terminal 80. Upon receiving the ping node location data so associated, the network entity 62 may transmit a signal to the monitoring terminal 80 with product information or other instructions indicating to the monitoring terminal 80 to display such information to the customer carrying the monitoring device 10 near the monitoring terminal 80. Thus, the monitoring terminal 80 may receive the information or instructions from the network entity 62 and display that information or proceed with protocol associated with those instructions, such as initiating a presentation about a product related to the product associated with the monitoring device 10 which the customer is carrying.

Additionally or alternatively, the shopper may be tracked from one area to another and information pertinent to the relationship between the areas the shopper has transited from (e.g., as indicated by monitoring devices 10 in the possession of the shopper) and the current area may be presented to the shopper on the monitoring terminal 80 in the shoppers current location. For example, if the shopper picked up the dress shirt previously mentioned, and the shopper's movement is thereafter tracked to a sales area for neck ties, the network entity 62 may be configured to consult a database to suggest a neck tie that matches the shirt, based on product information associated with the monitoring device 10 affixed to and associated with the shirt. To implement the suggestion procedure, the network entity 62 may interface with a monitoring terminal 80 located near the neck tie retail area, which is thus viewable by the shopper.

Figure 13:
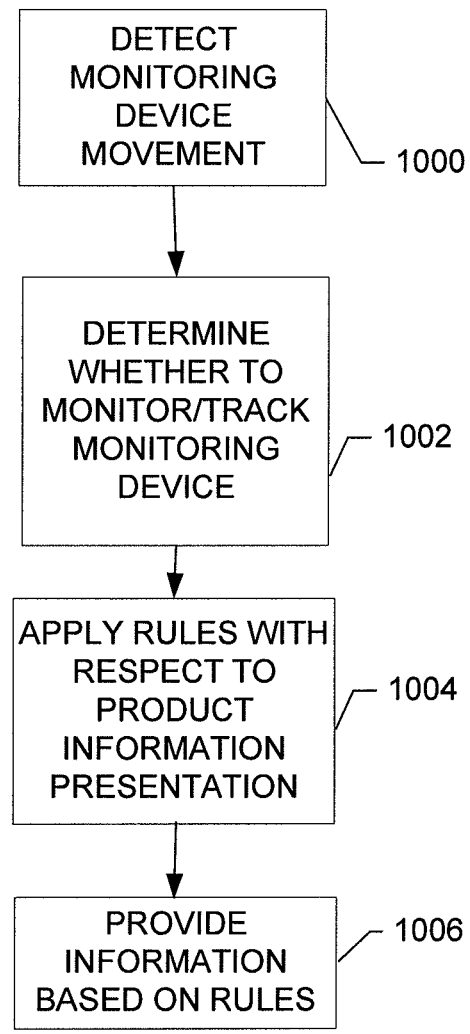
FIG. 13 is a flow chart illustrating a protocol configured for execution by a network entity wherein a presentation may be initiated on a monitoring terminal based on various marketing rules according to an example embodiment.

A flow chart applicable to some of the examples described above is illustrated in FIG. 13. In this regard, as shown in FIG. 13, monitoring device movement may initially be detected at operation 1000. After waking up in response to detection of monitoring device movement, as previously described above, a determination may be made as to whether to track the monitoring device and/or monitor the monitoring device (e.g., through video surveillance) at operation 1002. Rules may then be applied with respect to product information presentations at operation 1004 and a presentation of information may be provided based on the rules at operation 1006.

Zone based rules may also define how the network entity 62 interacts with individuals carrying an item associated with a monitoring device with respect to marketing functionality. In this regard, for example, in certain zones, product information may be provided for only the product associated with the monitoring device, while in other zones product information may be provided for related products or sales. In some zones, the information provided may depend on the product associated with the monitoring device itself. In other words, for some products in a particular zone, only information related to the corresponding product may be provided, whereas for other products in the same zone, information related to other products may be provided. Furthermore, the level of customer interactivity of the network entity 62 (e.g., via the monitoring terminal 80) may be governed by zone based (and/or product based) rules. As an example, if a customer takes a product into a fitting room, a zone based rule may trigger a monitoring terminal 80 in or near the fitting room, through a zone of interest message as provided by the network entity 62, to provide product information about one or more products brought into the fitting room. The information presented may indicate alternative sizes, colors or styles. In some embodiments, the monitoring terminal 80 may also provide a store map with an indication of how to find a specific product of interest to the customer. Moreover, the indication of product location may be a real-time positional indication based on a specific monitoring device 10 of the specific product whose location is being revealed. The customer may thereby be presented with information assisting the customer in locating the correct product.

In an exemplary embodiment, an area immediately outside the fitting room may also be provided with a camera to enable customers to take pictures or video of themselves trying on products and log onto a social networking or other web-site to share the pictures or video with friends. The friends of the customer may then provide feedback that the customer may consider in relation to purchasing the products.

D. Customer Traffic Profiles

To provide additional or alternative marketing functionality, the network entity 62 may be configured to record and analyze the path that various products take through the retail floor when in the possession of shopping customers. For example, shopping patterns and customer traffic patterns may be analyzed to improve product placement and pairing and determine the effectiveness of various displays and store set-ups. The network entity 62 may thus generate traffic density maps and/or profiles by storing the ping location data associated with monitoring devices 10 that move throughout the retail environment. Traffic density maps or traffic density profiles may be reports or maps indicating shopping patterns or customer traffic or location patterns throughout a retail environment. To generate a traffic density map and/or profile, the network entity 62 may be configured to store each ping node location data associated with each monitoring device 10 as the monitoring device 10 moved around the retail store (i.e., the customer carrying the product associated with monitoring device 10 moving around the retail store). Then the network entity 62 may filter this ping node location data for time, place, or other factors and create a traffic density map or profile. The network entity 62 may then transmit this information to a user interface for a store manager or other user to print or otherwise utilize for marketing or analysis purposes.

Further, information regarding the effects (e.g., sales effects, customer traffic effects, etc.) of moving product display racks and associated products within the store may be determined based on the movement of customers and the sales of the associated products. In this regard, common pathways that shoppers take through the store may be determined based on the frequency with which such shoppers transport monitoring devices 10 through a specific area. Based on the common pathways that shoppers (as indicated by the travel path of monitoring devices 10 they are transporting) take through the retail floor, a traffic density map may be determined for the retail floor by the network entity 62. The traffic density map may be employed by store management (or mall management if used in a larger setting) to define areas of high, medium and low traffic, thus creating customer traffic profiles. Dead zones, as noted above with respect to zone of interest protocol and otherwise herein, may also be identified. Information recovered from the traffic density map may be utilized to modify store configurations and/or determine product placement to attempt to influence shopper movement and traffic patterns and/or to take advantage of existing and known traffic patterns. In some instances, the traffic density map may be used to determine retail space rental values in order to provide potential mall retailers with information regarding the traffic density in various locations from which the potential retailer is choosing in order to select a location. In other instances, such maps may be used by mall developers to set pricing levels for specific retail store locations. In still other embodiments, such maps may be used by department store owners for setting pricing of retail display locations as might be offered to its product vendors.

Figure 14:
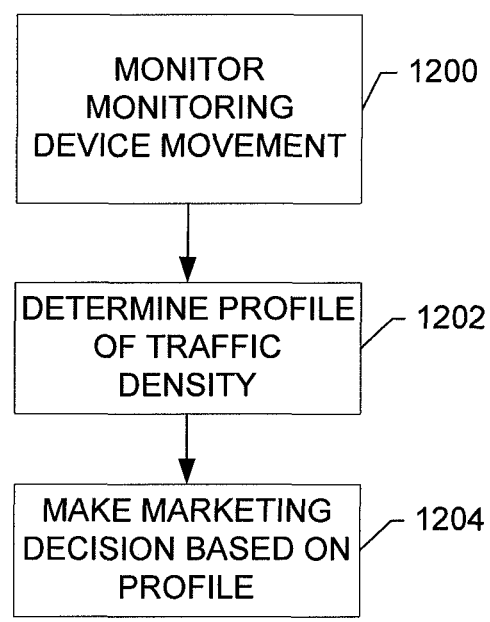
FIG. 14 is a flow chart illustrating a protocol configured for execution by a network entity wherein a customer traffic density profile may be identified and used in connection with one or more marketing protocols in accordance with example embodiments.

FIG. 14 illustrates a flowchart of operations that may be performed to influence marketing within the retail store based on traffic density information. In this regard, at operation 1200, movement of monitoring devices 10 may be monitored and recorded by the network entity. At operation 1202, a profile of traffic density may be developed (e.g., as a traffic density map) based on movement of the monitoring devices 10. At operation 1204, marketing decisions (e.g., product pricing, product placement, sales clerk staffing levels, etc.) may be made based on the profile.

In some embodiments, the network entity 62 may be configured to monitor movement past a particular ping node 66 or group of ping nodes 66 in order to perform customer counting functions. As such, the monitoring devices 10 may be employed to function as a customer counter. In some other embodiments, the network entity 62 may interact (directly or via the network) with and receive information from conventional customer counters (e.g., people counters, activity counters, etc.) to determine customer traffic density profiles or other marketing profiles. In one embodiment, for example, if a freezer or other product container is monitored with an access counter, or other similar event detection device configured to count the number of openings of the door or entrances into the product container, the number and/or frequency of access events to the product container may be monitored and/or recorded. The customer or access counting functions may be used along with other traffic pattern information to assist in generation of a traffic density map, or to otherwise provide information for use in determining marketing strategies for product placement or display presentation.

The network entity 62 may also be configured to determine which products tend to be purchased together in order to develop a generic customer profile for various product lines. For example, the network entity 62 may be configured to determine that shoppers that purchase a particular brand of perfume have a tendency to favor specific brands of shampoo and conditioner, based on the frequency with which such branded items are purchased in combination with each other. Knowledge of such common product pairings may be used to influence the presentation or display location of the products or information regarding such products. For example, a coupon or marketing materials for the shampoo and conditioner may be provided at the location of the perfume.

E. Customer Identifiers

In other embodiments of the present invention, the network can utilize monitoring devices 10 for association with individual customers. Thus, monitoring devices 10 may be used as identification devices and may be commissioned in similar fashion to the commissioning of a monitoring device 10 associated with a retail article. As such, the monitoring device 10 may be configured to operate as a "customer tag" 1155. Although the monitoring device 10 is referred to as a customer tag 1155, the monitoring device 10 may similarly be associated or assigned to non-customers such as employees or vendors. Examples of the customer tag 1155 are shown as triangular shapes having the letters "CT" therein in FIG. 15.

1. Customer Tags

Figure 15:
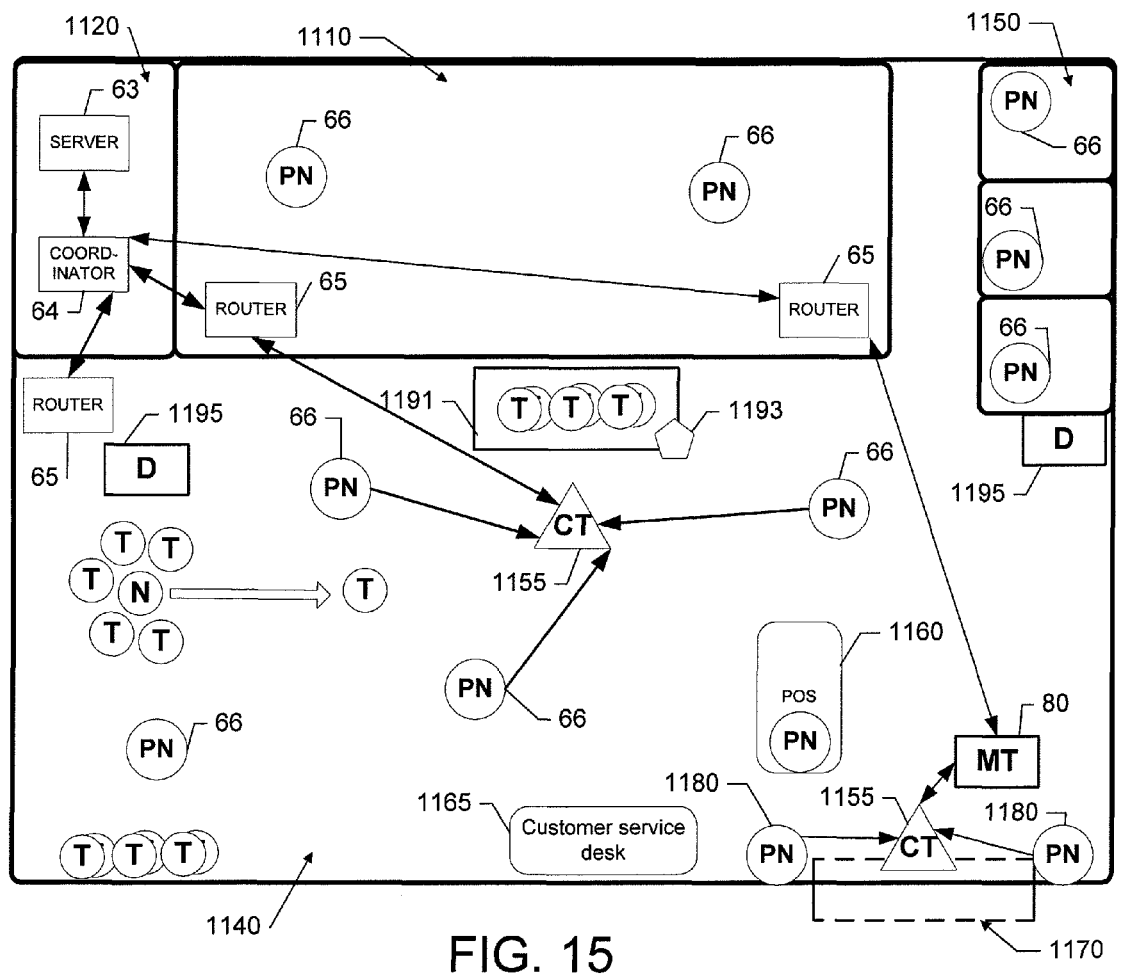
FIG. 15 illustrates a diagram of a network implemented in an example retail environment for monitoring customer tags according to an example embodiment.

In this regard, FIG. 15 illustrates a diagram of various embodiments of a network to help illustrate the flexible nature of the monitoring device 10 with respect to dynamic configuration and employment thereof, particularly in regard to implementation as a customer tag 1155. In this regard, FIG. 15 depicts an exemplary retail environment including a stock room 1110 where excess inventory is maintained, an office space 1120 from which monitoring activity may be coordinated or otherwise viewed, fitting rooms in which articles of clothing may be tried on by potential buyers, a retail floor 1140 on which various products may be displayed or otherwise made available for buyers to purchase and restrooms 1150. FIG. 15 also depicts a point of sale (POS) terminal 1160 at which payment may be made for products and a door 1170 through which customers may enter and exit the retail floor 1140. Notably, FIG. 15 is not drawn to scale, but is merely provided to illustrate an example of the some of the concepts described herein.

In some cases, the customer tag 1155 may be commissioned in the retail environment 1100, for example, at a customer service desk 1165 or by equipment in the office space 1120. In such examples, the customer may go to the customer service desk 1165 and provide personal information (e.g., profile information) to enable commissioning of the customer tag 1155 in association with the corresponding customer. The personal information may be very limited or expansive depending upon the desires of the customer and the retailer. In some examples, the personal information may include any or all of name, home address, phone number, email address, and the like. In some other cases, the personal information may also establish a payment account for the customer. As such, credit card or bank account information may be provided or an account similar to a Paypal account may be set up for the customer. In still other cases, the customer may provide detailed information on preferences, household information or other survey responses.

The customer tag 1155 may be the permanent property of the customer (e.g., as a key fob or other easy to carry device). In some alternatives, the customer may check in to the customer service desk 1165 to receive the customer tag 1155 on each visit to the retail environment 1100. As such, as suggested above, the casing or housing of the customer tag 1155 may be different in corresponding different embodiments.

As indicated above, in some cases the customer tag 1155 may be permanently assigned to a customer (e.g., the customer leaves the retail store with the customer tag). Because the customer tag 1155 may be configured to communicate with the network entity 62 of the retail environment 1100 with relatively low power signaling, the customer's privacy outside of the retail environment 100 may not be impacted. Meanwhile, since the customer tag 1155 is permanently assigned to the customer in this example, permanent information identifying the customer may be stored on the customer tag 1155 and retrieved by the network entity 62 in the retail environment 1100 when the customer returns.

In other cases, the customer tag 1155 may be temporarily assigned to a customer upon visiting the retail store (e.g., the customer returns the customer tag upon leaving the store). In such an embodiment, a remote or local server or computer may store profile information voluntarily provided by the customer. The profile information may then be used (perhaps along with other information applicable to the customer's visit) to commission a temporary customer tag for the customer on each visit in which the customer checks into the customer service desk 1165 to receive the customer tag 1155. In some example embodiments, the customer tag may be configured to wirelessly interface with a cell phone of the customer to retrieve profile information from the customer upon entry. The profile information may include the customer's name, age, gender, home address, phone numbers, credit card numbers, credit information, purchasing preferences, and the like. Upon entry into the retail environment, the customer may be immediately recognized and the customer may then proceed to the customer service desk 1165 to receive the customer tag 1155 without significant delay.

In an alternative embodiment, rather than a wireless interface, profile information may be acquired via stored profile information on the network. In this regard, for example, customer profile information may be stored to a database disposed in communication with the network. Customer profile information may be stored to a particular tag wirelessly through the network upon the tag being associated with a customer upon the customer entering the store. In one embodiment, this association may occur through scanning a barcode provided on a customer loyalty card. This barcode scanning operation, which may occur in connection with a customer entering the store, may trigger the customer's profile information to be stored to a particular tag that the customer may then carry as he or she moves through the store as part of their shopping experience. The barcode scanning operation may also replace the UPC scanning step 625 shown in FIG. 6 in connection with commissioning of the customer tag in connection with various embodiments discussed herein.

In some embodiments, an EAS gate, or ping nodes 66 set up in an EAS gate configuration may be located within the retail environment 1100. In this regard, for example, some ping nodes 66 may be configured as gate nodes and may be located at a doorway (e.g., door 1170) to monitor for customer tags 1155 passing through the door. In response to an active customer tag 1155 passing between ping nodes acting in an EAS configuration as gate nodes, the corresponding nodes (e.g., nodes 1180 of FIG. 15) may report information to a database or other device, through the customer tag 1155, to the network entity 62. The network entity 62 may be configured to respond by driving a display, camera or other external device, or generating an alarm response. According to some embodiments of the present invention, for customers with permanent customer tags, when the customer tag 1155 enters the store, the nodes 1180 may communicate with the customer tag 1155 to recognize the customer. Information may be exchanged with the customer tag 1155 (including configuration information) at that time in order to initiate any special circumstances that may apply to the customer's visit.

In this regard, for example, the customer tags 1155 in the retail environment may be in communication with or coordinated by network entity 62. The network entity 62, as discussed previously with respect to other embodiments, may comprise a server 63, coordinator 64 and at least one router 65 such that they are in communication with each other, and such that the router is in communication with the customer tags 1155.

In some embodiments, as is consistent with respect to monitoring devices 10, the network entity 62 may be configured to include functionality to permit the customer tag 1155 to be tracked, to provide guidance services to the customer tag 1155, or enable the customer tag 1155 to receive personalized messages, coupons or other materials at any of various monitoring terminals 80. In some embodiments, an instance of the monitoring terminal 80 may be positioned near the door 1170 to provide a personal greeting to customers having customer tags 1155. The monitoring terminal 80 may also provide shopping tips, coupons, information on sale items (perhaps personalized based on customer preferences), guidance services or other information to entering customers. Furthermore, monitoring terminals 80 at various product displays or other locations may provide information and/or marketing materials tailored to the customer when the customer tag 1155 approaches a monitoring terminal 80 positioned in the store.

2. Customer Profiles

In some embodiments, the customer tag 1155 may also be configured to provide for tracking and positioning the customer in the store. The tracking function may be used to further develop the profile information associated with the customer. The profile information may be used for rewards program determinations, product or coupon offerings, and various other incentives. The profile information may also be used for statistical analysis in larger marketing studies. As such, information may be mined and stored (e.g., by the network entity 62) regarding aggregate customer behavior and response to specific product displays or other stimuli. As such, obtained information may regard such data as, for example:

i. Products most frequently picked up and purchased;
   ii. Products most frequently picked up and not purchased;
   iii. Products most frequently tried on;
   iv. Products most frequently tried on and purchased;
   v. Products most frequently tried on and not purchased;
   vi. Product display locations most frequently visited;
   vii. Product display locations having highest sales;
   viii. Marketing display configurations most frequently visited;
   ix. Marketing display configurations having highest sales;
   x. Correlations/relative importance between display location and marketing display configuration;
   xi. Marketing display compliance rate for retailers;
   xii. Correlations between displays/marketing display configurations visited;
   xiii. Correlations between clerk positioning, levels of staffing, and loss rate;
   xiv. Correlations between suggested sales, banner ads, etc., (provided via customer terminals) and display visit rates; and
   xv. Individual loyalty program participant tracking.

Tracking information may also be used to provide guidance to customers. In this regard, for example, a monitoring terminal 80 may be enabled to provide a store map to the customer with a depiction of the customer's location. In some cases, the customer may identify (e.g., via a user interface of the monitoring terminal 80) a particular product of interest. The monitoring terminal 80 may then provide instructions to the customer (e.g., in text or on a map view) as to how to reach the product of interest. In some cases, the customer tag 1155 may be configured to provide guidance to the customer to assist in reaching the corresponding monitoring device 10 of the product of interest via Geiger counter functionality. In this regard, the customer tag 1155 may be configured to act as a locator tag. The locator tag and/or a target monitoring device 10 (e.g., the monitoring device of the product of interest) may be configured to provide audible and/or visual feedback to the user to indicate the location of the target monitoring device 10. For example, the locator tag and/or the target monitoring device 10 may be configured to output audible beeps or chirps (similar to the sound of a Geiger counter) or repetitive light flashes or other graphic indicators, the frequency of which may increase as the locating tag moves closer to the target monitoring device 10.

Figure 16:
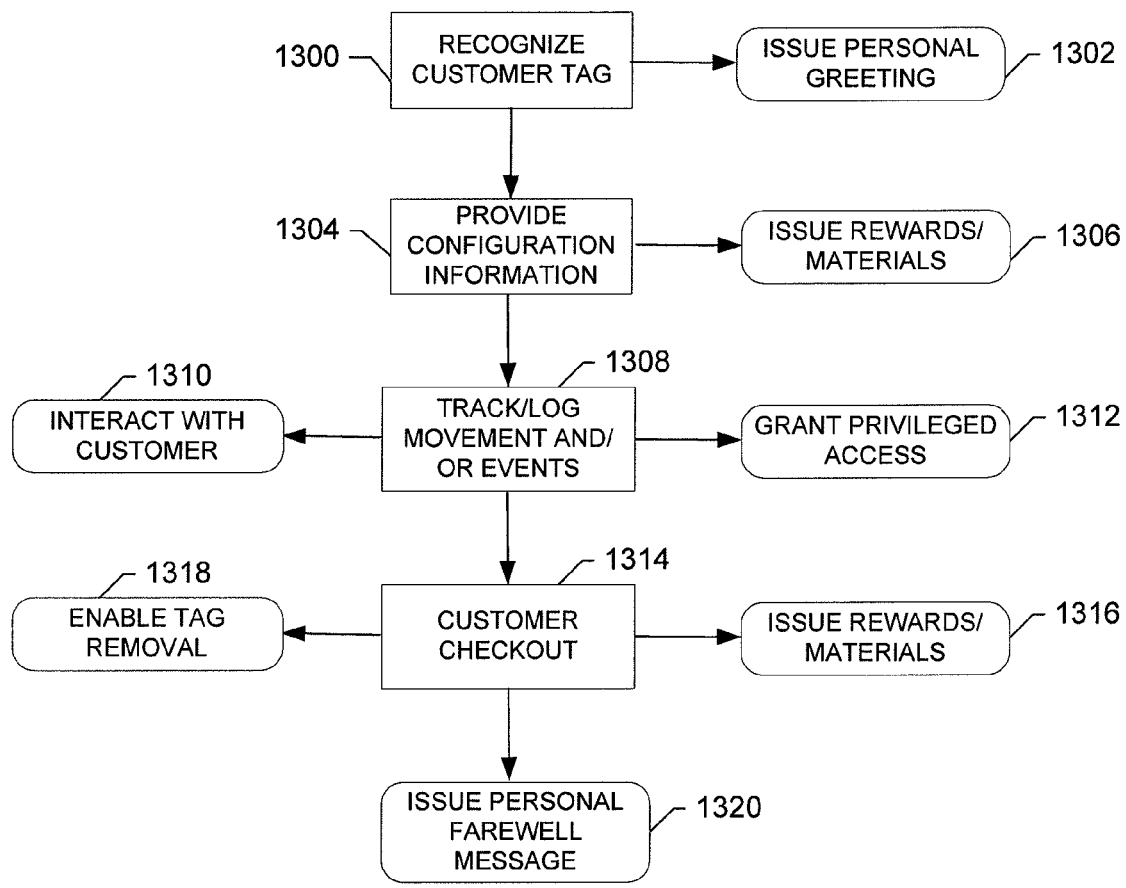
FIG. 16 is a flow chart illustrating a marketing protocol that may be executed by a network entity based on monitoring customer tags throughout a commercial environment according to an example embodiment.

FIG. 16 illustrates an example process diagram for facilitating transactions using a customer tag according to one embodiment. It should be noted, however, that some embodiments in accordance with FIG. 16 may include a number of optional operations and therefore not all of the operations displayed will be performed in some embodiments. Moreover, some embodiments may have different operations performed in addition to or instead of some of the operations shown in FIG. 16. In this example, a customer tag may initially be recognized in the retail environment at operation 1300. The recognition may occur at entry of a permanent customer tag, or after issuance of a temporary customer tag. In some cases, a personal greeting may be provided to the customer (audibly or on a display) at operation 1302. Configuration information may be provided to the customer tag at operation 1304. The configuration information may include a shopping list, guidance information, access codes, marketing information or other information. At operation 1306, the customer may receive coupons, incentive rewards or other materials, if applicable. At operation 1308, the customer tag may be tracked and events associated with the customer tag may be logged during the shopping experience. Interactions with monitoring terminals may be conducted as appropriate or requested at operation 1310 and privileged access may be granted at operation 1312.

After the shopping experience is complete, the customer may proceed to the POS terminal to checkout. During or as a result of customer checkout at operation 1314, incentive rewards (or other materials) may be applied or earned again at operation 1316. The customer may be enabled to remove product monitoring devices at operation 1318 and exit the store with a personalized farewell message at operation 1320 either as the customer exits or in response to turning in the customer tag.

3. Loyal Customer Rewards

Various incentive programs may be tied to the customer via the customer tag 1155 in order to enable the customer to receive rewards, coupons, enhanced access or functionality and/or the like. As such, the customer tag 1155 may be configured to operate as a personalized loyalty card. In some embodiments, the customer may unlock different levels of access, rewards or marketing materials based on participation. For example, by achieving various loyalty levels of participation (e.g., number of visits, number of purchases, aggregate dollar value of purchases, frequency of visits, surveys taken, profile information submitted, etc.), the customer may earn corresponding levels of reward or access. Accordingly, for example, profile information may also include information indicative of a customer loyalty level. In this regard, based on the customer loyalty level, various loyalty program features may or may not be available to the customer. For example, a customer tag 1155 associated with a customer having a particular customer loyalty level may be configured to signal the network entity 62 to allow a customer to use the self check out lane at a retail store, open a display case without the assistance of store personnel, open a security device that protects a product, purchase a product using pre-stored credit card information, decommission security tags associated with a purchased product, and the like. These functions may be performed by the network entity 62 accessing the customer profile and determining the loyalty level and then transmitting instructions to various components of the network to perform tasks, such as unlock a display case, for example, by sending an unlock signal to an event detection device 70 connected to the display case. Alternatively or additionally, customers may enroll in different levels of reward plans that may offer increasing rewards in exchange for commitments to corresponding levels of participation.

During the shopping experience, customers with customer tags 1155 may receive privileged access to some locations. For example, a customer that is loyal and trusted may have an authorization code associated with the customer tag 1155 that permits access to otherwise restricted locations. In this regard, FIG. 15 shows a display case 1191 that may enclose high value or other items that may each include a corresponding monitoring device. The display case 1191 may include a locking mechanism 1193 that may typically require an employee key to permit opening of the display case 1191. In some cases, the customer tag 1155 of a preferred or loyal customer may be enabled to open the locking mechanism 1193 without requiring assistance from an employee. In other embodiments, the network entity 62 may transmit an unlock instruction to the locking mechanism 1193. The customer tag 1155 may be useful for granting preferred access in other situations as well.

In some embodiments, specially configured nodes may be located at the POS terminal 1160 for decommissioning monitoring devices 10 when an item is purchased and/or for obtaining information regarding the sale for recordation (e.g., product information). In some cases, the node at the POS terminal 1160 may also include a key for unlocking monitoring devices 10 to permit their removal from products after payment has been received. The POS terminal 1160 and its unlocking functionality may typically be operated under the control of store personnel. As mentioned above, in some embodiments, the customer may be enabled to self checkout and/or unlock monitoring devices 10 using the customer tag 1155. As such, for example, the customer tag 1155 may interface with the POS terminal 1160, directly or through the network entity 62 in order to enable the customer to perform self checkout and/or unlocking of the tag. In some instances, the customer tag 1155 may emit an electronic key or code to unlock (or deactivate) the monitoring device 10. In some other cases, the customer tag 1155 may authenticate itself to the POS terminal 1160 or the network entity 62 to cause the POS terminal 1160 to emit an electronic key or code to unlock the monitoring device 10. Alternatively, after authentication to the POS terminal 1160 or network entity 62, the customer may receive access to a physical key to unlock the monitoring device 10. The monitoring device 10 may therefore be removed for use and subsequent commissioning with another item.

4. Customer Zone of Interest Message

Figure 17:
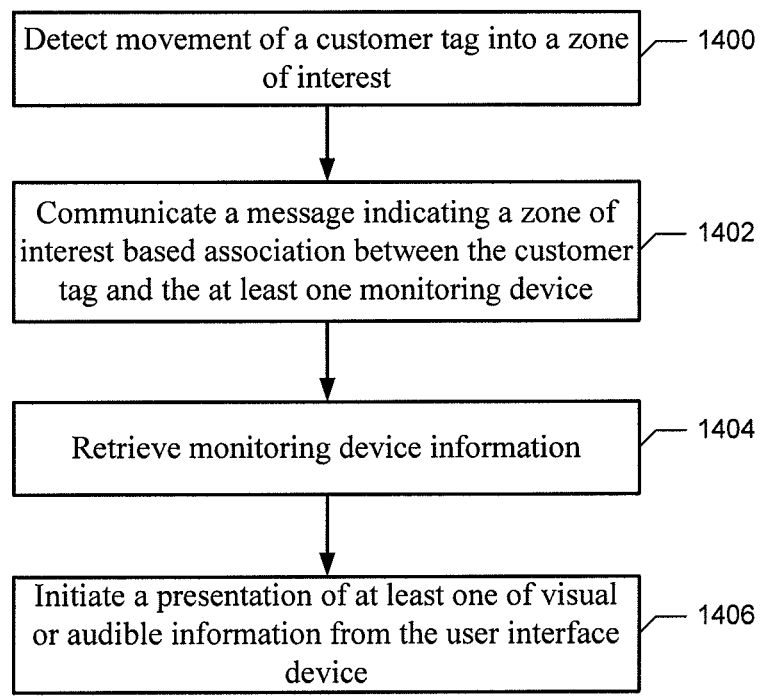
FIG. 17 is a flow chart illustrating a zone of interest based protocol that may be executed by a network entity based on the monitoring of customer tags according to an example embodiment.

FIG. 17 illustrates a flow diagram directed to an example method involving the utilization of zones of interest that may be implemented by a network and/or its components as described herein. For example, an example system with components configured to implement the method of FIG. 17 may include various embodiments of the network previously described.

Accordingly, at 1400, the network entity 62 may be configured to detect movement of a customer tag 1155 and/or determine whether the customer tag 1155 enters a zone of interest that is defined, e.g., with respect to the location of at least one product associated with a monitoring device 10. The network entity 62 may be further configured to communicate a message at 1402 indicating a zone of interest based association between the customer tag 1155 and the at least one monitoring device 10. In this regard, a "zone of interest based association" indicates that the customer tag 1155 has been associated with ping node location data from a ping node 66 in such a manner as to indicate that the customer tag is within the zone of interest. Further, at 1404, the network entity 62 may be configured to, in response to at least receiving the zone of interest based association, retrieve product information about a nearby product associated with a monitoring device 10. The network entity 62, at 1406, may be further configured to initiate a presentation of at least one of visual or audible information from a monitoring terminal 80 associated with the zone of interest, possibly via communication from the network entity 62 to the monitoring terminal 80, based at least on the product information associated with the monitoring device 10 attached to the product. Therefore, the network entity 62 may be configured to initiate a presentation to market a nearby product to the customer that has just stepped into the zone of interest.

Additionally or alternatively, the network entity 62 may be configured to initiate the presentation of the at least one of visual or audible information, where the at least one of visual or audible information is information about a second product that is related to a first product that is affixed to the monitoring device 10, and the second product being associated with the first product via a relationship defined in a data structure stored, for example, in a memory device of the network entity 62 or the monitoring device 10. In this regard, the at least one of visual or audible information may be information about a competing product. Further, according to some example embodiments, the network entity 62 may be additionally or alternatively configured to initiate a communication to provide an electronic coupon to the customer tag, or initiate a communication that causes the monitoring terminal 80 to print and/or dispense a physical coupon. Additionally or alternatively, the network entity 62 may be configured to initiate the presentation of the at least one of visual or audible information, where the at least one of visual or audible information is directional guidance for a customer to a defined location. In some example embodiments, the network entity 62 may be additionally or alternatively configured to initiate the presentation of the at least one of visual or audible information, where the at least one of visual or audible information is information about pricing of at least one product that is related to a product affixed to the monitoring device 10 via an association defined in a data structure stored in a memory device of the network entity 62 or the monitoring device 10. Additionally or alternatively, the network entity 62 may be configured to initiate the presentation of the at least one of visual or audible information, where the at least one of visual or audible information is provided in association with a user input device to enable interactive presentation of the at least one of visual or audible information and capturing of user input via the monitoring terminal 80. In this manner, a user of the monitoring terminal 80 may, for example, request that service personnel be alerted to the needs of the user.

According to some additional example embodiments based on the method of FIG. 17, the network entity 62 may be additionally or alternatively configured to initiate the presentation of the at least one of visual or audible information, where the at least one of visual or audible information is information about inventory availability of at least one product that is associated to the monitoring device 10 in a data structure. For example, the at least one of visual or audible information may be information about different sizes of a clothing article that are available in inventory. In some example embodiments, the network entity 62 may be additionally or alternatively configured to initiate the presentation of the at least one of visual or audible information, the at least one of visual or audible information being personal information about an individual person associated with the customer tag. Additionally or alternatively, the network entity 62 may be configured to initiate a communication that causes access to a display case to be provided based on a customer loyalty level associated with the tag.

5. Customer Counter

Figure 18:
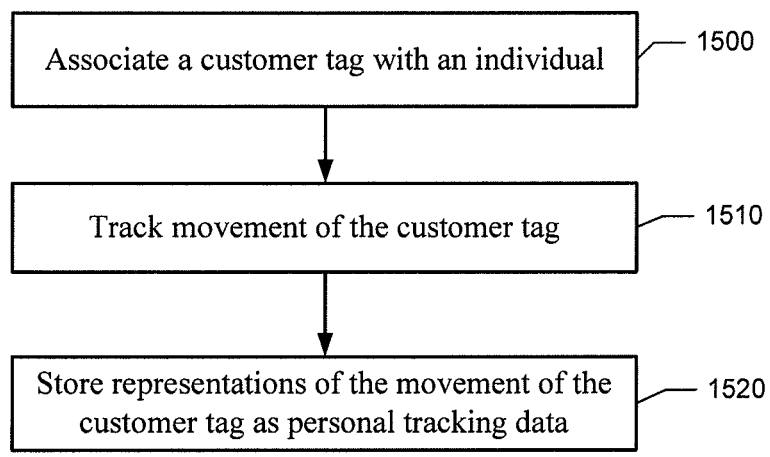
FIG. 18 is a flow chart illustrating a customer tracking based protocol that may be executed by a network entity based on the monitoring of customer tags according to an example embodiment.

FIG. 18 illustrates another flow diagram directed to an example method involving the utilization of customer tags 1155 to track movement of individuals within a monitored environment. The example method of FIG. 18 may be implemented by a network and/or by its components, such as the network previously described.

In this regard, with respect to the example method of FIG. 18, the network entity 62 may be configured to associate a customer tag with an individual within a relational data structure at 1500. The relational data structure (e.g., a database) may be stored on a memory device of the network entity 62. The network entity 62 may be further configured to track movement of the customer tag at 1510 and, by association, movement of the individual within a monitored commercial environment that is configured to communicate at least with the network entity 62. Being configured to track movement of the customer tag may include being configured to receive information derived from a communication initiated by the customer tag, where the communication is initiated by the customer tag including ping node location data sent from a ping node. The ping node signal, sent from the ping node, in some embodiments, may further comprise a time stamp indicating a time when the customer tag received a communication from the ping node. Additionally, the network entity 62 may be configured to store, for example in a memory device of the network entity 62 or in a remote memory device, representations of the movement of the customer tag as personal tracking data at 1520.

According to some example embodiments of the example method and system of FIG. 18, the network entity 62 may be additionally or alternatively configured as follows. In some example embodiments, the network entity 62 may be additionally or alternatively configured to aggregate the personal tracking data to generate a customer shopping movement profile, where the customer shopping movement profile indicates the location of a customer tag over a period of time.

Further, according to some example embodiments, the network entity 62 may be additionally or alternatively configured to associate the customer tag with personal information including a charge account number of the individual. Additionally or alternatively, the network entity 62 may be further configured to disassociate the customer tag from the individual in the relational database (e.g., when the individual returns the customer tag to the service desk) and associate the customer tag with another individual in the relational database.

Additionally, or alternately, according to some example embodiments, the network entity 62 may be further configured to associate the customer tag with a customer loyalty level in the relational database, and provide privileges to the individual associated with the customer tag based on the customer loyalty level. Further, in some example embodiments, the network entity 62 may be additionally or alternatively configured to associate the customer tag with a customer loyalty level in the relational database, and provide privileges to the individual associated with the customer tag based on the customer loyalty level, wherein the loyalty level is determined based on the personal tracking data. According to some example embodiments, the network entity 62 may be configured to receive a communication including a representation of a unique identifier from a barcode or magnetic strip reader, where the unique identifier is provided by a loyalty card associated with the individual. Additionally, or alternately, according to some example embodiments, the network entity 62 may be further configured to incorporate the personal tracking data into personal tracking data for other customer tags to generate a customer traffic density profile over a period of time for the monitored commercial environment.

According to some additional example embodiments associated with the method and system of FIG. 18, the network entity 62 may be further configured to incorporate the personal tracking data into personal tracking data for other customer tags to generate a time-based customer traffic density profile for the monitored commercial environment, and generate a customer count over a period of time at a selected location within the commercial environment. Additionally, or alternately, according to some example embodiments, the network entity 62 may be further configured to incorporate the personal tracking data into personal tracking data for other customer tags to generate a time-based customer traffic density profile for the monitored commercial environment, and generate a customer count over a period of time at a selected location within the commercial environment, wherein the selected location is associated with a product display. Further, in some example embodiments, the network entity 62 may be additionally or alternatively configured to incorporate the personal tracking data into personal tracking data for other customer tags to generate a customer route profile over a period of time, where the customer route profile indicates an aggregation of routes traveled by the customer tag and other customer tags within the monitored commercial environment.

Accordingly, embodiments of the present invention may provide numerous different opportunities for users to receive incentives and improvements to a shopping experience. Functionalities that may be provided by embodiments of the network include, among other things, the presentation of customer specific product or marketing information at a display, the presentation of a message specific to the customer, the initiation of tracking and/or guidance for the customer tag, among others.

F. Market Optimization

Example marketing compliance applications and functionality may also be implemented by the network as described herein. In this regard, some retail stores may have requirements for how the store should be set (i.e., where particular products should be located within the store). A floor plan or marketing compliance set design may be followed for setting the store. To ensure that a store complies with a given set design, the location of monitoring devices 10 may be queried. Monitoring devices 10 associated with particular products, product displays, marketing materials, or the like may be checked against a stored, electronic set design to ensure that the products, product displays, marketing materials, or the like are located in the correct locations within the store. For example, the location of the winter sweaters within the store may be queried, to determine if the winter sweaters have been located on a table at the entrance of the store in accordance with a set design. The results of the query may be compared to the set design to determine whether the store complies in this regard. Thus, for example, if marketing compliance protocols require that a particular item be located proximate to a sale sign, monitoring devices on the item and the sign may be used to determine whether the store is compliant in this regard.

Figure 19:
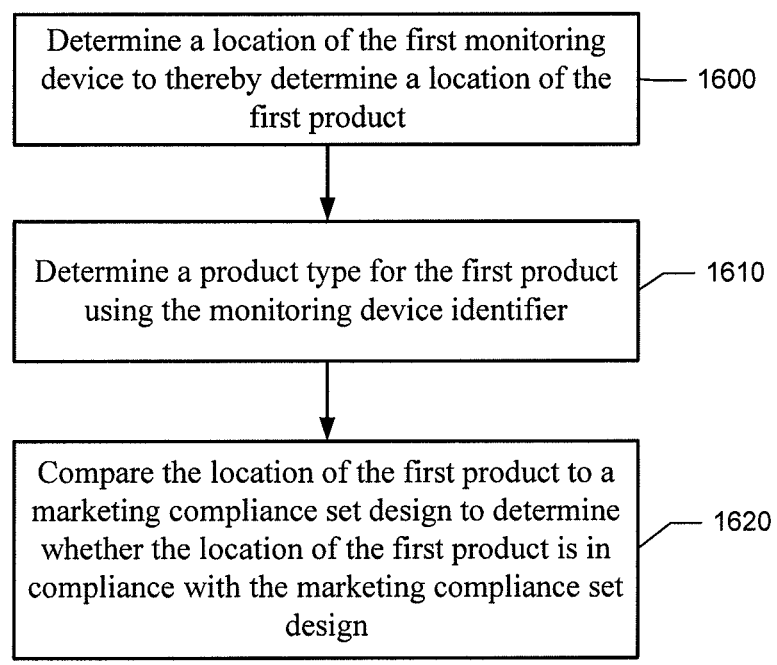
FIG. 19 is a flow chart illustrating a market compliance protocol that may be executed by a network entity according to an example embodiment.

FIG. 19 illustrates another flow diagram directed to an example method involving the utilization of a network to measure and indicate marketing layout compliance within a monitored environment. The example method of FIG. 19 may be implemented by a network and/or by its components, such as the network previously described.

In this regard, with respect to the example method of FIG. 19, the network entity 62 may be configured to determine a location of the first monitoring device 10 to thereby determine a location of the first product at 1600. In this regard, determining the location of the first monitoring device 10 may include receiving a monitoring device 10 location communication initiated by the monitoring device 10 indicating ping node location data from a nearby ping node 66. The network entity 62 may be further configured to determine a product type for the first product using the monitoring device identifier and stored product information, at 1610, as indicated in a relational data structure that is possibly stored in a memory device of the network entity 62. Additionally, the network entity 62 may be configured to compare the location of the first product to a marketing compliance set design to determine whether the location of the first product is in compliance with the marketing compliance set design at 1620.

According to some example embodiments of the example method and system of FIG. 19, the network entity 62 may be additionally or alternatively configured as follows. In some example embodiments, the network entity 62 may be additionally or alternatively configured to perform the operations of determining a location of a monitoring device 10, determining a product type for a product affixed to the monitoring device 10, and comparing the location of the product to a marketing compliance set design, for each monitoring device 10 within the plurality of monitoring devices 10 within a monitored commercial environment to determine a compliance result for a respective product associated with each monitoring device 10. Additionally or alternatively, the network entity 62 may be configured to determine a global compliance factor based on these compliance results. Further, in some example embodiments, the network entity 62 may be configured to compare the location of the first product to the marketing compliance set design, where the marketing compliance set design is a map of a commercial environment that indicates where commercial sale products are to be placed within the commercial environment, and wherein the first product is a commercial sale product. In some example embodiments, the network entity 62 may be additionally or alternatively configured to compare the location of the first product to the marketing compliance set design, where the marketing compliance set design is a map of a commercial environment that indicates where commercial sale products are to be placed within the commercial environment, and wherein the first product is a commercial sale display.

IV. Pricing Tools

In some embodiments, the present invention may comprise a network further configured to perform pricing functionality. The network, for example, may be configured to monitor and manage pricing of products and may make automatic price modifications. Further, monitoring and managing of prices may be implemented with electronic shelf pricing. Additionally or alternatively, the network may be configured to implement price changes depending on schedules and/or pre-defined protocol(s).

A. Automatic Price Modification

Another example marketing application may be automatic price modification. In this regard, the network entity 62 may be configured to change the price of a product (or suggest the change of a price for the product) based on various factors. For example, the network entity 62 may be configured to implement a timer and determine a "time on the sales floor" value or other indicator of the time that a particular product has spent on the retail floor without being sold (or in some cases without being even handled, i.e., moved). If the time on the sales floor value reaches a threshold level, the price for the article that a monitoring device 10 is associated with may be modified or at least a message may be sent by the network entity 62 to store management to identify the corresponding product and suggest a price modification. To support this functionality, according to some example embodiments, when the monitoring device 10 is commissioned or is placed on the sales floor, a time and date threshold for the monitoring device 10 may be defined in the memory of the network entity 62. For example, a thirty day threshold may be set. When thirty days has passed, as determined by the network entity 62 from signals from the monitoring device 10, the monitoring device 10 may be configured to, or the network entity 62 may be configured to, modify or suggest modification of the price of the article. Additionally or alternatively, the monitoring device 10 may alarm when the threshold is reached indicating to sales personnel that the monitoring device 10 should be moved to the clearance rack. The price may also be modified based on the sales of related products. For example, if sales of a particular product have been increasing, the price may be automatically raised according to a pre-defined protocol. Alternatively, if the sales of retail product have been decreasing, the price may be automatically lowered according to a pre-defined protocol. In other embodiments, similar pre-defined protocols could be established for raising or lowering prices based on increasing or decreasing consumer handling (i.e., movement of monitoring devices associated with retail products).

Figure 20:
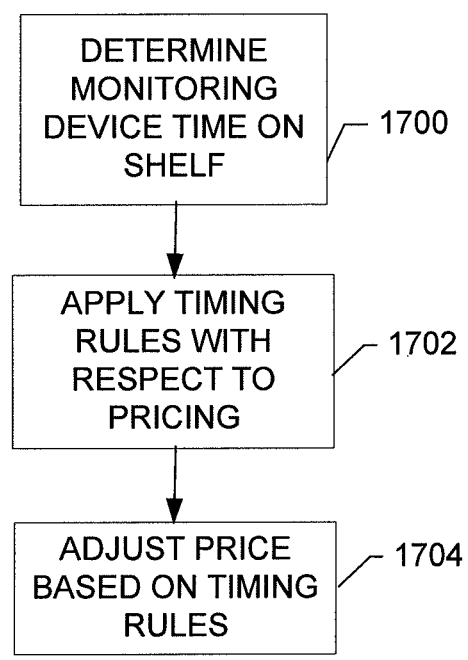
FIG. 20 is a flow chart illustrating a price adjustment protocol configured for execution by a network entity according to an example embodiment.

FIG. 20 illustrates an example flow chart of price modification according to an example embodiment. In this regard, at operation 1700, a determination may be made as to the time a product associated with a monitoring device 10 has been on a shelf (or on the sales floor). At operation 1702, timing rules may be applied with respect to pricing. Thereafter, at operation 1704, the price may be adjusted based on the timing rules.

B. Electronic Shelf Pricing

Although the monitoring device 10 may communicate with the network entity 62 in order to interact for price modification situations in some cases, in alternative embodiments the monitoring device 10 or the network entity 62 may communicate directly with pricing components (e.g., electronic shelf labels). For example, in some stores, pricing information is not included on the product itself, but is instead included on an electronic display that may be on a shelf associated with the product or otherwise proximately located with respect to the corresponding product. In some of these scenarios, the monitoring device 10 or network entity 62 may be configured to communicate directly with the electronic price displays. For example, various functionalities may be triggered, based on the role and the configuration information of the monitoring device 10 or network entity 62. As an example, the I/O ports of a monitoring device 10 processor may interface with a display for a price tag. In some example embodiments, time may be monitored by the processor of the monitoring device 10 or network entity 62 and when the given time is reached, the monitoring device 10 or network entity 62 may direct the display to depict a reduced price. Alternatively, an example that includes triggering at the network entity 62 level may include the time being monitored by the network entity 62, and the network entity 62 may communicate a message including a reduced price, or an indication to reduce the price, to the price tag or the monitoring device 10.

C. Pricing Changing Schedule

Figure 21:
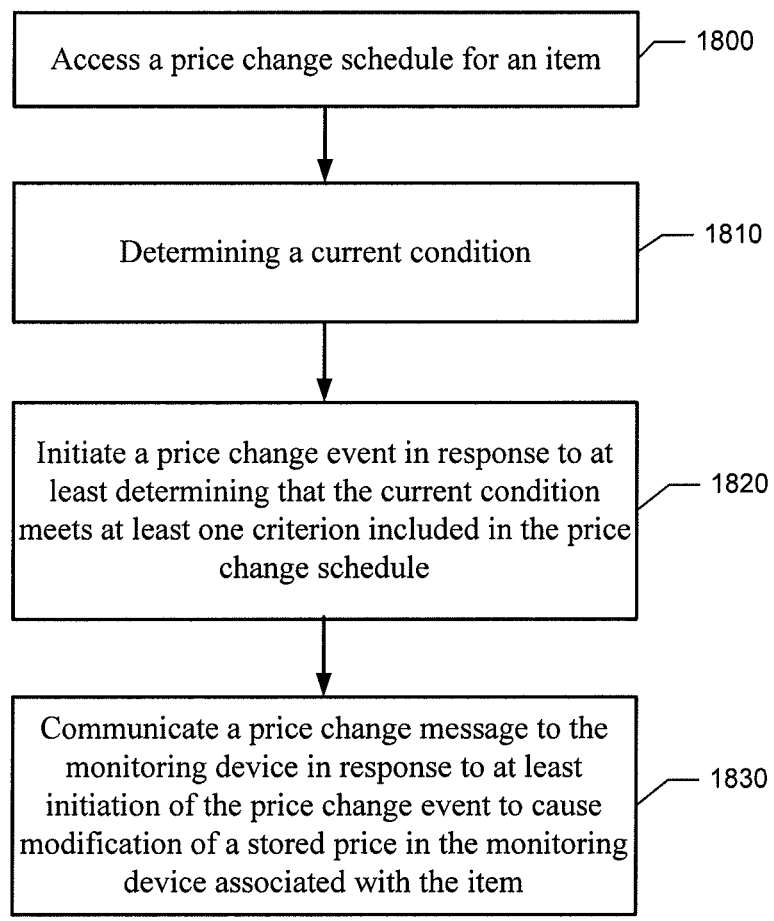
FIG. 21 is a flow chart illustrating a price change schedule protocol configured for execution by a network entity according to an example embodiment.

FIG. 21 illustrates another flow diagram directed to an example method involving the utilization of a network to perform price changes based on a schedule within a monitored environment. The example method of FIG. 21 may be implemented by a network and/or by its components, such as the network previously described.

In this regard, with respect to the example method of FIG. 21, the network entity 62 may be configured to access a price change schedule for an item at 1800, determine a current condition at 1810, and initiate a price change event in response to at least determining that the current condition meets at least one criterion included in the price change schedule at 1820. The network entity 62 may be further configured to communicate a price change message to the monitoring device 10 or electronic price tag in response to at least initiation of the price change event to cause modification of a stored price in the monitoring device associated with the item, as indicated at 1830.

According to some example embodiments of the example method and system of FIG. 21, the network entity 62 may be additionally or alternatively configured as follows. The network entity 62 may be additionally and alternatively configured to determine the current condition, wherein the current condition is the current time and date. Additionally, or alternately, according to some example embodiments, the network entity 62 may be configured to determine the current condition as the current time and date, and initiate the price change event in response to at least determining that the current condition meets the at least one criterion, the at least one criterion including a start time and an end time for the price change event. Further, in some example embodiments, the network entity 62 may be additionally or alternatively configured to determine the current condition as the current time and date, and initiate the price change event in response to at least determining that the current condition meets the at least one criterion, the at least one criterion including a threshold inventory quantity for a product. Additionally, or alternatively, according to some example embodiments, the network entity 62 may be configured to communicate the price change message to cause modification of a stored price in the monitoring device 10 or electronic price tag associated with the item, wherein the item is associated with a product display including a user interface that presents the stored price (e.g., electronic price tag). In some example embodiments, the network entity 62 may be additionally or alternatively configured to initiate the price change event in response to at least determining that the current condition meets the at least one criterion, the at least one criterion including a threshold duration that a product has been located on a sales floor. In this regard, the duration that the product has been on the sales floor may begin when the product is first placed on a display on the sales floor. An example duration may be one month, and accordingly, after one month of being on the sales floor a price change event may occur in accordance with the price change schedule.

V. Inventory Tools

Further to the discussion above, the network entity 62 may be embodied as, include or otherwise control an inventory manager. The network entity 62, as an inventory manager, may be any means such as a device and/or circuitry operating in accordance with firmware, software, hardware, or a combination of hardware and firmware/software (e.g., the processor of the network entity 62).

A. Inventory Management Functionality

Thus, in some embodiments, the network entity 62 may be configured to coordinate, manage, and configure the operation of monitoring devices 10 and other network components with respect to inventory management. In this regard, for example, the network entity 62 may be enabled to query monitoring devices 10 for product information or store product information in association with each monitoring device identifier in a database (e.g., in the memory device). The network entity 62 may also store a plurality of inventory based rules defining different inventory management related functionalities that may be executed either via manual or automatic initiation techniques. In some cases, inventory management functions may work together with or operate using information that may be gathered in connection with other modalities or functionalities of the monitoring devices 10, ping nodes 66, or other network components. In this regard, for example, the security function of the network entity 62 may be principally responsible for managing a monitoring device 10 tracking mode during which monitoring device 10 movement may be monitored and/or tracked. Information gathered via monitoring device tracking may be useful in connection with inventory management and therefore may be communicated to or otherwise accessible to the network entity 62 for inventory management functionality. The network entity 62 may then use the information received to process information according to processing rules and perform corresponding functions or tasks based on the triggering of respective different rules.

1. Monitoring Device Locating

According to some example embodiments, and discussed previously with respect to the locating protocol, the ping node signals generated by the ping nodes may be used for locating a monitoring device 10. In this regard, a monitoring device 10 may be configured to report to, for example, the network entity 62 that the monitoring device 10 is currently within the range of a ping node. The ping nodes 66 may be configured to randomly, based on an algorithm, modify the ping node signal strength. When the signal strength is modified, some monitoring devices 10 that were in range may no longer be in range, or some monitoring devices 10 that were previously in range may now be within range of the ping node signal. As monitoring devices 10 come in and out of range, due to the changing ping node signal strength, the ping node signal strength at the time may be used to determine the distance that a monitoring device 10 is from a particular ping node 66. In some cases, if the distance is determined with respect to multiple ping nodes 66, a physical location of the monitoring device 10 can be determined.

According to some example embodiments, standard operating power settings (describing standard fluctuations in power) may be utilized in a standard locating mode. In an active locate mode, when the location of a specific article is desired, active locate power setting may be utilized. Due to interference that can occur in enclosed environments, such as retail stores, a signal power optimization procedure may be performed by the network entity 62, for example, directed by the network entity 62, to minimize interference and determine optimum signal strength for ping node signals. In this regard, the signal strength of the various ping nodes 66 may be modified to determine settings where minimal interference and ping node signal overlap occurs.

The network entity 62 may be configured to analyze data to identify and classify various conditions based on the analyzed data. For example, in response to activity that may be indicative of picking up a product, either detected locally (e.g., at a specific monitoring device 10) or identified remotely (e.g., by analysis conducted by the network entity 62), the network entity 62 may be configured to track the movement of the monitoring device 10. Then, for example, based on the rules associated with inventory management, the network entity 62 or monitoring device 10 in response to instruction from the network entity 62, may perform a corresponding function.

Although the above described tracking function may clearly have inherent security uses, embodiments of the present invention may further enable flexibility with respect to inventory management uses that may be provided. In this regard, for example, the efficiency of shelf stocking, product placement, and other activities may also be monitored and evaluated using data indicative of the movement of monitoring devices 10.

2. Zone of Interest Monitoring Device Locating

In addition to simply outputting the location of the monitoring device to the user interface of the network entity 62, the network entity 62 may be configured to consider the location information of a monitoring device (i.e., the location of ping node(s) associated with the monitoring device) with respect to defined rules, reporting requirements, alarm conditions, and alarm responses. In this regard, zones of interest, as previously described with respect to other embodiments, may be useful for inventory management functionality.

In this regard, for example, various specific rooms or spaces may be designated as zones of interest with corresponding monitoring and/or inventory management functions associated therewith. As an example, store personnel may wish to define various zones for use in product locating. Accordingly, for example, if a particular product is to be located without using more detailed tracking or locating methods, a general locating mechanism such as identification of the zone or room in which the product is located may be sufficient. In this regard, the stock room may be one zone of interest, while the retail floor is a separate zone of interest. Based on the ping nodes 66 with which a particular monitoring device 10 is receiving ping node signals from, a general location of the monitoring device 10 may be easily obtainable by either querying the monitoring device 10 or based on routine location reports received from the monitoring device 10.

3. Locator Tag

More specific locating may also be enabled using control of ping node signals to determine more detailed location information for a particular monitoring device 10. In some embodiments, a locator tag in the possession of an individual attempting to locate a target monitoring device 10 may be configured to provide a user with an indication of the where the target monitoring device 10 is located or how far the target monitoring device 10 is away from the locator tag. The locating tag and/or the target monitoring device 10 may be configured to provide audible and/or visual feedback to the user to indicate the location of the target monitoring device 10. For example, the locating tag and/or the target monitoring device 10 may be configured to output audible beeps or chirps (similar to the sound of a Geiger counter), the frequency of which may increase as the locating tag moves closer to the target monitoring device 10. The output may be based on locating that is performed via the ping nodes described above, or via signal strength detection directly between the locating tag and the target monitoring device 10.

4. Product Location and Accounting

Apart from locating specific items, other inventory functionality may also be performed by embodiments of the present invention. In this regard, for example, product counting may be accomplished. In some cases, the network entity 62 may query all products or all product associated monitoring devices 10 in a particular location or of a particular product type (e.g., as identified by product information associated with a monitoring device identifier). Responses to the query may be counted to get a count of the number of corresponding products either generally or within a specific location. In some embodiments, the network entity 62 may direct all monitoring devices 10 to report and then classify the reports received by product type (or other distinguishing product characteristics such as size, color, style, etc.) or location in order to obtain a full inventory of items associated with monitoring devices 10 that are classified by product type and/or location.

Figure 22:
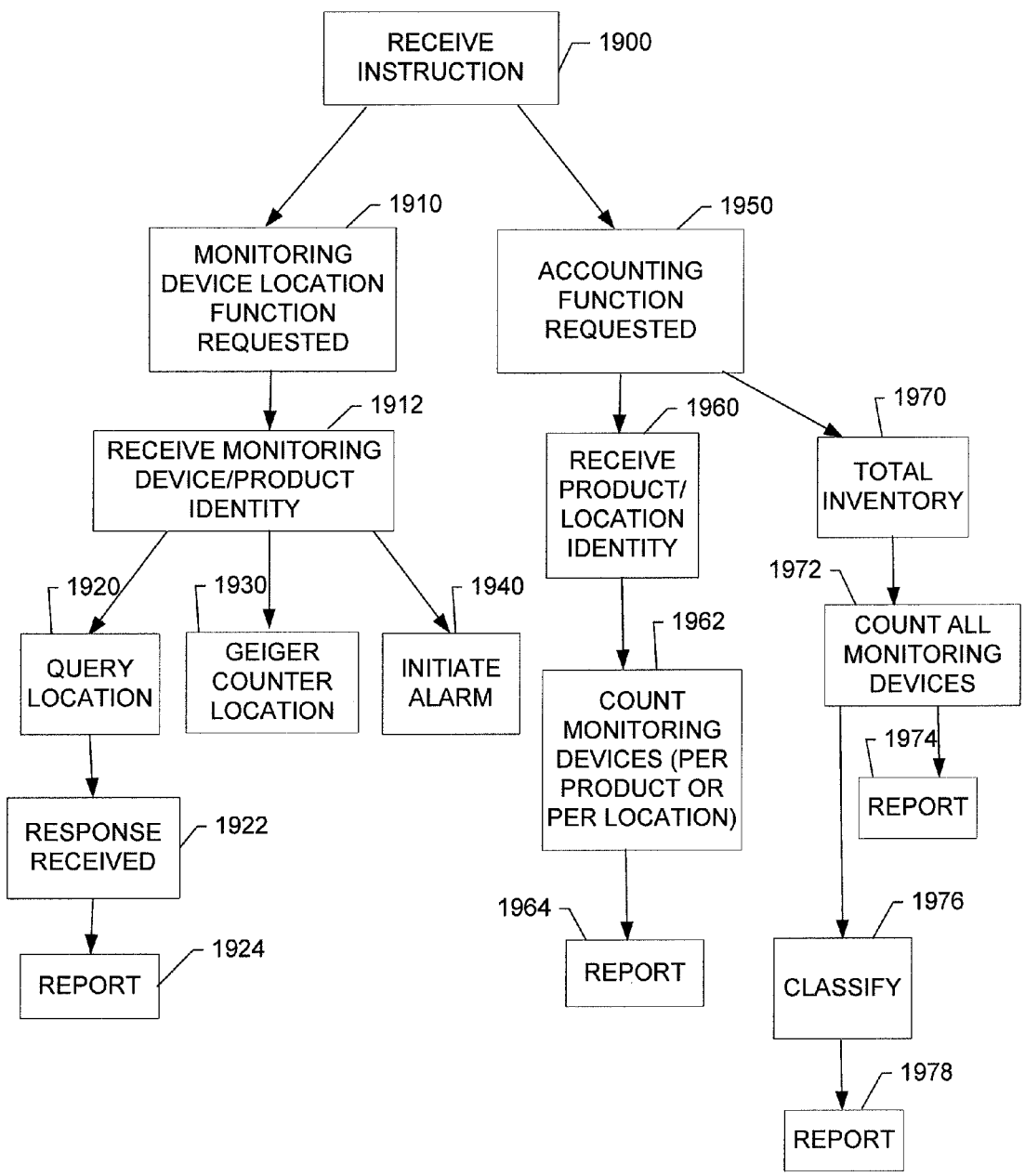
FIG. 22 is a flow chart illustrating an inventory management protocol configured for execution by a network entity according to an example embodiment.

FIG. 22 illustrates some example operations that may be employed in connection with some embodiments of the present invention from the perspective of the network entity 62. As shown in FIG. 22, the network entity 62 may initially receive instructions to perform an inventory function at operation 1900. The instructions may be automatically generated based on timing rules defining the frequency at which inventory operations are to be conducted for certain products, certain stores, certain product lines, certain departments, and/or the like. Alternatively, the instructions may be received by virtue of user input or request. The user may be local or remote in various different embodiments. As such, for example, a user may utilize the user interface of the network entity 62 or the user may input a request to check inventory from a remote computer (e.g., at corporate headquarters or some other company location such as another store, or from a customer requesting real-time inventory status).

The instructions received at operation 1900 may direct the performance of one of two general inventory functions including either monitoring device location 1910 or monitoring device accounting 1950. Monitoring device location functionality may, in some embodiments, further require reception of an identity of the monitoring device or product to be located at operation 1912. After the monitoring device or product to be located is identified, the network entity 62 may issue a location query at operation 1920. If a response is received at operation 1922, a report on location may be issued at operation 1924. In some alternative embodiments, rather than issuing a location query, the network entity 62 may signal a monitoring device associated with the product to be located to alarm, at operation 1940. The corresponding monitoring device may then alarm to identify the location of the corresponding product. In some examples, at operation 1930, a locator tag may be commissioned to initiate Geiger counter-like functionality to locate a target monitoring device as described above.

For monitoring device accounting 1950, the network entity 62 may initially receive a monitoring device identifier signal associated with the product to be located, at operation 1960. This signal may also contain ping node location data. The network entity 62 may then initiate a count of active monitoring devices for the corresponding product or location identified at operation 1962 and provide a report at operation 1964. In some embodiments, when a total inventory is desired as shown at operation 1970, the network entity 62 may initiate a count of all monitoring devices at operation 1972. The total count may be reported at operation 1974 or, in some cases, the total count may be classified by location and/or product characteristic at operation 1976 prior to reporting at operation 1978.

Embodiments of the present invention may therefore be used to obtain real-time inventory information on any specific product, monitoring device, or line of products in a flexible manner. Moreover, instant inventory information may be achieved for products associated with a monitoring device either by routine (e.g., via time based rules) inventory operations or by requested inventory operations. Furthermore, due to the availability of access via the network entity 62 to a global network such as the internet, embodiments of the present invention may also enable remote access to inventory functions. By enabling remote access to inventory information, enterprise management of inventory may be made possible. For example, if the network entity 62 of a retail chain is located remotely, but is able to check inventory for each of a plurality of outlets or stores based on real-time inventory information, the retail chain may be more able to provide adequate inventory based on current conditions and may also be enabled to study inventory related data and respond to trends in a more timely fashion.

B. Customer Inventory Tools

1. Local Customer Inventory Query

In some embodiments, customers may be enabled to interface with the monitoring terminals 80 via a touch screen or other user interface in order to identify products of interest and check inventory availability. In some cases, the customer may browse products to identify a product of interest. In some other instances, the customer may bring a product associated monitoring device 10 proximate to the monitoring terminal 80 and the monitoring terminal 80 may retrieve information associated with the product from the network entity 62. The user may then interface with the monitoring terminal 80 to retrieve related information that may be of interest. For example, if the customer has found a desirable style of jeans with a 38 inch waist, but wants to know if the same style of jeans are available with a 34 inch waist, the customer may approach the monitoring terminal 80 with the 38 inch waist jeans. After the monitoring terminal 80 has recognized and displayed information about the 38 inch waist jeans, the customer may interface with the monitoring terminal 80 to query regarding 34 inch waist jeans in the same style. The monitoring terminal 80 may then check inventory, via the network entity 62, in real-time to determine whether such jeans exist. If the desired jeans are in stock, the customer may be informed and, perhaps also directed to the location of a corresponding item via the locator tag or other locating protocol as described above. In one embodiment, for example, if the desired 34 inch waist jeans were located among the products immediately adjacent the monitoring terminal 80 (perhaps buried under a stack of similar jeans), the network entity may transmit a signal to the desired jeans causing the associated monitoring device to issue an audible chirp or other message while also flashing an LED light.

2. Web-based Customer Inventory Query

Additionally, for example, a potential customer may be enabled (sometimes via proper identification and/or authentication) to log into a web page associated with providing online shopping for a retail store. Once logged in, the customer may be enabled to browse various products of interest and check the actual real-time availability of the product at a store of the customer's choosing. The customer may also be presented with the real-time location of the product in question via presentation of a virtual store map. Thus, for example, if the customer is interested in a particular product in a certain size, color or style, the customer may be enabled to determine whether the particular product is in stock at one or more store locations near the customer and further enabled to identify where, in a particular store of interest, the desired product may be found.

In some embodiments, the customer may be enabled to purchase a desired product online, or request that the product be set aside for the customer to come into the store and try on or try out. Once the request is made, store personnel may be led to the corresponding product via locating embodiments described above and may remove the product to the fitting room or another location at which the customer may pick up the product when the customer arrives at the store. If a customer purchases the item, the associated monitoring device 10 may be decommissioned by a node at the POS terminal and removed from inventory. The monitoring device 10 may then be associated with another product and commissioned accordingly for use in association with the other product.

VII. Global Network

In some exemplary embodiments, each of a plurality of stores may employ separate networks. These networks may be interconnected and/or interconnectable via an intranet, the internet and/or other network. Accordingly, although each particular store may have its own respective PAN identifier so that monitoring devices 10 and ping nodes 66 of one store avoid interfering with or otherwise communicating with the monitoring devices 10' or the network entity 62' of another store, the ability to interconnect between stores may enable various aspects of collaborative security, marketing, or inventory functions. Additionally or alternatively, a global network entity may be configured to monitor and manage individual network entities 62 assigned to specific retail stores. The global network entity may have at least all the functionality of the various embodiments of the network entity 62 described herein. Additionally or alternatively, the global network entity may communicate, via the external network, to individual network entities 62 to perform functions, such as creating security, marketing, inventory, and other reports for specific retail stores or a global network of specific retail stores.

A. Global Security

In this regard, for example, information regarding suspicious individuals may be shared between stores via the internet or some other network. In some cases, this may be via email alerts, phone calls, sharing of video content, etc. In other cases, monitoring devices removed from one store may be reconfigured to operate with a PAN of another store. Accordingly, the network entity 62 may be dynamically reconfigured to permit tracking or alarming of the monitoring device even within another store or another shopping center.

B. Global Marketing

1. Mall Based Marketing

In some cases, embodiments of the present invention may be implemented within a shopping mall and information associated with stores in the mall may be shared in a collaborative manner. Some useful information that may be extracted and shared in such an environment may include, for example:

i. Correlations between stores visited;
ii. Correlations between product types purchased;
iii. Suggested selling based on "partner" network enabled stores;
iv. Product display locations most frequently visited;
v. Product display locations having highest sales;
vi. Marketing display configurations most frequently visited;
vii. Marketing display configurations having highest sales;
viii. Correlations/relative importance between display location and marketing display configuration;
ix. Marketing display compliance rate for retailers;
x. Correlations between displays/marketing display configurations visited; and
xi. Correlations between clerk positioning, levels of staffing, and loss rate.

2. Global Market Compliance

In other embodiments, and in relation to the previous description of market compliance functionality, the query regarding marketing compliance within a particular retail store may be made from either local or remote personnel. As such, for example, remotely located compliance officers may inspect a retail store, or multiple retail stores, remotely and issue messages to management based on the remote inspection results. Alternatively, local store management may run compliance checks and institute corrective measures as appropriate.

C. Global Inventory

In other example embodiments, inventory functionality may be initiated through an external network linking separate network entities 62 in different retail stores. Thus, global retail management or other programs inquiring about inventory may be made remotely to search all available inventory across all the stores connected via the external network.

VIII. Bridge Device

In other example embodiments a protocol bridging device may be implemented, which may support inter-system compatibility (e.g., backwards-compatibility) for security system functionality, as well as additional functionalities that would be beneficial to store owners, store managers, and customers. For example, some example embodiments support bridging communications of a radio frequency identification (RFID) communication protocols (such as RFID active, passive, or semi-passive protocols) and communications from wireless networks based on short range communication protocols (e.g. IEEE 802.xx protocols).

For example, many of the applications and functionalities described herein utilize wireless communications between a network entity and the monitoring devices via the short range communication protocol that are compliant with, for example, the IEEE 802.15 standards. In addition to, or in lieu of, communicating with individual monitoring devices via this air interface, one or more communications interfaces of the monitoring terminal may communicate, directly or indirectly, with a separate bridge device to forward and receive information external to the monitoring system's network, allowing other types of network data to flow from and to monitoring devices. The bridge device may operate unilaterally or in conjunction with the server 63 to manage the communications to and from the monitoring devices. The bridge device, which may be implemented as, e.g., a fixed position communications device, a hand-held scanner-type device, and/or a monitoring device affixed to a retail product, can be configured to operate in at least two communication modes to interface with monitoring devices and/or the network entity 62 for security, inventory, marketing and other purposes.

As noted herein, in addition to being configured to communicate with the monitoring system using a short range communication protocol, the bridge device can be configured to communicate with RFID devices, such as an RFID reader, that communicate using, for example, a RFID communication protocol. For example, the RFID reader and the bridge device may be configured to communicate in accordance with the Generation II UHF RFID standards, which may involve the RFID reader broadcasting an interrogation signal to which the bridge device responds.

In a second communication mode, the bridge device can communicate with and/or relay information provided by the RFID reader to tags using a protocol built on an IEEE 802.xx standard (e.g., 802.15.4 standard, such as ZigBee), a proprietary protocol built on IEEE 802.15.4, and/or any other short range communication protocol. To support the dual modes of communication (e.g., RFID communication protocol and short range communication protocol), the bridge device may include a transmitter/receiver and an antenna configured to support for example, IEEE 802.15.4, as well as, a modulator/demodulator, and possibly a separate antenna, to support RFID communications. According to some example embodiments, the bridge device may include a monitoring device configured to operate as a bridge device. Via seamless transition between the two communications modes, a single, possibly hand-held, bridge device can operate as a tag or monitoring device reader, and may be used to communicate with disparate types of devices. Communications with the devices may be performed for a variety of reasons, such as for counting inventory, price checking, tag firmware upgrades, tag encoding, and the like.

Some example embodiments discussed herein include methods and systems that comprise receiving a first communication in accordance with a radio frequency identification protocol, the first communication including an ultra high frequency interrogation signal; extracting, with circuitry, information from the first communication; generating, with the circuitry, a second communication based on the information; and transmitting the second communication to a monitoring system in accordance with a short range communication protocol that is different than the radio frequency identification protocol. For example, the receiving the first communication can include receiving a new price and/or other data to be associated with an item other than that to which the circuitry is physically attached. As another example, the receiving the first communication can include receiving a new price and/or other data associated with the item to which the circuitry is physically attached. For example, an RFID reader, which also includes a barcode scanner, can scan a barcode, transmit the barcode information to the bridge device, thereby causing the bridge device to update its product information stored locally and by the monitoring system, as well as cause the bridge device to update the price stored on other tags attached to similar items tracked by the monitoring system. The price and/or other data may also be associated with the item for a predetermined period of time (e.g., have an expiration date/time) and/or be user-entered (e.g., using a key pad included in the RFID reader or tag).

In bridging two different types of communications, the bridge device can be configured to receive a first communication having a first format, extract the payload data from the first communication, generate a second communication based on the extracted data (including formatting the payload data in accordance with a different protocol), and then transmit the second communication to a device on the monitoring system (e.g., for storage by a remote storage device, etc.). Similarly, the bridge device may bridge communications from the monitoring system to other types of devices on networks not otherwise connected to the monitoring system. Networks that only connect to the monitoring system via one or more bridge devices are sometimes referred to herein as "external networks."

In some embodiments, the monitoring system may be configured to install a configuration data onto the storage component(s) of a bridge device. The configuration data may, for example, allow the bridge device to bridge the monitoring system with one or more external networks. In some embodiments, the monitoring system (e.g., the network entity 62) may instruct the bridge device to generate and transmit hardware profile data for configuring the bridge device, which in some example embodiments have hardware similar to that of monitoring device. For example, a monitoring system may only provide configuration data, that causes the configurable monitoring device to function as a bridge device to an ultra high frequency device, after determining the configurable monitoring device has an operable antenna that may function as an ultra high frequency antenna.

To avoid overcomplicating this discussion, most examples referenced herein relate to a retail sales environment. However, example embodiments involving the bridge device may be configured to support various security, inventory, marketing, and/or other functionalities also useful for, for example, tracking items in a warehouse, chips on a casino floor, equipment in a hospital, animals at a zoo or on a farm, portable computers in an office, and/or any other environment(s) where one or more items may be moved and/or associated with various identifying information.

Additionally, as discussed further below, each monitoring devices can be configured to download information from and/or upload information to a local device, such as RFID reader. The RFID reader may or may not be otherwise connected to a network, such as the system 30. For example, the RFID reader can be any type of RFID encoder/decoder, such as a handheld RFID scanner, ink printer with RFID encoding functionality, RFID reader integrated into a desk, retail counter or other piece of furniture, document tray RFID reader, any other type of decoding/encoding device, and/or other apparatus that provides any such RFID functionality or combination thereof. For example, the RFID reader can be configured to read passive or active UHF RFID tags. Because passive RFID tags do not include their own a power source, but are instead powered by electromagnetic radiation emitted by the reader/encoder, the RFID reader can be configured to initiate communications by emitting an particular radio frequency, sometimes referred to herein as a power signal. When a passive RFID tag is activated (or powered) by the reader, the passive tag is often configured to emit responsive radio frequency signals that include data stored on the passive RFID tag's non-volatile memory. The communication processes used by passive RFID tags is sometimes referred to as "backscatter communications." The data stored by passive RFID tags can include, for example, the type of data encoded in traditional barcodes. Passive RFID tags can also include additional and/or alternative types of data (such as data related to security and authentication), as well as a greater amount of data. UHF RFID tags, for example, can be configured to conduct communications consistent with the Generation II Ultra High Frequency (UHF) RFID standards.

The bridge device may also support RFID communications based on any standard, including Generation II UHF RFID standards. In example embodiments, a bridge device can be configured to function as a RFID bridge by conducting communications in compliance with both an IEEE 802.15 protocol and RFID protocol (even when the bridge device has its battery and/or other dedicated power source). For example, an RFID reader or another RFID device, which cannot or rather not communicate directly with a monitoring device or the network entity 62 (e.g., does not have 802.15 communications capabilities and/or is inefficient at communicating using 802.15 protocol(s)), may communicate with a bridge device. In response, bridge device may function as an RFID bridge by relaying data, based on communications received from the RFID reader, to other devices and/or modules connected to monitoring system. In some embodiments, when the RFID reader attempts to communicate with the bridge device, the energizing signal of the RFID reader may cause the bridge device to enter an awake state and communicate with the RFID reader and, in some instances, the network entity 62. Similarly, the bridge device may relay communications from and/or provide a bi-directional communications bridge between other components of monitoring system and the RFID reader, thereby using the bridge device as an interface to and for the RFID reader.

Figure 23:
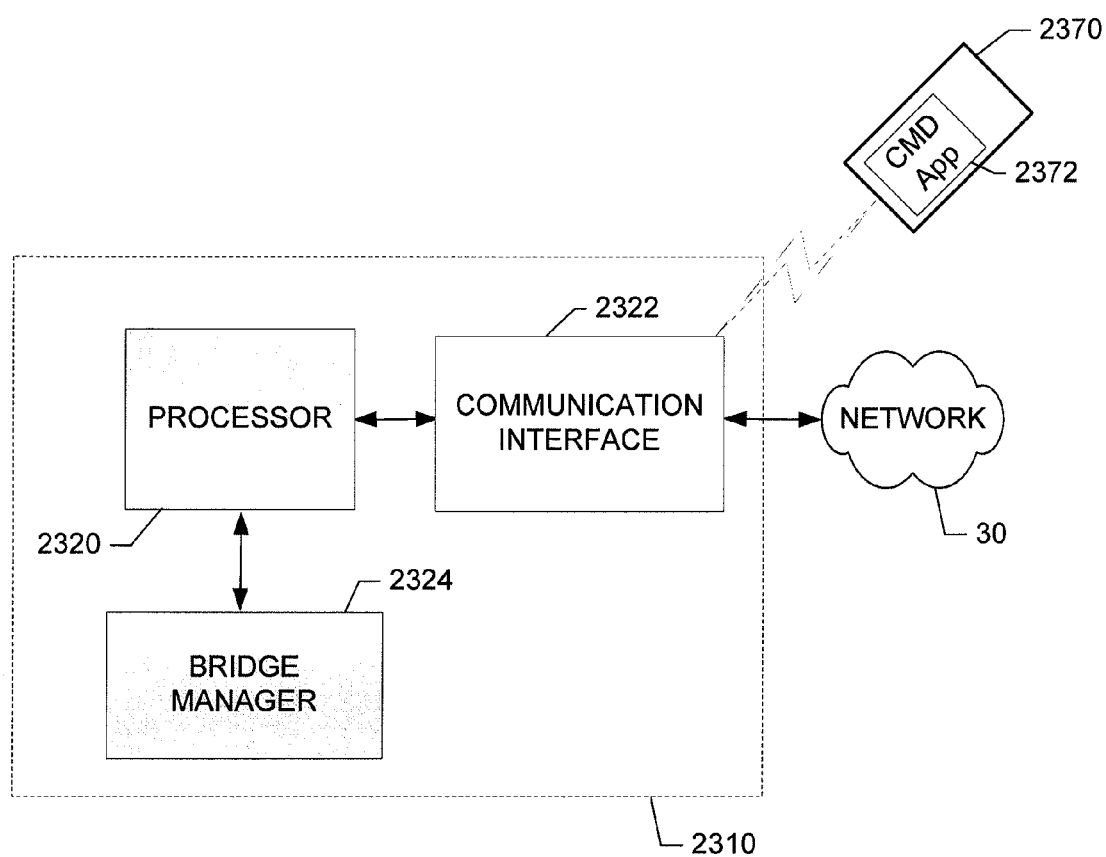
FIG. 23 illustrates an example bridge device with specialized hardware for performing functionality within the role of a bridge device according to an example embodiment.

FIG. 23 is a block diagram showing various functional components of the bridge device 2310 according to example embodiments. The processor 2320 may act in accordance with a protocol and receive indications from components of the bridge device 2310. The processor 2320 may be the same or similar to processor 20 as described with respect to the server 63 and FIG. 2. In some embodiments, the bridge device 2310 may comprise a battery, and, for example, a low power processor 2320 may be more desirable to conserve battery life. Similarly, in some example embodiments, the bridge device 2310 may include a memory device similar to memory device 27 for interaction with, for example, processor 2320.

The communications interface 2322 may be any means such as a device or circuitry embodied in either hardware, software, or a combination of hardware and software that is configured to receive and/or transmit data from/to a network and/or any other device or module in communication with bridge device 2310. In this regard, communications interface 2322 may include, for example, an antenna (or multiple antennas) and supporting hardware and/or software for enabling communications with a wireless communication network 30 or other devices (e.g., RFID reader 2370).

In an exemplary embodiment, the communications interface 2322 may support communication via one or more different communication protocols or methods. In some embodiments, the communications interface 2322 may be configured to support relatively low power, which may yield a relatively small communication proximity area. As such, for example, a low power and short range communication radio (e.g., a radio transmitter/receiver) may be included in the communication interface 2322. In some examples, the radio transmitter/receiver may include a transmitter and corresponding receiver configured to support radio frequency (RF) communication in accordance with an IEEE (Institute of Electrical and Electronics Engineers) communication standards such as IEEE 802.15 or draft standard IEEE 802.15.4a, which may yield a relatively larger communication proximity area. For example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 or 4a based communication techniques, ZigBee, or other low power, short range communication protocols such as a proprietary technique based on IEEE 802.15.4 may be employed. According to some example embodiments, the communications interface 2322 may be configured to support an Internet Protocol version 6 (IPV6) stack.

In embodiments where the bridge device, the communication interface 2322 can include additional hardware, software and/or firmware that are compliant with, for example, a RFID communications protocol, such as the Generation II UHF RFID standards via, for example an RFID module. The functionality of communication interface 2322 may be divided among multiple components or combine into a single component (e.g., FPGA). Rather than a single functional unit, as represented by communication interface 2322, bridge device 2310 can comprise radio transmitter/receiver which is separate from an RFID module. Radio transmitter/receiver may transmit/receive communications formatted for a first protocol (such as a short range communications protocol), while RFID module may transmit/receive communications formatted in accordance with a second protocol (such as an RFID communications protocol). Processor 2320 can then be configured extract the information and/or other type of data from a first communication (of one protocol and/or the other), generate a new communication in accordance with the other protocol and transmit the new communication, thereby bridging the monitoring system with one or more external networks.

Figure 24:
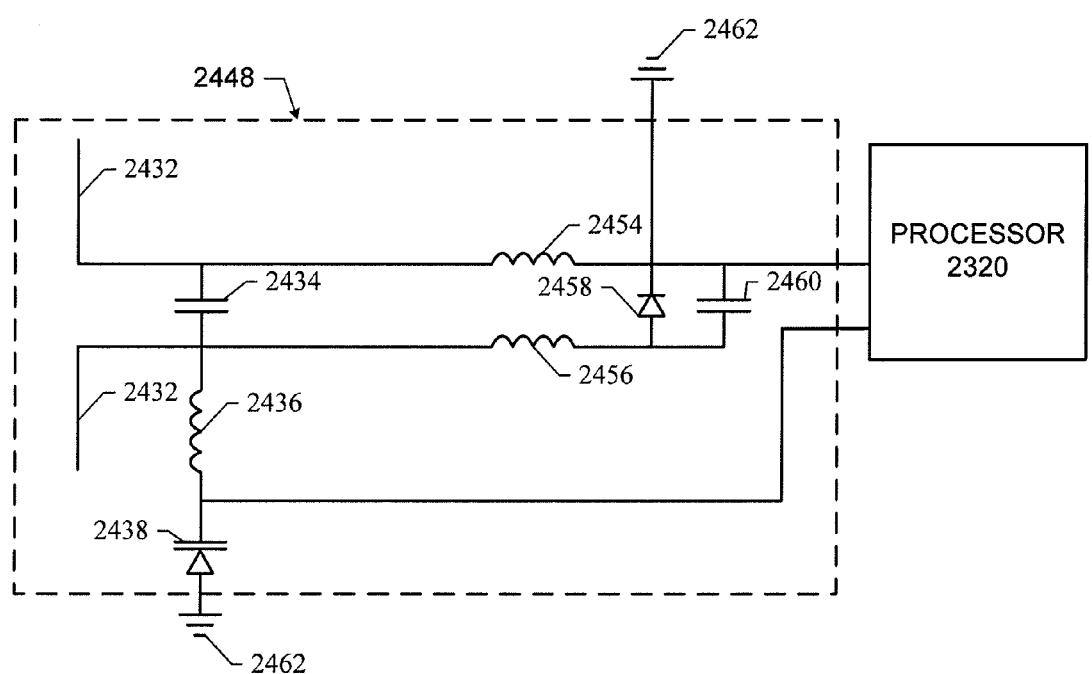
FIG. 24 illustrates and example radio frequency identification (RFID) module according to an example embodiment.

FIG. 24 illustrates an example RFID module 2448 that may be configured to interrogate RFID tags and/or simulate a passive or active RFID tag if interrogated by a RFID device, such as RFID reader 2370. Alternatively or additionally, RFID module 2448 may include one or more passive or active RFID tags or some of the components thereof. For example, as shown in FIG. 24, RFID module 2448 can include a one or more backscatter UHF antennas 2432 coupled to various other RFID backscatter circuitry components that may form, e.g., a matching circuit, a demodulator, modulator, and/or any other type of circuit.

When RFID module 2448 includes two UHF antennas 2432, as shown in FIG. 24, RFID module 2448 may also include, for example, capacitor 2434 coupled to both of the of UHF antennas 2432. Inductor 2454 may be coupled to a first node of capacitor 2434 and inductor 2456 may be coupled to a second node of capacitor 2456. As shown in FIG. 24, the second node of inductor 2454 may be coupled to the negative node of diode 2458, a first node of capacitor 2460 and ground 2462. The second node of inductor 2454 may also be connected to processor 2320 of bridge device 2310. The second node of capacitor 2434 can be coupled to a first node of inductor 2436 and a first node of inductor 2456. The first node of inductor 2456 can be coupled to the positive node of diode 2458 and the second node of capacitor 2460. The second node of inductor 2436 can be coupled to the cathode of varicap diode 2438 and processor 2320, while the anode of varicap diode 2438 may be coupled to ground 2462.

In other embodiments (not shown), RFID module 2448 can include one or more backscatter UHF antennas 2432 coupled directly to processor 2320. Processor 2320's hardware, firmware and/or software can be configured to function like one or more backscatter circuits.

In some example embodiments where the bridge device 2310 includes a radio transmitter/receiver (e.g., an IEEE 802.15.4 radio) separate from an RFID module, the bridge device 2310 may be configured to operate as a network interface or other type of bridge that allows RFID and/or other types of devices to access a monitoring system. For example, an RFID reader 2370 or other RFID device, may communicate with the bridge device 2310, and the bridge device 2310 may relay the communications to entities connected to the monitoring system. In the same manner, the bridge device 2310 may relay communications initiated on the monitoring system to an RFID device that has interfaced with the bridge device. For example, RFID reader 2370 may include hardware, firmware and/or software installed thereon, referred to herein as CMD app 2372, which enables RFID reader 2370 to receive information from a bridge device, such as the bridge device 2310. The information conveyed to RFID reader 2370 can cause CMD app 2372 to program RFID reader for future communications with devices outside and/or part of a monitoring system, such as monitoring system 30. As such, a bridge device may be configured to conduct passive and/or other types of RFID communications.

Such an array of functionality may enable bridge device 2310 to interface with legacy RFID readers and encoders through simulated or actual backscatter and/or other types of communications methods. For example, RFID reader 2370 can use backscatter to communicate with and write SKU, other price tag information, other retail information, and/or any other type of data to RFID module 2448, which can then be sent to processor 2320. And in response, a radio transmitter/receiver can receive the corresponding data from processor 2320, format the data (if necessary), and upload the formatted data to the system 30. Similarly, processor 2320 can format and/or save the corresponding data to a memory device. Should bridge device 2310 determine that RFID reader 2370 is attempting to interrogate it using a backscatter protocol (based on, e.g., determining that an energizing power signal has been and/or is being received), RFID module 2448 can simulate a passive RFID tag (if it's not a passive RFID tag) and provide data stored on a memory device to RFID reader 2370. The data stored on the memory device could have been originally supplied by an external device (such as RFID reader 2370, barcode scanner, and/or keypad) and/or received from system 30 via a radio transmitter/receiver. As such, the monitoring system can be enabled to interface with existing passive or active RFID networks currently being implemented in many retail and other industries as a barcode replacement or enhancing system.

Processor 2320 of some exemplary embodiments may be embodied as, include or otherwise control bridge manager 2324 shown in FIG. 23. Bridge manager 24 may be any means such as a device and/or circuitry operating in accordance with firmware/software or otherwise embodied in hardware or a combination of hardware and firmware/software (e.g., processor 2320 operating under software control, processor 2320 embodied as an ASIC or FPGA specifically configured to perform the operations described herein, or a combination thereof) thereby configuring the device or circuitry to perform the corresponding functions of bridge manager 2324 as described herein including, for example, the funcationality described with respect to FIGS. 25-30. Thus, in examples in which software is employed, a device or circuitry (e.g., processor 2320 in one example) executing the software forms the structure associated with such means.

Bridge manager 2324 may be configured to control operation of bridge device 2310 based on configuration information provided to the bridge device 2310 (e.g., via communication interface 2322) or pre-stored in the bridge device 2310. According to some example embodiments, bridge manager 2324, with or without the communication interface 2322, may support a wireless bootloading. As such, for example, bridge manager 2324 may be configured to determine and/or control the configuration and thereby also the operation of bridge device 2310 based on the current situation as determined by bridge manager 2324 and/or based on the instructions received by bridge manager 2324. A bridge device, e.g., via the bridge manager 2324 may also be configured as a manager's key or override device to be implemented within the monitoring system.

Figure 25:
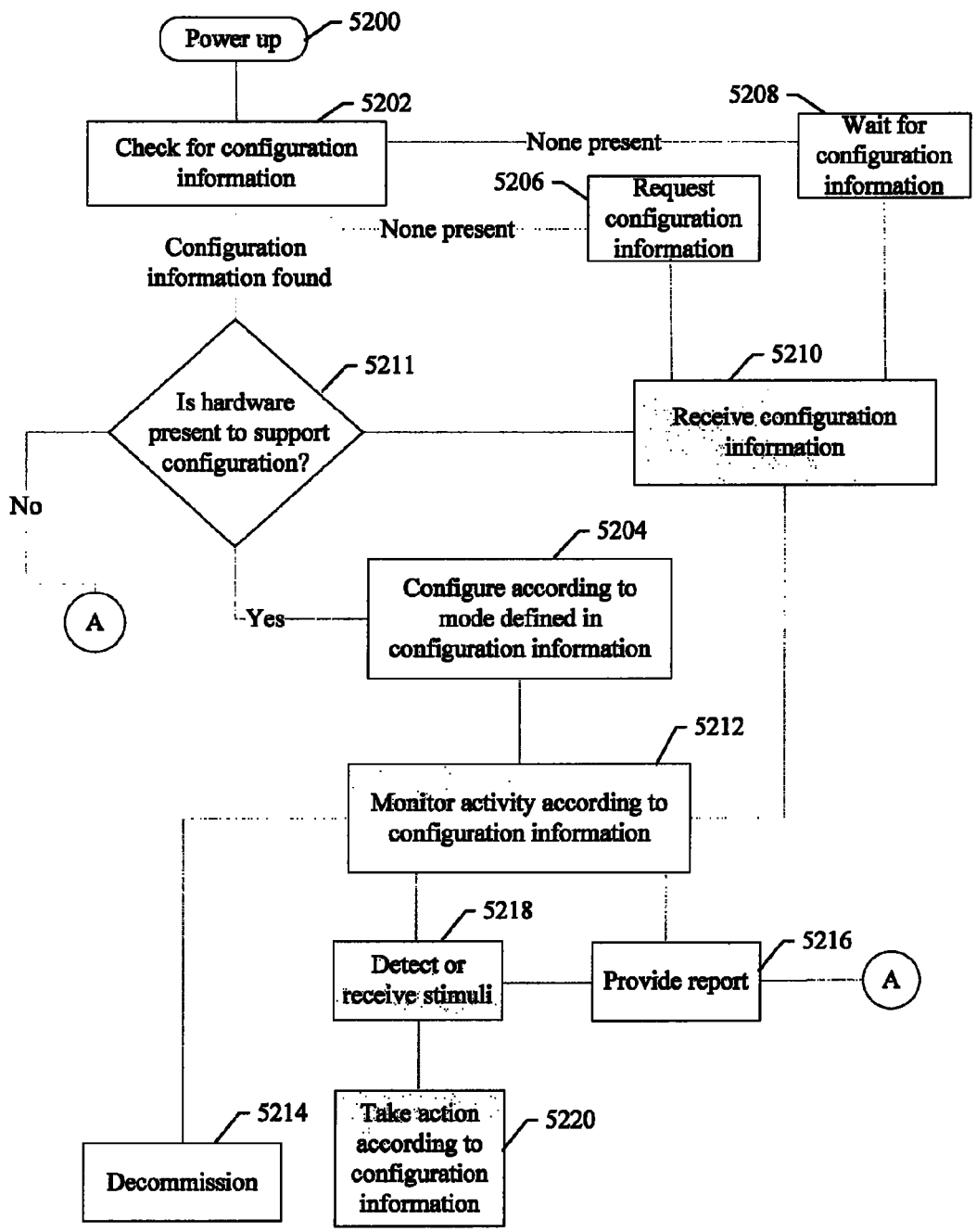
FIGS. 25-27 shoe examples of flow charts illustrating the operations that may be performed by the bridge device and other system components according to some example embodiments.

FIG. 25 shows an example of a flow diagram showing an example configured operation of a bridge device, according to an exemplary embodiment. In this regard, as shown in FIG. 25, a bridge device may initially be powered ON (and/or otherwise initialized) at 5200. Subsequent to powering ON or initialization, the bridge device may check for configuration information at 5202. If no configuration information is found, the bridge device may either request configuration information from the network entity 62 at 5206 or simply wait to receive configuration information and enter an idle mode in the meantime at 5208. At 5210, the bridge device may receive configuration information in response to its sending a request for configuration information and/or in response to sending an instruction to provide configuration information to the bridge device that is either manually and/or automatically generated. In response to receiving configuration information and/or in response to finding configuration information at 5202, the bridge device can determine at 5211 whether the bridge device has or lacks the requisite hardware to implement the configuration information. For example, the bridge device may receive and/or find bridge configuration information, but may lack the proper UHF antenna to implement such functionality. In response to determining that the proper hardware is lacking to implement the particular configuration information, an error message can displayed at 5216.

In response to the proper hardware being found (based on, e.g., a reported hardware profile) and determined to be operable at 5211, the bridge device can configure itself according to the configuration information from 5204. Each of 5204, 5212, 5218 and/or 5220 may represent a number of types of operations and/or other type(s) of functional steps, some examples of which are discussed in connection with FIGS. 26-30.

After being configured, the bridge device may monitor activity at 5212 according to its configuration information. At any time during monitoring, new configuration information may be received to trigger reconfiguring of the bridge device at 5204. However, during monitoring, any one of several occurrences may be encountered. For example, the bridge device could be decommissioned at 5214 or report its previous and/or current activity to another system device and/or a device external to the monitoring system (such as, e.g., a UHF RFID device) at 5216. In some cases, at 5218, a specific stimulus may be detected by the bridge device (such as an activation signal by the bridge device's UHF printed antenna) and/or the bridge device may receive notification of a stimulus from a monitoring device. In response to the detection of the stimuli, the bridge device may be configured to report the activity at 5216 and/or take other action(s) according to the configuration information (e.g., as defined by the bridge manager 2324) at 5220.

Figure 26:
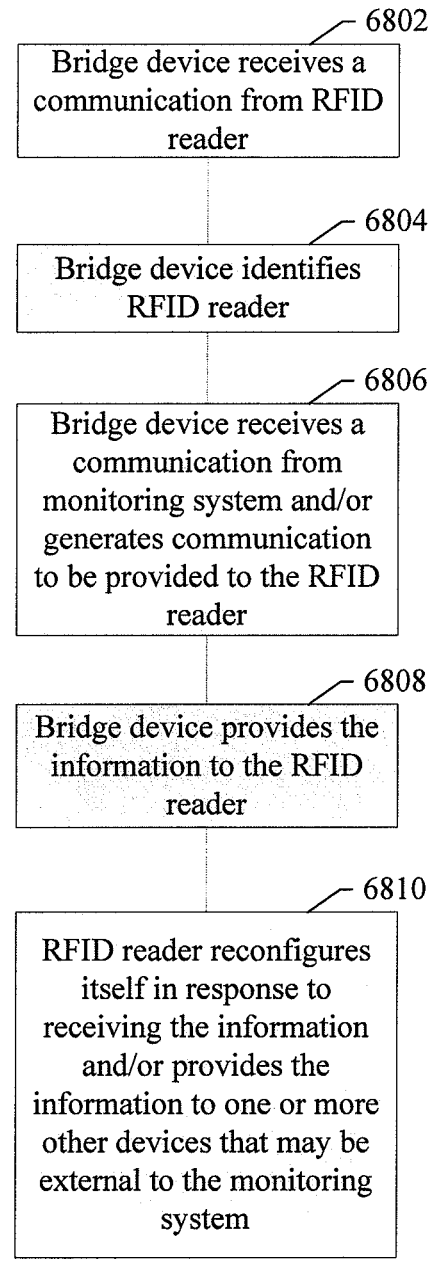

FIG. 26 shows a process flow and provides additional examples of the type of information that can be passed from a monitoring system over a bridge device to a RFID reader and/or other type of device that is otherwise external to the monitoring system. FIG. 26 shows an exemplary process that could be used for providing information, including configuration data, from a monitoring system to an RFID reader using a bridge device, such as bridge device 2310. This may be helpful when, e.g., configuring RFID tags and/or other devices that cannot access the monitoring system (e.g., due to a technical malfunction, lack of hardware, lack of functionality, among other things).

At 6802, a bridge device can receive one or more signals from a RFID reader, such as RFID reader 2370, and/or any other type of device. For example, the RFID reader can broadcast an ultra high frequency interrogation signal (e.g., between 300 MHz and 3 GHz) in accordance with a passive RFID protocol, which may initiate UHF RFID communications between the bridge device and the RFID reader. As additional examples, the RFID reader can broadcast one or more other types of interrogation signals, at any suitable frequency, in accordance with an active RFID communication protocol and/or a semi-passive RFID communication protocol.

At 6804, the bridge device can receive identifying data and/or otherwise identify the RFID reader. For example, the RFID reader may include hardware, firmware and/or software that may enable the bridge device to program the RFID reader, and the bridge device may access a look-up table (using, e.g., the identifying data received at 6802) that indicates whether the RFID reader is configured to be programmed by the bridge device. As another example, the bridge device and/or other aspect of the monitoring system may be able to determine whether or not the RFID reader can be programmed by the bridge device based on information provided by the RFID reader (such as, e.g., in the initial interrogation signal and/or subsequent communications with the bridge device).

At 6806, the bridge device may receive information from the monitoring system, such as monitoring system discussed above, and/or the bridge device may be configured to generate information to be transmitted to the RFID reader. In some embodiments, the bridge device may receive and/or generate information intended for one or more RFID readers (and/or other devices) from the monitoring system before the destined device actually begins communicating with the bridge device. In other words, at least a portion of 6806 may precede 6802 and/or 6804.

For example, at 6808 the bridge device may transmit information to the RFID reader, wherein the information was extracted from a communication the bridge device received from the monitoring system. The extracted information can causes the RFID reader to, for example, program a price for products having RFID tags, which cannot access the monitoring system (because, e.g., the RFID tags do not have 6802.15 and/or other short range wireless network authorization and/or capabilities used by the monitoring system). In some embodiments, such as those where the RFID reader has the requisite hardware, additional software and/or firmware, such as CMD app 2372 discussed above, can be transmitted at 6808 to the RFID reader. As yet another example, tag-specific information, monitoring-system reports, and/or any other type of information can be transmitted to the RFID reader at 808.

At 6810, the RFID reader can, for example, reconfigure itself in response to receiving the information (e.g., install the CMD app). As anther example, the RFID reader can relay and/or otherwise provide the information to one or more other devices that may be external to the monitoring system. In this regard, the bridge device may enable the monitoring system to be backwards compatible and interact with legacy devices and/or systems that do not necessary include the requisite hardware, software, firmware, authorizations, and/or other components to be part of the monitoring system.

Figure 27:
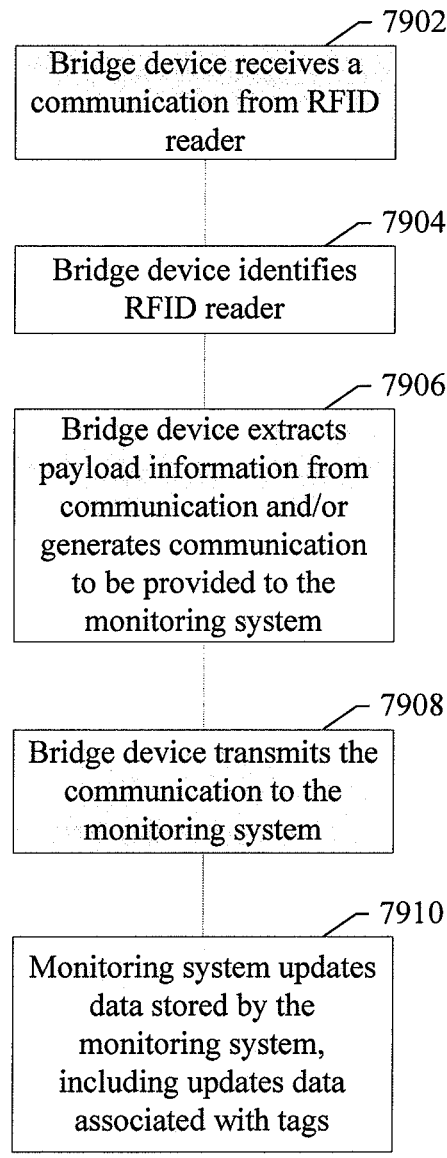

FIG. 27 shows an exemplary process that could be used for providing information, including configuration data, from a RFID reader to a monitoring system using a bridge device, such as bridge device 2310 and/or a device dedicated to functioning as a bridge device. The opposite may also be performed to provide information from the monitoring system to the RFID reader. A device that is configured to bridge communications (e.g., extracting the payload data from a first communication and generating a communication providing the payload data in accordance with a different protocol) may be helpful when, e.g., importing information into the monitoring system from RFID tags and/or other devices (such as barcode readers, keyboards, user input devices, and/or any other device) that cannot otherwise access the monitoring system (e.g., due to a technical malfunction, lack of hardware, lack of functionality, among other things).

At 7902, a bridge device can receive a communication from an RFID reader (and/or other device). For example, the bridge device may receive an ultra high frequency interrogation signal that includes various information and other types of data, including payload data that the bridge is configured to relay to the monitoring system. The communication received from the RFID reader may also include an RFID identifier, which is determined at 7904.

At 7906, the bridge device can extract information from the communication (including removing any headers and/or other types of data used to route the communication to the bridge device), and the bridge device can generate a communication that includes the extracted information and is compliant with at least one communications protocol used by the monitoring system. For example, the RFID reader may provide the bridge device pricing information for one or more items (based on user-entered information, barcode scan(s), etc.), the bridge device may be configured to extract the pricing information from the communication and generate a new communication that provides the pricing information to the monitoring system. In some embodiments, the bridge device may be configured to store the extracted information in a storage device that is local to (e.g., included within) the bridge device.

At 7908, the bridge transmits the new communication to the monitoring system. For example, the bridge may transmit the new communication using a short range communication protocol that is different than a RFID protocol used by the RFID reader to initially deliver the information at 7902.

At 7910, the monitoring system can be configured to receive the information transmitted by the bridge device and update its databases and/or data otherwise stored throughout the monitoring system (e.g., by tags, nodes, etc.). For example, the monitoring system may be configured to determine that the item associated with the bridge device just had its price changed by the RFID reader. As a result of that price changing, other items that are similar to or different than the item associated with the bridge device may also have their prices changed by the monitoring system. For example, if the bridge device is physically attached to a golf club and has a price reduction applied by the RFID reader, the monitoring system may make a similar price reduction to all golf clubs of the same type and for all golf clubs of lesser value. The price reductions (and/or any other change made to monitoring system data) may be the same or different across various items. In this regard, prices and/or other data can be made to devices that are located remotely from the bridge device. The bridge device and/or remote devices may then display new information as a result of any data changed by the monitoring system.

As further to the discussion above with respect to sections I. through VIII., the flexible nature of the embodiments of the present invention, including the network and its components (e.g., monitoring device, ping nodes, network entity), may enable dynamic configurations within a network to introduce robust capabilities for providing services and functionality and, for providing updates to existing capabilities with updated configuration information. Embodiments of the present invention may be implemented by various means, such as hardware, firmware, processor, circuitry and/or other device associated with execution of software including one or more computer program instructions. For example, one or more of the procedures or activities described above may be embodied by computer program instructions. In this regard, the computer program instructions which embody the procedures or activities described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the corresponding procedure or activity. These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the corresponding procedure or activity. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the corresponding procedure or activity described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this disclosure. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

That which is claimed:

1. A system for tracking an article in a commercial environment, the system comprising:
  a network entity comprising a server and a router, the router being configured to maintain a communications connection with the server;
  a ping node configured to transmit a ping signal comprising ping node location data including an identifier of the ping node; and
  a monitoring device configured for attachment to the article, the monitoring device configured to:
    detect motion of the monitoring device as indicated by a motion sensor of the monitoring device;

responsive only to the detection of motion or an expiration of a timer, awaken to an active state;
while in the active state:
receive the ping signal from the ping node; and
transmit the ping node location data and a monitoring device identifier to the server via the router;
wherein the server of the network entity is configured to:
receive the ping node location data and the monitoring device identifier; and
store the ping node location data in association with the monitoring device identifier:
wherein the system further comprises:
a commissioning node configured to transmit a commissioning ping signal including commissioning node location data, the commissioning node location data including a commissioning node identifier; and
a decommissioning node configured to transmit a decommissioning ping signal including decommissioning node location data, the decommissioning node location data including a decommissioning node identifier;
wherein the monitoring device is further configured to:
detect an output signal from a locking mechanism sensor of the monitoring device indicating that a locking mechanism of the monitoring device has been triggered;
begin monitoring wireless signals in response to detecting the output signal from the locking mechanism sensor;
receive the commissioning ping signal; and
transmit the commissioning node location data and the monitoring device identifier to the network entity;
wherein the network entity is further configured to commission the monitoring device, wherein being configured to commission the monitoring device comprises being configured to:
receive the commissioning node location data and the monitoring device identifier from the monitoring device;
receive product information associated with the article to which the monitoring device is attached, the product information being provided by a commissioning product data input device; and
store the product information in association with the monitoring device identifier;
wherein the monitoring device is further configured to:
receive the decommissioning ping signal;
transmit the decommissioning node location data and the monitoring device identifier to the network entity; and
wherein the network entity is further configured to decommission the monitoring device, wherein being configured to decommission the monitoring device includes being configured to:
receive the decommissioning node location data and the monitoring device identifier from the monitoring device;
disassociate the product information from the monitoring device identifier;
transmit a decommission signal to the monitoring device; and
store a decommissioned state event, such that the decommissioned state event is associated with the monitoring device identifier.

2. The system of claim 1, wherein the monitoring device, while in the active state, is further configured to:
detect a tamper detection component indication from a tamper detection sensor of the monitoring device;
alarm locally in response to detecting the tamper detection component indication; and
transmit a tamper alarm signal with the monitoring device identifier to the network entity, in response to receiving the tamper detection component indication;
wherein the network entity is further configured to:
receive the tamper alarm signal; and
log a tamper alarm event in association with the monitoring device identifier.

3. The system of claim 1, wherein the monitoring device, while in the active state, is further configured to:
detect an article detachment indication from an article attachment/detachment senor of the monitoring device;
alarm locally in response to detecting the article detachment indication; and
transmit an article detachment signal with the monitoring device identifier to the network entity, in response to receiving the tamper detection component indication;
wherein the network entity is further configured to:
receive the article detachment signal; and
log an article attachment event in association with the monitoring device identifier.

4. The system of claim 1, wherein the monitoring device is configured to, while in the active state, transmit an alert message, the alert message being a tamper alert message, an article detachment alert message, a zone alert message, or a lost tag alert message;
wherein the network entity is further configured to transmit a message to an alert device in response to receiving the alert message, the alert device being a mobile device, a computer, or a display.

5. The system of claim 1, wherein the network entity is configured to:
determine that the monitoring device has moved into a zone of interest based on the received ping node location data and a zone-based functionality profile; and
transmit an alarm instruction to the monitoring device, in response to at least determining that the monitoring device has moved into a zone of interest;
wherein the monitoring device is configured to alarm locally in response to receiving the alarm instruction.

6. The system of claim 1, further comprising an event detection device configured to transmit an event signal in response to detection of an event, the event detection device being an event counter; and
wherein the network entity is configured to receive the event signal.

7. The system of claim 1, further comprising an override device, wherein the override device is configured to:
receive a user input; and
in response to receiving the user input, transmit a silence alarm signal;
wherein the network entity is further configured to:
receive the silence alarm signal; and
in response to receiving the silence alarm signal, transmit a silence alarm instruction; and
wherein the monitoring device is further configured to:
receive the silence alarm signal; and
in response to receiving the silence alarm signal, stop alarming.

8. The system of claim 1, wherein the network entity is further configured to:
receive a price change criterion, the price change criterion being based on a time and date, a threshold inventory quantity, or a threshold duration that the article has been located in the commercial environment;

change a price of the article stored in the network entity; and transmit a price change message in response to changing the price of the article to the monitoring device;

wherein the monitoring device is configured to receive the price change message and, in response to receiving the price change message, provide a presentation of at least one of visual or audible information indicating the price.

9. The system of claim 1 further comprising a plurality of monitoring devices including the monitoring device; wherein the network entity is further configured to, based on responses to receiving ping location data from the plurality of monitoring devices, generate a tag accounting report.

10. The system of claim 1, wherein the monitoring device, while in the active state, is further configured to:
  detect a tamper detection component indication from a tamper detection sensor of the monitoring device;
  alarm locally in response to detecting the tamper detection component indication; and
  transmit a tamper alarm signal with the monitoring device identifier to the network entity, in response to receiving the tamper detection component indication;
  wherein the network entity is further configured to:
    receive the tamper alarm signal; and
    transmit a message to an alert device in response to receiving the tamper alarm signal, the alert device being a mobile device, a computer, or a display.

11. A method for tracking an article in a commercial environment, the method comprising:
  detecting, at a monitoring device, motion of the monitoring device as indicated by a motion sensor of the monitoring device;
  responsive only to the detection of motion or an expiration of a timer, awaken the monitoring device to an active state;
  while the monitoring device is in the active state:
    receiving, at the monitoring device, a ping signal from a ping node; and
    transmitting, from the monitoring device, the ping node location data and a monitoring device identifier to a server via a router, the server and the router being included in a network entity:
  wherein the method further comprises:
    receiving, at the network entity, the ping node location data and the monitoring device identifier from the monitoring device; and
    storing, at the network entity, the ping node location data in association with the monitoring device identifier to track events of the monitoring device within a commercial environment;
  wherein the method further comprises:
    detecting, at the monitoring device, an output signal from a locking mechanism sensor of the monitoring device indicating that a locking mechanism of the monitoring device has been triggered;
    beginning to monitor wireless signals at the monitoring device in response to detecting the output signal from the locking mechanism sensor;
    receiving, at the monitoring device, a commissioning ping signal, the commissioning ping signal being transmitted by a commissioning node, the commissioning ping signal including commissioning node location data, the commissioning node location data including a commissioning node identifier;
    transmitting, from the monitoring device to the network entity, the commissioning node location data and the monitoring device identifier;
    commissioning the monitoring device, wherein commissioning the monitoring device comprises:
      receiving, from the monitoring device at the network entity, the commissioning node location data and the monitoring device identifier;
      receiving, from a commissioning product data input device at the network entity, product information associated with the article to which the monitoring device is attached; and
      storing, at the network entity, the product information in association with the monitoring device identifier;
    wherein the method further comprises:
      receiving, at the monitoring device, a decommissioning ping signal, the decommissioning ping signal being transmitted by a decommissioning node, the decommissioning ping signal including decommissioning node location data, the decommissioning node location data including a decommissioning node identifier;
      transmitting, from the monitoring device to the network entity, the decommissioning node location data and the monitoring device identifier; and
      decommissioning the monitoring device, wherein decommissioning the monitoring device comprises:
        receiving, from the monitoring device at the network entity, the decommissioning node location data and the monitoring device identifier;
        disassociating, at the network entity, the product information from the monitoring device identifier;
        transmitting a decommission signal from the network entity to the monitoring device; and
        storing a decommissioned state event at the network entity, such that the decommissioned state event is associated with the monitoring device identifier.

12. The method of claim 11, wherein the method further comprises, while the monitoring device is in the active state:
  detecting, at the monitoring device, a tamper detection component indication from a tamper detection sensor of the monitoring device;
  alarming, local to the monitoring device, in response to detecting the tamper detection component indication;
  transmitting, from the monitoring device to the network entity, a tamper alarm signal with the monitoring device identifier, in response to receiving the tamper detection component indication;
  receiving, at the network entity, the tamper alarm signal; and
  logging, at the network entity, a tamper alarm event in association with the monitoring device identifier.

13. The method of claim 11, wherein the method further comprises, while the monitoring device is in the active state:
  detecting, at the monitoring device, an article detachment indication from an article attachment/detachment senor of the monitoring device;
  alarming, local to the monitoring device, in response to detecting the article detachment indication;
  transmitting, from the monitoring device to the network entity, an article detachment signal with the monitoring device identifier, in response to receiving the tamper detection component indication;
  receiving, at the network entity, the article detachment signal; and
  logging an article attachment event in association with the monitoring device identifier.

14. The method of claim 11 wherein the method further comprises, while the monitoring device is in the active state:

transmitting, from the monitoring device to the network entity, an alert message, the alert message being a tamper alert message, an article detachment alert message, a zone alert message, or a lost tag alert message; and transmitting, from the network entity to an alert device, a message in response to receiving the alert message, the alert device being a mobile device, a computer, or a display.

15. The method of claim 11 further comprising:
determining, at the network entity, that the monitoring device has moved into a zone of interest based on the received ping node location data and a zone-based functionality profile;
transmitting, from the network entity to the monitoring device, an alarm instruction in response to at least determining that the monitoring device has moved into a zone of interest; and
alarming, local to the monitoring device, in response to receiving the alarm instruction.

16. The method of claim 11 further comprising:
transmitting an event signal from an event detection device in response to detection of an event, the event detection device being an event counter; and
receiving, at the network entity, the event signal.

17. The method of claim 11 further comprising:
receiving a user input at an override device;
in response to receiving the user input, transmitting a silence alarm signal from the override device to the network entity;
receiving, at the network entity, the silence alarm signal;
in response to receiving the silence alarm signal, transmitting a silence alarm instruction from the network entity to the monitoring device;
receiving, at the monitoring device, the silence alarm signal; and
in response to receiving the silence alarm signal, stopping an alarm local to the monitoring device.

18. The method of claim 11 further comprising:
receiving a price change criterion at the network entity, the price change criterion being based on a time and date, a threshold inventory quantity, or a threshold duration that the article has been located in the commercial environment;
changing, at the network entity, a price of the article stored in the network entity;
transmitting, from the network entity to the monitoring device, a price change message in response to changing the price of the article;
receiving, at the monitoring device, the price change message; and
in response to receiving the price change message, providing a presentation of at least one of visual or audible information indicating the price.

19. The method of claim 11 further comprising:
receiving, from a plurality of monitoring devices, responses to ping signals including ping location data; and
generating, at the network entity, a tag accounting report.

20. The method of claim 11, wherein the method further comprises, while the monitoring device is in the active state:
detecting a tamper detection component indication from a tamper detection sensor of the monitoring device;
alarming, local to the monitoring device, in response to detecting the tamper detection component indication;
transmitting, from the monitoring device to the network entity, a tamper alarm signal with the monitoring device identifier, in response to receiving the tamper detection component indication;
receiving the tamper alarm signal at the network entity; and
transmitting a message from the network entity to an alert device in response to receiving the tamper alarm signal, the alert device being a mobile device, a computer, or a display.

* * * * *

UNITED STATES PATENT AND TRADEMARK OFFICE
CERTIFICATE OF CORRECTION

| | |
|---|---|
| PATENT NO. | : 8,452,868 B2 |
| APPLICATION NO. | : 12/887228 |
| DATED | : May 28, 2013 |
| INVENTOR(S) | : Gary Mark Shafer et al. |

It is certified that error appears in the above-identified patent and that said Letters Patent is hereby corrected as shown below:

In the Specification
At column 8, line 51, the phrase "buzzers, etc,)" should read "buzzers, etc.)".
At column 21, line 46, the phrase "e,g., a commissioned" should read "e.g., a commissioned".
At column 29, line 9, the phrase "at any give time" should read "at any given time".
At column 37, line 64, the phrase "to a Paypal account" should read "to a PayPal account".
At column 58, line 51, the phrase "the funcationality" should read "the functionality".
At column 60, line 55, the phrase "As anther example" should read "As another example".

In the Claims
At column 64, line 13, claim 3, the phrase "attachment/detachment senor" should read "attachment/detachment sensor".
At column 66, line 54, claim 13, the phrase "attachment/detachment senor" should read "attachment/detachment sensor".

Signed and Sealed this
Twenty-fourth Day of December, 2013

Margaret A. Focarino
*Commissioner for Patents of the United States Patent and Trademark Office*